US011682082B2

(12) United States Patent
Leise et al.

(10) Patent No.: US 11,682,082 B2
(45) Date of Patent: *Jun. 20, 2023

(54) EVIDENCE ORACLES

(71) Applicant: STATE FARM MUTUAL AUTOMOBILE INSURANCE COMPANY, Bloomington, IL (US)

(72) Inventors: William J. Leise, Normal, IL (US); Douglas A. Graff, Mountain View, MO (US); Anthony McCoy, Normal, IL (US); Jaime Skaggs, Chenoa, IL (US); Shawn M. Call, Bloomington, IL (US); Stacie A. McCullough, Bloomington, IL (US); Wendy H. Clayton, Franklin, TN (US); Melinda Teresa Magerkurth, Utica, IL (US); Kim E. Flesher, Normal, IL (US); Travis Charles Runge, Heyworth, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 69 days.

This patent is subject to a terminal disclaimer.

(21) Appl. No.: 17/218,119

(22) Filed: Mar. 30, 2021

(65) Prior Publication Data

US 2021/0304317 A1      Sep. 30, 2021

Related U.S. Application Data

(63) Continuation of application No. 17/064,711, filed on Oct. 7, 2020, which is a continuation of application
(Continued)

(51) Int. Cl.
*H04L 9/40* (2022.01)
*G06Q 40/08* (2012.01)
(Continued)

(52) U.S. Cl.
CPC .......... *G06Q 40/08* (2013.01); *G06F 16/183* (2019.01); *G06F 16/29* (2019.01);
(Continued)

(58) Field of Classification Search
CPC .. G06Q 40/08; G06Q 10/10; G06F 16/90335; G06F 16/183; G06F 16/29; H04L 9/0637; H04L 9/3247; H04L 63/101
See application file for complete search history.

(56) References Cited

U.S. PATENT DOCUMENTS

| 5,991,733 A | 11/1999 | Aleia et al. |
| 7,962,385 B2 | 6/2011 | Falk et al. |

(Continued)

FOREIGN PATENT DOCUMENTS

WO     WO-2021/046494 A1     3/2021

OTHER PUBLICATIONS

"Managing Terrorism Financing Risk in Remittances and Money Transfers", Testimony by John Cassara on Jul. 18, 2017, 17 pages.
(Continued)

*Primary Examiner* — Ghodrat Jamshidi
(74) *Attorney, Agent, or Firm* — Marshall, Gerstein & Borun LLP

(57) ABSTRACT

Systems and methods are disclosed with respect to using a blockchain for managing the subrogation claim process related to a vehicle collision, in particular, utilizing evidence oracles as part of the subrogation process. An exemplary embodiment includes receiving recorded data from one or more connected devices at a geographic location; analyzing the recorded data, wherein analyzing the recorded data includes determining that an collision has occurred involving one or more vehicles; generating a transaction including the data indicative of the collision based upon the analysis;
(Continued)

and transmitting the transaction to at least one other participant in the distributed ledger network.

20 Claims, 15 Drawing Sheets

Related U.S. Application Data

No. 15/955,777, filed on Apr. 18, 2018, now Pat. No. 10,872,381.

(60) Provisional application No. 62/595,803, filed on Dec. 7, 2017, provisional application No. 62/555,358, filed on Sep. 7, 2017, provisional application No. 62/555,030, filed on Sep. 6, 2017, provisional application No. 62/554,907, filed on Sep. 6, 2017.

(51) Int. Cl.
*H04L 9/06* (2006.01)
*G06Q 10/10* (2023.01)
*H04L 9/32* (2006.01)
*G06F 16/29* (2019.01)
*G06F 16/182* (2019.01)
*G06F 16/903* (2019.01)

(52) U.S. Cl.
CPC ....... *G06F 16/90335* (2019.01); *G06Q 10/10* (2013.01); *H04L 9/0637* (2013.01); *H04L 9/3247* (2013.01); *H04L 63/101* (2013.01)

(56) References Cited

U.S. PATENT DOCUMENTS

| | | | |
|---|---|---|---|
| 8,615,409 B1 | 12/2013 | McKown | |
| 8,799,034 B1 | 8/2014 | Brandmaier et al. | |
| 9,311,271 B2 | 4/2016 | Wright | |
| 9,361,735 B1* | 6/2016 | Leise | B60W 50/0205 |
| 9,424,606 B2* | 8/2016 | Wilson, II | G06Q 10/10 |
| 9,508,200 B1 | 11/2016 | Mullen et al. | |
| 9,633,487 B2 | 4/2017 | Wright | |
| 9,787,951 B2 | 10/2017 | Kannon et al. | |
| 9,799,010 B1* | 10/2017 | Leise | B60W 50/0205 |
| 9,809,159 B1 | 11/2017 | Snyder et al. | |
| 9,875,510 B1 | 1/2018 | Kasper | |
| 10,007,263 B1 | 6/2018 | Fields et al. | |
| 10,008,102 B1* | 6/2018 | McEachron | G08B 25/10 |
| 10,192,369 B2 | 1/2019 | Wright | |
| 10,198,879 B2 | 2/2019 | Wright | |
| 10,215,582 B1 | 2/2019 | Goyal et al. | |
| 10,360,742 B1 | 7/2019 | Bellas et al. | |
| 10,380,812 B2 | 8/2019 | Pickover et al. | |
| 10,454,878 B2 | 10/2019 | Khan et al. | |
| 10,504,302 B1 | 12/2019 | Chavez et al. | |
| 10,521,780 B1 | 12/2019 | Hopkins, III et al. | |
| 10,535,103 B1 | 1/2020 | Tofte et al. | |
| 10,540,833 B1 | 1/2020 | Gingrich et al. | |
| 10,586,062 B1 | 3/2020 | Rangan et al. | |
| 10,606,669 B2 | 3/2020 | Jacobs et al. | |
| 10,713,727 B1 | 7/2020 | Floyd et al. | |
| 10,719,886 B1 | 7/2020 | Konrardy et al. | |
| 10,726,493 B1 | 7/2020 | Kyne et al. | |
| 10,796,393 B2 | 10/2020 | Messerges et al. | |
| 10,805,085 B1 | 10/2020 | Liang | |
| 10,833,843 B1 | 11/2020 | Vijayvergia et al. | |
| 10,872,381 B1 | 12/2020 | Leise et al. | |
| 10,878,512 B1 | 12/2020 | Al-Zoubi et al. | |
| 10,891,694 B1 | 1/2021 | Leise et al. | |
| 10,991,242 B2* | 4/2021 | Taylor | H04Q 9/00 |
| 11,157,973 B2* | 10/2021 | Fuchs | G06Q 30/0283 |
| 11,361,380 B2* | 6/2022 | Kelsh | H04N 5/23293 |
| 2001/0037204 A1 | 11/2001 | Horn et al. | |
| 2002/0035528 A1 | 3/2002 | Simpson et al. | |
| 2002/0069019 A1 | 6/2002 | Lin | |
| 2003/0016147 A1 | 1/2003 | Evans | |
| 2003/0028404 A1 | 2/2003 | Herron et al. | |
| 2004/0088090 A1* | 5/2004 | Wee | G08G 1/205 |
| | | | 701/33.4 |
| 2004/0111301 A1 | 6/2004 | Wahlbin et al. | |
| 2005/0086180 A1 | 4/2005 | Wamsley et al. | |
| 2005/0091338 A1 | 4/2005 | de la Huerga | |
| 2006/0089895 A1 | 4/2006 | Joye et al. | |
| 2006/0092043 A1* | 5/2006 | Lagassey | G07C 5/0891 |
| | | | 340/907 |
| 2006/0116914 A1 | 6/2006 | Stemple | |
| 2007/0185743 A1 | 8/2007 | Jinks | |
| 2008/0235064 A1 | 9/2008 | Gulko et al. | |
| 2008/0243556 A1 | 10/2008 | Hogan et al. | |
| 2009/0300065 A1 | 12/2009 | Birchall | |
| 2011/0077977 A1 | 3/2011 | Collins et al. | |
| 2011/0178906 A1 | 7/2011 | Joye et al. | |
| 2011/0295467 A1 | 12/2011 | Browne et al. | |
| 2011/0320226 A1 | 12/2011 | Graziano et al. | |
| 2012/0136780 A1 | 5/2012 | El-Awady et al. | |
| 2012/0136802 A1 | 5/2012 | McQuade et al. | |
| 2012/0239417 A1 | 9/2012 | Pourfallah et al. | |
| 2013/0131929 A1 | 5/2013 | Bortolin | |
| 2013/0135118 A1 | 5/2013 | Ricci | |
| 2013/0302758 A1 | 11/2013 | Wright | |
| 2014/0013110 A1 | 1/2014 | Thoniel et al. | |
| 2014/0108057 A1 | 4/2014 | Daniels et al. | |
| 2014/0156315 A1 | 6/2014 | Canovi et al. | |
| 2014/0304505 A1 | 10/2014 | Dawson | |
| 2014/0379361 A1 | 12/2014 | Mahadkar et al. | |
| 2015/0032372 A1 | 1/2015 | Fuehrer | |
| 2015/0046188 A1 | 2/2015 | De La Garza | |
| 2015/0100348 A1 | 4/2015 | Connery et al. | |
| 2015/0332283 A1 | 11/2015 | Witchey | |
| 2016/0125386 A1 | 5/2016 | Desai et al. | |
| 2016/0189303 A1* | 6/2016 | Fuchs | G06Q 40/08 |
| | | | 705/4 |
| 2016/0217258 A1 | 7/2016 | Pitroda et al. | |
| 2016/0217532 A1 | 7/2016 | Slavin | |
| 2016/0224832 A1 | 8/2016 | Madey et al. | |
| 2016/0253663 A1 | 9/2016 | Clark et al. | |
| 2016/0292672 A1 | 10/2016 | Fay et al. | |
| 2016/0358129 A1 | 12/2016 | Walton et al. | |
| 2017/0046638 A1* | 2/2017 | Chan | H04L 63/061 |
| 2017/0046652 A1 | 2/2017 | Haldenby et al. | |
| 2017/0053461 A1 | 2/2017 | Pal et al. | |
| 2017/0132626 A1 | 5/2017 | Kennedy | |
| 2017/0161827 A1 | 6/2017 | Imrey et al. | |
| 2017/0169625 A1* | 6/2017 | Lavie | G08G 1/0141 |
| 2017/0220998 A1 | 8/2017 | Horn et al. | |
| 2017/0232300 A1 | 8/2017 | Tran et al. | |
| 2017/0289134 A1 | 10/2017 | Bradley et al. | |
| 2017/0372432 A1 | 12/2017 | McKown | |
| 2018/0018723 A1 | 1/2018 | Nagla et al. | |
| 2018/0025334 A1 | 1/2018 | Pourfallah et al. | |
| 2018/0046992 A1 | 2/2018 | Hanrahan et al. | |
| 2018/0053257 A1 | 2/2018 | Nelemans | |
| 2018/0082043 A1 | 3/2018 | Witchey et al. | |
| 2018/0091596 A1 | 3/2018 | Alvarez et al. | |
| 2018/0117446 A1 | 5/2018 | Tran et al. | |
| 2018/0117447 A1 | 5/2018 | Tran et al. | |
| 2018/0211115 A1 | 7/2018 | Klein | |
| 2018/0218454 A1 | 8/2018 | Simon et al. | |
| 2018/0218455 A1 | 8/2018 | Kolb et al. | |
| 2018/0225769 A1 | 8/2018 | Slusar et al. | |
| 2018/0285979 A1 | 10/2018 | Chessell et al. | |
| 2018/0293446 A1 | 10/2018 | Becker et al. | |
| 2018/0342036 A1* | 11/2018 | Zachary | H04W 4/44 |
| 2018/0345981 A1 | 12/2018 | Ferguson et al. | |
| 2018/0373263 A1 | 12/2018 | Gray | |
| 2018/0374131 A1 | 12/2018 | Currie et al. | |
| 2018/0374283 A1 | 12/2018 | Pickover et al. | |
| 2019/0016342 A1 | 1/2019 | Fredman | |
| 2019/0019186 A1 | 1/2019 | Falah et al. | |
| 2019/0034404 A1 | 1/2019 | Anderson et al. | |
| 2019/0036946 A1 | 1/2019 | Ruvio et al. | |
| 2019/0039545 A1 | 2/2019 | Kumar et al. | |
| 2019/0039609 A1 | 2/2019 | Wood et al. | |
| 2019/0044700 A1 | 2/2019 | Leddy | |

(56) References Cited

U.S. PATENT DOCUMENTS

| | | |
|---|---|---|
| 2019/0080325 A1 | 3/2019 | Pourfallah et al. |
| 2019/0147438 A1 | 5/2019 | Micali et al. |
| 2019/0191284 A1 | 6/2019 | Tran et al. |
| 2019/0197620 A1 | 6/2019 | Jayaram et al. |
| 2019/0354966 A1 | 11/2019 | Himura et al. |
| 2019/0392437 A1 | 12/2019 | Castagna et al. |
| 2019/0392438 A1 | 12/2019 | Rice |
| 2020/0058071 A1 | 2/2020 | Yang |
| 2020/0065763 A1 | 2/2020 | Rosinzonsky et al. |
| 2020/0177373 A1 | 6/2020 | Komandur et al. |
| 2020/0226677 A1 | 7/2020 | Dhawan et al. |
| 2020/0250753 A1 | 8/2020 | Blount |
| 2020/0272966 A1 | 8/2020 | Kirkegaard |
| 2020/0279328 A1 | 9/2020 | Zhiri et al. |
| 2020/0341971 A1 | 10/2020 | Krishnaswamy et al. |
| 2020/0394321 A1 | 12/2020 | Ramos et al. |
| 2020/0394322 A1 | 12/2020 | Ramos et al. |
| 2020/0409937 A1 | 12/2020 | Wang et al. |
| 2021/0065293 A1 | 3/2021 | Sigler et al. |
| 2021/0090037 A1 | 3/2021 | Dowding |
| 2021/0174442 A1 | 6/2021 | Trudeau et al. |

OTHER PUBLICATIONS

Cointelegraph, "HashCoin Uses Emercoin Blockchain for Vehicle Registration and Tracking". Retrieved from the Internet at: <https://cointelegraph.com/news/hashcoin-uses-emercoin-blockchain-for-vehicle-registration-and-tracking> (2018).

Crosby et al., BlockChain Technology: Beyond Bitcoin, Applied Innovation Review, Issue No. 2, 16 pp. (Jun. 2016).

Jost et al., "The Hawala Alternative Remittance System and Its Role in Money Laundering", published in Jan. 2000, 27 pages.

Knight, Digitizing processes end-to-end with blockchain, Accenture Insurance Blog (2016).

Legal definition of "Dispute", downloaded from the Internet at: <https://legal-dictionary.thefreedictionary.com/Dispute>(2008).

Lorenz et al., Blockchain in insurance—opportunity or threat?, McKinsey & Company, 9pp. (Jul. 2016).

Naujoks et al., Digitalization in Insurance: The Multibillion Dollar Opportunity, Bain & Company (2017).

Pricewaterhouse Coopers LLP, "Blockchain in the insurance sector". Retrieved from the Internet at:<www.pwc.com/structure> (2016.).

Report of the US Secretary of Treasury to US Congress, Nov. 2002, 47 pages.

Report to US Congress submitted by US Treasury Secretary, Board of Governors of the Federal Reserve System, and the Securities and Exchange Commission, on Dec. 31, 2002, 40 pages.

Thompson, "Misplaced Blame: Islam, Terrorism and the Origins of Hawala", published in 2007, Max Planck UN Year Book vol. 11, 28 pages.

U.S. Appl. No. 15/955,777, Final Office Action, dated Apr. 22, 2020.
U.S. Appl. No. 15/955,777, Nonfinal Office Action, dated Dec. 12, 2019.
U.S. Appl. No. 15/955,777, Nonfinal Office Action, dated Jun. 15, 2020.
U.S. Appl. No. 15/955,777, Notice of Allowance, dated Sep. 1, 2020.
U.S. Appl. No. 15/955,802, Final Office Action, dated May 1, 2020.
U.S. Appl. No. 15/955,802, Nonfinal Office Action, dated Jan. 6, 2021.
U.S. Appl. No. 15/955,802, Nonfinal Office Action, dated Nov. 26, 2019.
U.S. Appl. No. 15/956,541, Final Office Action, dated May 20, 2020.
U.S. Appl. No. 15/956,541, Nonfinal Office Action, dated Dec. 10, 2019.
U.S. Appl. No. 15/956,541, Nonfinal Office Action, dated Jan. 7, 2021.
U.S. Appl. No. 15/956,558, Final Office Action, dated Jan. 8, 2021.
U.S. Appl. No. 15/956,558, Final Office Action, dated May 1, 2020.
U.S. Appl. No. 15/956,558, Nonfinal Office Action, dated Nov. 27, 2019.
U.S. Appl. No. 15/956,558, Nonfinal Office Action, dated Sep. 18, 2020.
U.S. Appl. No. 15/956,578, Final Office Action, dated Dec. 1, 2020.
U.S. Appl. No. 15/956,578, Nonfinal Office Action, dated Jun. 15, 2020.
U.S. Appl. No. 15/957,243, Final Office Action, dated Jun. 1, 2020.
U.S. Appl. No. 15/957,243, Nonfinal Office Action, dated Nov. 25, 2019.
U.S. Appl. No. 15/957,243, Notice of Allowance, dated Oct. 16, 2020.
U.S. Appl. No. 15/957,438, Final Office Action, dated May 8, 2020.
U.S. Appl. No. 15/957,438, Nonfinal Office Action, dated Dec. 19, 2019.
U.S. Appl. No. 15/957,438, Nonfinal Office Action, dated Oct. 14, 2020.
U.S. Appl. No. 15/957,438, Notice of Allowance, dated Aug. 4, 2020.
U.S. Appl. No. 15/957,243, Corrected Notice of Allowability, dated Dec. 2, 2020.
U.S. Appl. No. 15/956,578, Nonfinal Office Action, dated Aug. 18, 2021.
U.S. Appl. No. 15/957,438, Nonfinal Office Action, dated Aug. 27, 2021.
U.S. Appl. No. 16/999,260, Nonfinal Office Action, dated Jul. 16, 2021.
U.S. Appl. No. 15/956,541, Final Office Action, dated Jul. 2, 2021.
U.S. Appl. No. 15/955,802, Final Office Action, dated Jun. 28, 2021.
U.S. Appl. No. 16/999,260, Nonfinal Office Action, dated Nov. 19, 2021.
U.S. Appl. No. 17/064,711, Notice of Allowance, dated Oct. 17, 2022.
U.S. Appl. No. 17/740,264, Notice of Allowance, dated Sep. 22, 2022.
U.S. Appl. No. 17/892,040, Notice of Allowance, dated Jan. 3, 2023.
U.S. Appl. No. 17/989,562, Notice of Allowance, dated Mar. 29, 2023.

* cited by examiner

EVIDENCE ORACLES

CROSS REFERENCES TO RELATED APPLICATIONS

This application is a continuation of U.S. patent application Ser. No. 17/064,711, entitled "Evidence Oracles," and filed Oct. 7, 2021, which is a continuation of U.S. patent application Ser. No. 15/955,777, entitled "Evidence Oracles," and filed Apr. 18, 2018, which claims priority to (1) U.S. Provisional Application No. 62/555,030, entitled "Using a Blockchain for the Subrogation Claim Process", and filed Sep. 6, 2017; (2) U.S. Provisional Application No. 62/554,907, entitled "Blockchain-Based Claim Handling," and filed Sep. 6, 2017; (3) U.S. Provisional Application No. 62/555,358, entitled "Using a Blockchain for the Subrogation Claim Process", and filed Sep. 7, 2017; and (4) U.S. Provisional Application No. 62/595,803, entitled "Evidence Oracles", and filed Dec. 7, 2017, each of which is hereby incorporated herein by reference in its entirety.

TECHNICAL FIELD

Systems and methods are disclosed with respect to using a blockchain for managing the subrogation claim process related to a vehicle collision, in particular, utilizing evidence oracles as part of the subrogation process.

BACKGROUND

The insurance claim process may involve a tremendous number of communications and interactions between parties involved in the process. Potential parties to the claim process may be insurance companies, repair shops, lawyers, arbitrators, government agencies, hospitals, drivers, and collection/collections agency. Sometimes the costs of repairs may be disputed and parties may pursue subrogation for particular charges. As an example, when an insured person suffers a covered loss, an insurer may pay costs to the insured person and pursue subrogation from another party involved in the loss. If an insured vehicle is involved in a collision and suffers a loss, the insurer may compensate the vehicle owner according to an insurance agreement. If, for example, the vehicle owner was not at fault in the collision, the insurer may pursue damages from another party, such as the insurer of the party who was at fault in the collision. An insurance agreement may include an obligation of an insured to assign the insured's claim against a party at fault to the insurer, who may then collect on the claim on the insured's behalf.

Settling a subrogation payment may be a lengthy, complicated process. The various parties (e.g., parties at fault in a vehicle collision, owners of the vehicles, insurers, etc.) may need to exchange information relating to the collision to determine which party was at fault. Sources of information relevant to a fault information and/or subrogation payment may include information regarding parties involved in a loss, forensic data regarding the loss, vehicle data regarding a loss, etc. The various parties may verify and share information from a variety of sources, including information held by parties involved in a loss and their insurers, and information obtained from third parties (e.g., governmental entities, independent contractors, etc.).

The parties to a subrogation payment (e.g., insurers) may make proposals to one another to settle the subrogation claim. A proposal may include an accounting of damages, such as the costs to a vehicle owner whose vehicle was damaged. If an insured person suffered an injury in a collision, the injured person's health care costs may be included in the accounting of damages. One or both of the parties to a subrogation claim may rely on independent third parties to assess costs, such as a repair cost estimate by an authorized automotive repair services provider for damage incurred in a collision. To settle the subrogation claim, the parties may indicate acceptance or approval of damages calculations and a payment amount that is agreed between the parties to settle the claim. Parties may rely on a third-party intermediary to handle subrogation negotiations and resolution (e.g., validate information relating to a loss and facilitating communications between the insurers) at added expense.

BRIEF SUMMARY

Systems and methods are disclosed for utilizing a distributed ledger, or blockchain, to manage an insurance claim process, in particular, a subrogation claim process. The systems and methods disclose using evidence oracles for inputting information into the blockchain, utilizing machine learning to suggest amounts for the subrogation process, a line item dispute mechanism, and/or creating/managing a distributed ledger in response to a vehicle being in an collision. The methods and systems may make use of secure transactions and smart contracts stored on the blockchain.

The present embodiments further relate to insurance and handling insurance claims. Sensor, image, or other data may be collected from various sources, such as mobile devices, one or more vehicles (such as smart or autonomous vehicles), smart infrastructure, satellites, drones, and/or smart or interconnected homes. The data collected may be analyzed by artificial intelligence or machine learning algorithms to identify whether a vehicle collision occurred; determine a percentage of fault (for the drivers or autonomous vehicles); determine the veracity of an insurance claim or identify potential fraud or buildup; facilitate subrogation or arbitration processes; determine and assign liability to vehicle manufacturers or drivers; create new blockchains and/or individual blocks for blockchains associated with a particular insurance claim, individual, or vehicle; provide payments or e-payments among parties; and/or facilitate other functionality discussed herein.

In one aspect, a computer-implemented method for providing data relevant to collision s and subrogation claims by interacting with a distributed ledger maintained by a plurality of participants may be provided. The method may include, via one or more local or remote processors, servers, sensors, and/or associated transceivers: (1) receiving, at one or more processors, recorded data from one or more connected devices at a geographic location; (2) analyzing, at the one or more processors, the recorded data, wherein analyzing the recorded data may include determining that an collision has occurred involving one or more vehicles; (3) generating, at the one or more processors, a transaction including the data indicative of the collision based upon the analysis; and/or (4) transmitting, at the one or more processors, the transaction to at least one other participant in the distributed ledger network. The method may include additional, less, or alternate actions, including those discussed elsewhere herein.

In another aspect, a computer-implemented method for providing data relevant to collisions and subrogation claims by interacting with a distributed ledger maintained by a plurality of participants may be provided. The method may include, via one or more local or remote processors, servers, sensors, and/or associated transceivers: (1) receiving, at one or more processors, a request for recorded data from at least one other participant in the distributed ledger network; (2) verifying, at the one or more processors, an access level for the at least one other participant; (3) analyzing, at the one or more processors, the request for recorded data, wherein analyzing may include determining data relevant to the request; (4) generating, at the one or more processors, a transaction including the data relevant to the request; and/or (5) transmitting, at the one or more processors, the transaction to the at least one other participant in the distributed ledger network. The method may include additional, less, or alternate actions, including those discussed elsewhere herein.

In yet another aspect, a computer system configured to handle or process an insurance claim via a shared ledger may be provided. The system may include one or more processors, servers, sensors, and/or associated transceivers configured to: (1) receive recorded data from one or more connected devices at a geographic location; (2) analyze the recorded data, wherein analyzing the recorded data may include determining that an collision has occurred involving one or more vehicles; (3) generate a transaction including the data indicative of the collision based upon the analysis; and/or (4) transmit the transaction to at least one other participant in the distributed ledger network. The system may include additional, less, or alternate components and actions, including those discussed elsewhere herein.

The methods may be implemented via computer systems, and may include additional, less, or alternate actions or functionality. Systems or computer-readable media storing instructions for implementing all or part of the method described above may also be provided in some aspects. Systems for implementing such methods may include one or more of the following: a special-purpose computing device, a personal electronic device, a mobile device, a wearable device, a processing unit of a vehicle, a remote server, one or more sensors, one or more communication modules configured to communicate wirelessly via radio links, radio frequency links, and/or wireless communication channels, and/or one or more program memories coupled to one or more processors of the personal electronic device, processing unit of the vehicle, or remote server. Such program memories may store instructions to cause the one or more processors to implement part or all of the method described above. Additional or alternative features described herein below may be included in some aspects.

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and are instrumentalities shown, wherein.

Figure 1:
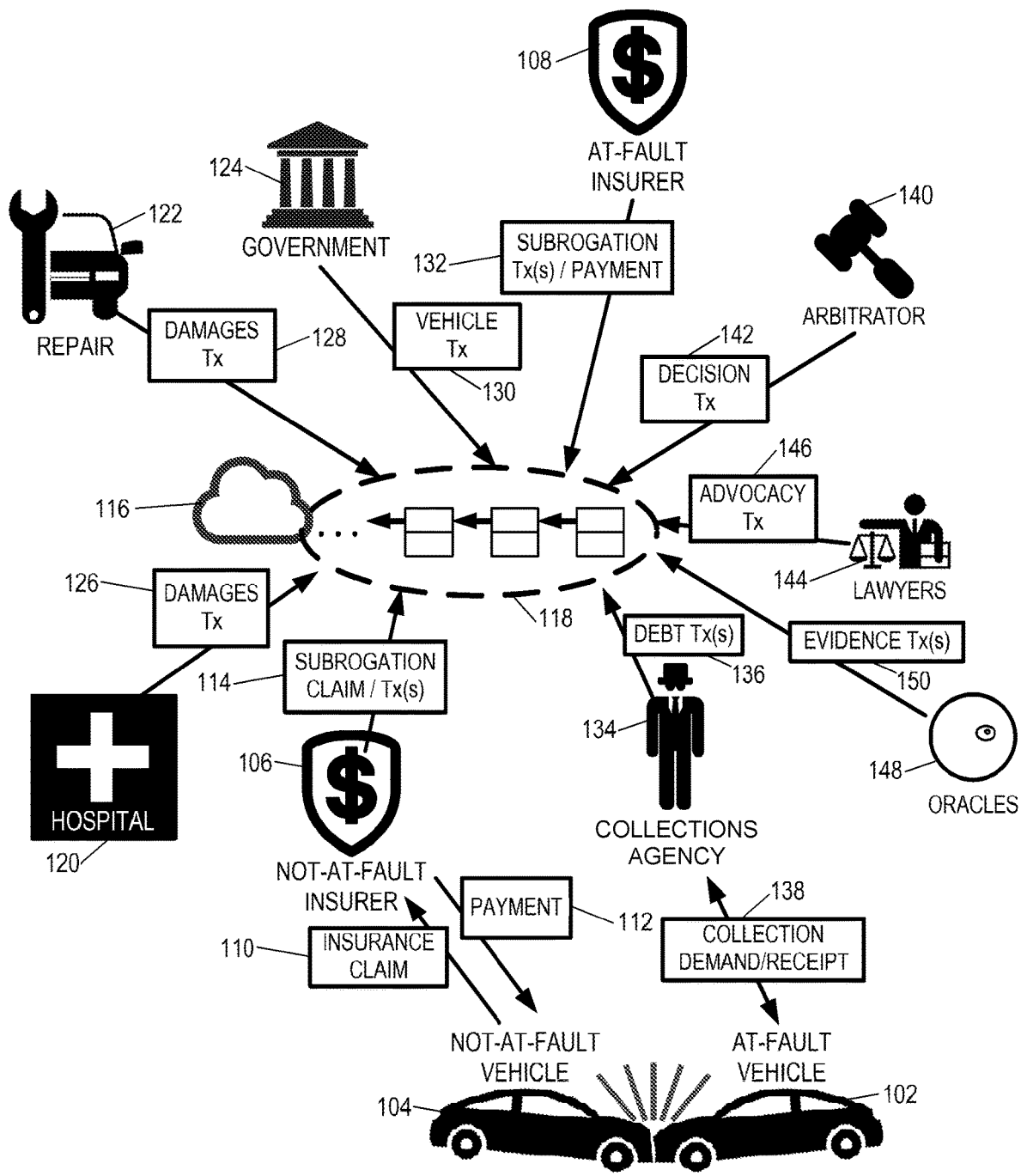
FIG. 1 is a schematic diagram of an exemplary shared ledger system for managing and resolving subrogation claims with arbitration, in accordance with one aspect of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Traditionally, businesses, customers, and central authorities, such as those involved in an insurance claim, have stored information related to transactions, and records of transactions, in databases or ledgers. Often these databases and ledgers may be held by the participants and must be reconciled to achieve consensus as to the validity of the information stored therein. Alternatively, a central authority may be responsible for determining the validity of information stored in a database or a ledger and functioning as an arbiter of consensus for interested parties, such as a recorder of deeds, an asset exchange, etc.

A blockchain (also referred to herein as a distributed ledger or a shared ledger) is a way of achieving a distributed consensus on the validity or invalidity of information in the chain. In other words, the blockchain provides a decentralized trust to participants and observers. As opposed to relying on a central authority, a blockchain is a decentralized database in which a transactional record of changes to the ledger is maintained and validated by each node of a peer-to-peer network. The distributed ledger is comprised of groupings of transactions organized together into a "block," and ordered sequentially (thus the term "blockchain"). Nodes may join and leave the blockchain network over time and may obtain blocks that were propagated while the node was gone from peer nodes. Nodes may maintain addresses of other nodes and exchange addresses of known nodes with one another to facilitate the propagation of new information across the network in a decentralized, peer-to-peer manner.

The nodes that share the ledger form what is referred to herein the distributed ledger network. The nodes in the distributed ledger network validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. A consensus rule may require that blocks and transactions adhere to format requirement and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.).

Additions to the blockchain that satisfy the consensus rules are propagated from nodes that have validated the addition to other nodes that the validating node is aware of. If all the nodes that receive a change to the blockchain validate the new block, then the distributed ledger reflects the new change as stored on all nodes, and it may be said that distributed consensus has been reached with respect to the new block and the information contained therein. Any change that does not satisfy the consensus rule is disregarded by validating nodes that receive the change and is not propagated to other nodes. Accordingly, unlike a traditional system which uses a central authority, a single party cannot unilaterally alter the distributed ledger unless the single party can do so in a way that satisfies the consensus rules. The inability to modify past transactions leads to blockchains being generally described as trusted, secure, and immutable. Third party intermediaries who assist in the resolution of subrogation claims may thus be disintermediated from the process by a decentralized blockchain.

The validation activities of nodes applying consensus rules on a blockchain network may take various forms. In one implementation, the blockchain may be viewed as a shared spreadsheet that tracks data such as the ownership of assets. In another implementation, the validating nodes execute code contained in "smart contracts" and distributed consensus is expressed as the network nodes agreeing on the output of the executed code.

A smart contract is a computer protocol that enables the automatic execution and/or enforcement of an agreement between different parties. In particular, the smart contract may be computer code that is located at a particular address on the blockchain. In some cases the smart contract may run automatically in response to a participant in the blockchain sending funds (e.g., a cryptocurrency such as bitcoin, ether, or other digital/virtual currency) to the address where the smart contract is stored. Additionally, smart contracts may maintain a balance of the amount of funds that are stored at their address. In some scenarios when this balance reaches zero the smart contract may no longer be operational.

The smart contract may include one or more trigger conditions, that, when satisfied, correspond to one or more actions. For some smart contracts, which action(s) from the one or more actions are performed may be determined based upon one or more decision conditions. In some instances, data streams may be routed to the smart contract so that the smart contract may detect that a trigger condition has occurred and/or analyze a decision condition.

Blockchains may be deployed in a public, decentralized, and permissionless manner meaning that any party may view the shared ledger, submit new information to be added to the ledger, or join the network as a validating node. Other blockchains are private (e.g., permissioned ledgers) that keep chain data private among a group of entities authorized to participate in the blockchain network. Other blockchain implementations may be both permissioned and permissionless whereby participants may need to be validated, but only the information that participants in the network wish to be public is made public.

The present embodiments relate to, inter alia, systems and methods for using a blockchain to record and manage information related to resolution of a subrogation claim (e.g., a "subrogation" blockchain). The subrogation blockchain may be either a public or permissioned ledger. In particular, certain embodiments discussed herein relate to the use of "evidence oracles," as part of a subrogation blockchain. These evidence oracles may interact with the blockchain and send information, such as evidence related to a subrogation claim, to the blockchain.

Exemplary Shared Ledger for Resolving Subrogation Claims

FIG. 1 depicts an exemplary shared ledger system 100 for resolving insurance claims, and more particularly, subrogation claims in accordance with one aspect of the present disclosure. Participants in the shared ledger system 100 may be insurance companies 106 and 108, repair shops 122, lawyers 144, arbitrators 140, government agencies 124, hospitals 120, vehicles 102 and 104, collection/collections agency 134, and evidence oracles 148. The claims process can be problematic in many regards, such as identifying what evidence is related to, and valid for, a collision, determining proper subrogation amounts, and negotiating what line items each party is responsible for. These problems, and others addressed herein, may be obviated through the use of a distributed ledger. For example, evidence oracles that record information occurring in the physical world may transmit that information to a distributed ledger where it can be used in the claims process. An automated recommendation engine powered by artificial intelligence can be used to suggest subrogation payment amounts. The line item negotiation may be done through transactions on the blockchain where all the necessary parties can see the information. Lastly, to facilitate the claims process a connected vehicle involved in a crash can create its own distributed ledger, or update an existing distributed ledger with relevant information to the claims process. These solutions can be used for the claims process generally, or more particularly, for a subrogation claim process.

For a subrogation claim, when an insured party, such as the owner of not-at-fault vehicle 104 experiences a covered loss, for example in a collision with at-fault vehicle 102, the owner of not-at-fault vehicle 104 may submit an insurance claim 110 to an insurer 106. The insurer 106 may have a contractual obligation to remit a payment 112 (such as crypto or digital currency) to the owner of the not-at-fault vehicle in exchange for assignment of any legal claim the owner of not-at-fault vehicle may have against the owner or operator of at-fault vehicle 102 for damage and expenses associated with the collision.

After insurer 106 has remitted payment 112 (such as real dollars, or a crypto or digital currency) to the owner of the not-at-fault vehicle 104 and receive assignment of the vehicle owner's claim against the owner or operator of at-fault vehicle 102, the insurer 106 may initiate a process of managing and resolving the legal claim against the owner or operator of the at-fault vehicle 102 or against an insurer 108 of the at-fault vehicle (e.g., a subrogation claim). The shared ledger system 100 may include a blockchain 118 accessible by network participants via a network 116 (e.g., a private or public packet switched network). To begin the blockchain subrogation claim resolution process, the insurer 106 may broadcast a subrogation claim or transaction 114 to the blockchain 118.

The blockchain 118 may be a network wherein participating network nodes validate changes to a ledger based upon transactions broadcast by other network participants. The transaction 114 may include information relating to the subrogation claim that may be modified by subsequent transactions broadcast over the network 116. In another implementation, validators on the blockchain 118 are configured to maintain a state database and execute code in smart contracts deployed by network participants. A smart contract on the blockchain 118 may expose methods and maintain the state of data relating to a subrogation claim by the insurer 106 against the insurer 108 relating to an insured loss covered by the insurer 106.

After a subrogation claim 114 has been lodged by insurer 106, information relating to the covered loss may be collected by other parties that were involved in the collision to evaluate the subrogation claim. For example, a hospital 120 may broadcast a damages transaction 126 to the blockchain 118 that includes evidence of medical bills incurred as part of the collision. An automotive services repair provider 122 may broadcast a transaction 128 to supply information regarding repair services estimated or rendered as a result of the collision. A government entity 124 may supply evidence relating to the collision in vehicle transaction 130. Vehicle transaction 130 may include information relating to one or more of the vehicles 102 and 104 involved in the collision relevant to the subrogation claim (e.g., registration status, registered owner, legal title information, police reports regarding the collision, driving records of the drivers involved in the collision, lien information regarding the vehicles 102 and 104, etc.).

Evidence may also be supplied by evidence oracles 148 through the use of evidence transactions 150. These evidence oracles may be devices connected to the internet that record information about the physical environment around them. For example, the evidence oracles may be connected video cameras, traffic cameras, road sensors, motion sensors, environmental conditions sensors (e.g., measuring atmospheric pressure, humidity, etc.) as well as other Internet of Things (IoT) devices. The oracles 148 may package their data into transactions 150 that are submitted to a blockchain.

When entities broadcast transactions to the blockchain 118 to initiate or add data to a subrogation claim, the transactions may be accompanied by a proof-of-identity of the entity broadcasting the transaction. In one implementation, a cryptographic proof-of-identity is included in transactions sent to the blockchain. For example, each of the entities 106, 108, 120, 122, and 124 may own private cryptographic keys that are associated with public cryptographic keys known to belong to the entity (e.g., public cryptographic keys associated with each of the entities may be published by a trusted third party or proven to other network participants, etc.). An entity wishing to broadcast a transaction to the blockchain 118 may sign a cryptographic message in the transaction with the entity's private cryptographic key to prove the identity of the entity broadcasting the transaction. In this way, other network participants may be provided with cryptographic proof that the information contained in the broadcast transaction was originated by the participating entity.

After entities such as the hospital 120, automotive repair services provider 122, government agency 124, etc. have supplied information relevant to the subrogation claim, the subrogation claim defendant insurer 108 may broadcast one or more subrogation transactions 132 to the blockchain 118 to indicate acceptance or rejection of the various components of the subrogation claim. For example, if the subrogation claim defendant 108 disputes that medical care provided by the hospital 120 was caused by the collision, and thus would form a proper basis for liability to the subrogation claimant insurer 106, the subrogation defendant insurer 108 may broadcast a transaction marking the damages transaction 126 as disputed or not agreed. In response, the insurer 106 may broadcast a transaction 114 to respond to the subrogation defendant 108's rejection, such as lowering the damages claimed as part of the medical costs incurred at the hospital 120, adding more evidence of the nature of the medical services rendered by the hospital 120, etc.

If the subrogation defendant insurer 108 accepts the damages associated with the subrogation claim brought by the claimant insurer 106, the subrogation defendant insurer 108 may broadcast a transaction 132 to the blockchain 118 to indicate a resolution of the subrogation claim for the amount reflected by the blockchain 118. Alternatively, or additionally, the subrogation defendant insurer 108 may broadcast a transaction to the blockchain 118 reflecting payment of the subrogation claim (including either real dollars, or a crypto or digital currency) and/or may broadcast a transaction sending a token having value that circulates on the blockchain 118 to the insurer claimant 106.

Alternatively, one or more of the parties to the subrogation claim (e.g., the insurers, the parties to the loss, etc.) may demand resolution of the subrogation claim by a third party. In some implementations, parties may indicate lawyers 144 are desired to advance the subrogation claim, such as in a court of law for example. In another implementation, a third party who may resolve the subrogation claim on the blockchain 118 is an arbitrator 140.

Another third party that may be involved in the subrogation claim on the blockchain 118 is collection/collections agency 134. Upon resolution of a claim, the prevailing party may experience difficulty in collecting any judgment owed. As such, the prevailing party may indicate interest in debt collection services from collection/collections agency 134 in much the same way as the parties indicate desire for arbitration or for lawyers to take the case.

Figure 2:
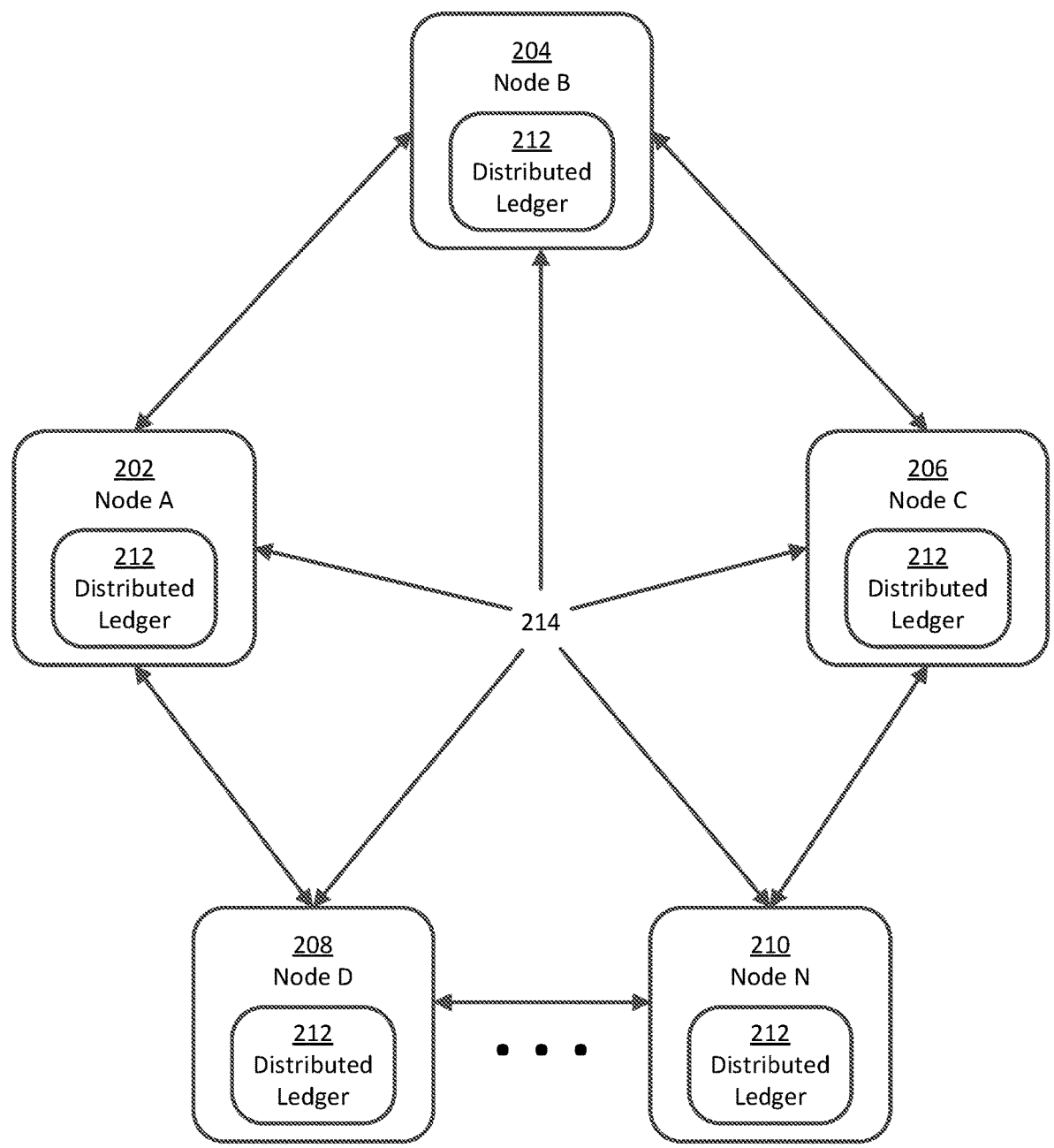
FIG. 2 depicts an exemplary shared ledger system for resolving subrogation claims, in accordance with one aspect of the present disclosure.

Exemplary Validating Nodes in a Distributed Ledger System for Managing Insurance Claims FIG. 2 depicts an exemplary shared ledger system 200 for managing insurance claims, including subrogation claims in accordance with one aspect of the present disclosure. The system 200 includes a shared distributed ledger 212 and plurality of nodes 202, 204, 206, 208, and 210. Each node maintains a copy of the distributed ledger 212. As changes are made to the distributed ledger 212, each node received the change via network 214 updates its respective copy of the shared distributed ledger 212. A consensus mechanism may be used by the nodes 202-210 in the shared ledger system 200 to decide whether it is appropriate to make received changes to the distributed ledger 212.

Each node in the system therefore has its own copy of the distributed ledger 212, which is identical to every other copy of the distributed ledger 212 stored by the other nodes. The shared ledger system 200 may be more robust than a central authority database system because of the shared ledger's decentralized nature. As such, there is no single point of failure on the shared ledger system 200 as there would be in a centralized system.

Exemplary Transaction Flow & Block Propagation Flow

Figure 3:
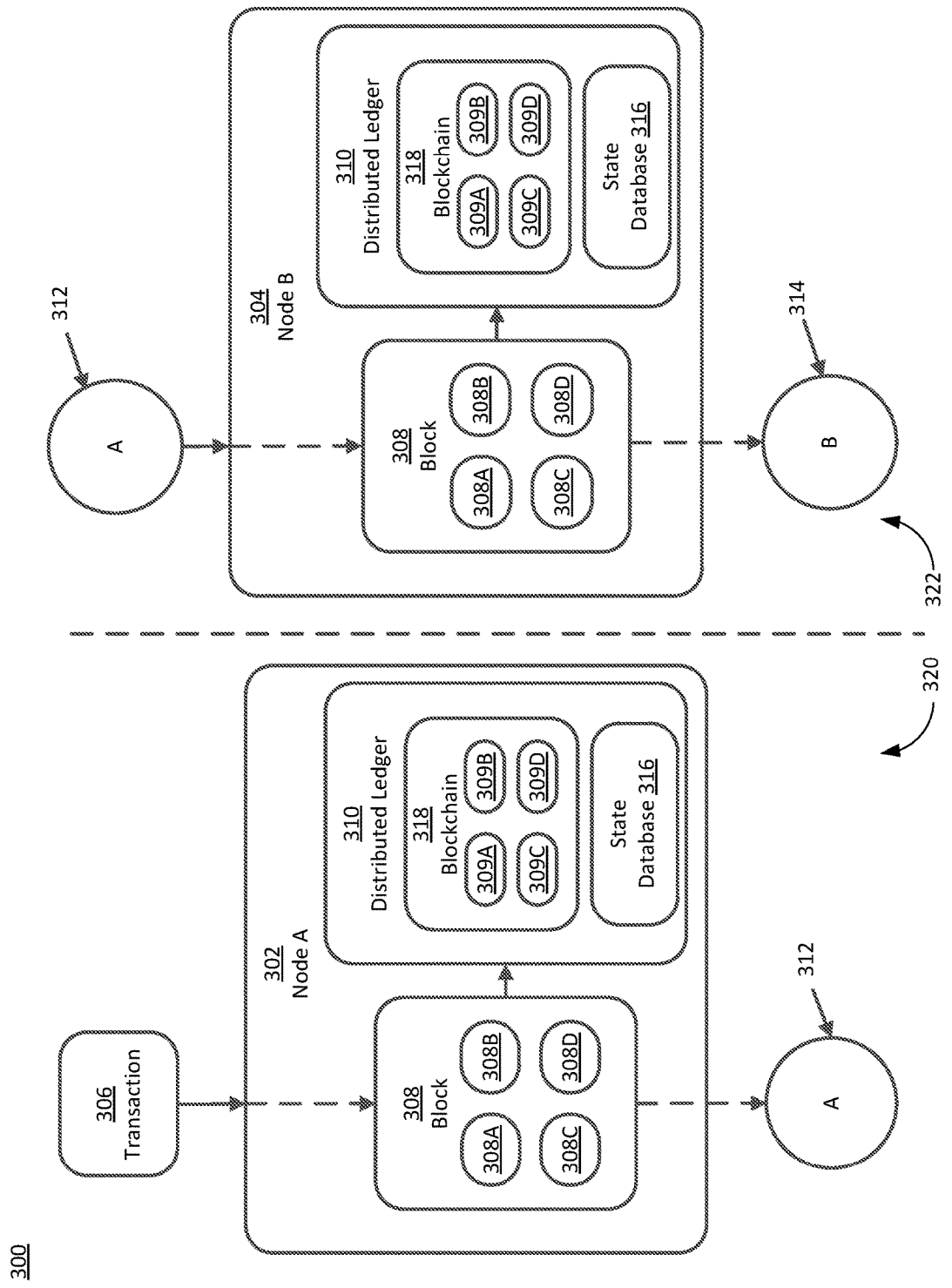
FIG. 3 depicts exemplary validating network nodes and an exemplary transaction flow on a shared ledger network for resolving subrogation claims, in accordance with one aspect of the present disclosure.

FIG. 3 depicts exemplary validating network nodes and an exemplary transaction flow 300 on a shared ledger network for resolving transactions, in accordance with one aspect of the present disclosure. FIG. 3 includes two time frames 320 and 322 represented by the left and right sides of the dotted line, respectively, Node A 302 and Node B 304, a set of transactions 308A-308D, a set of blocks of transactions 309A-309D, a distributed ledger 310, and a blockchain 318.

The block propagation flow 300 may begin with Node A 302 receiving transaction 306 at time 320. When Node A 302 confirms that transaction 306 is valid, the Node A 302 may add the transaction to a newly generated block 308. As part of adding the transaction 306 to block 308, Node A 302 may solve a cryptographic puzzle and include the solution in the newly generated block 308 as proof of the work done to generate the block 308. Alternatively, a proof of stake algorithm may be used to generate the block 308, whereby the Node A 302 "stakes" an amount of a digital token used on the network, however, the network itself determines the node that will mint the new block. In other embodiments, the transaction 306 may be added to a pool of transactions until a sufficient number of transactions in the pool exist to form a block. Node A 302 may transmit the newly created block 308 to the network at 312. Before or after propagating the block 308, Node A 302 may add the block 308 to its copy of the blockchain 318.

The transactions 309A-309D may include updates to a state database 316. The state database 316 may contain current values of variables created by smart contracts deployed on the blockchain 318. Validated blocks, such as block 308, may include transactions affecting state variables in state database 316. At time 322, Node B 304 may receive the newly created block 308 via the network at 312. Node B 304 may verify that the block of transactions 308 is valid by checking the solution to the cryptographic puzzle provided in the block 308. If the solution is accurate, then Node B 304 may add the block 308 to its blockchain 318 and make any updates to the state database 316 as rejected by the transactions in block 308. Node B 304 may then transmit the block 308 to the rest of the network at 314.

Exemplary Node

Figure 4:
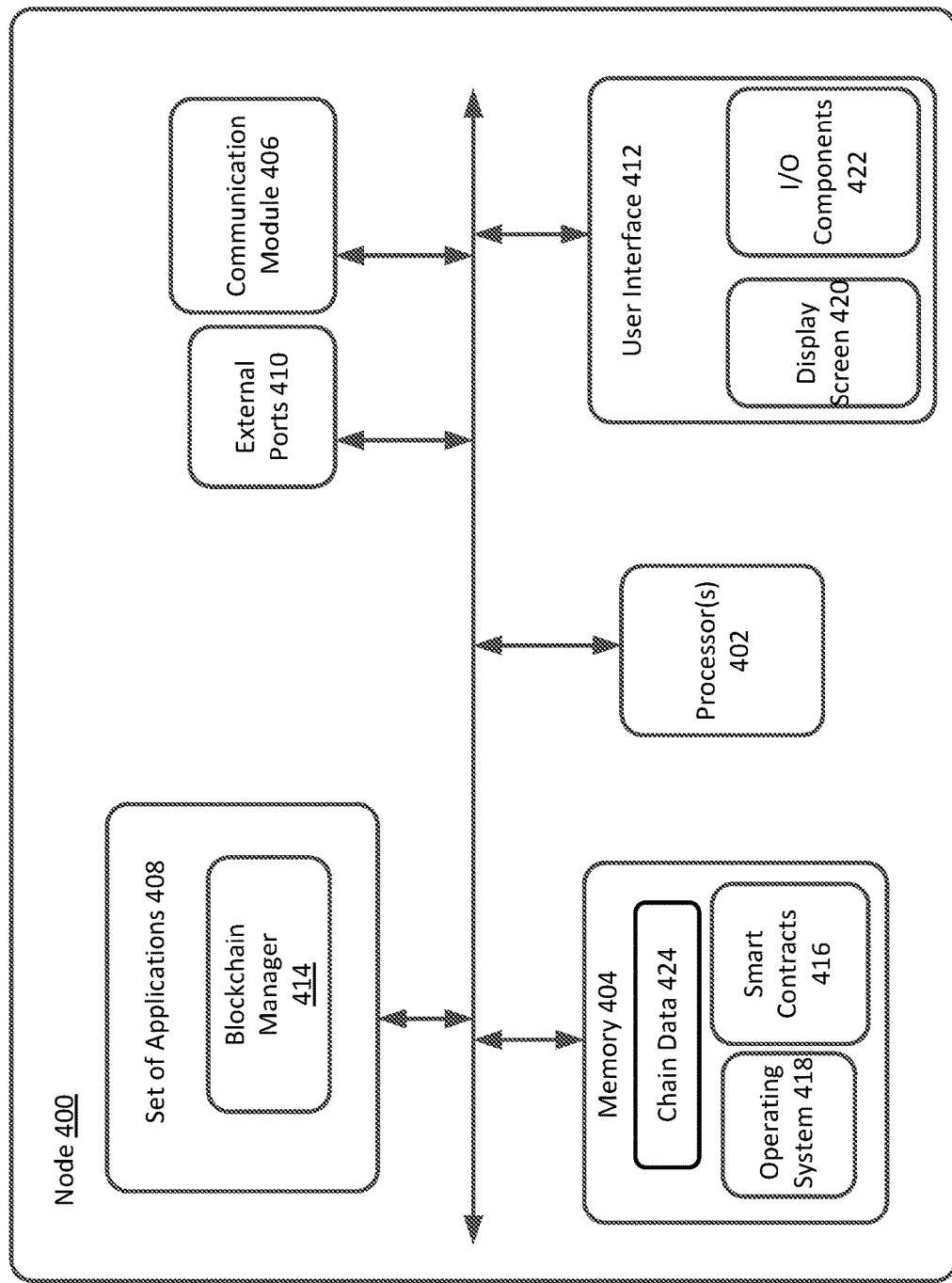
FIG. 4 depicts exemplary components of a network node on a shared ledger network for resolving subrogation claims, in accordance with one aspect of the present disclosure.

FIG. 4 depicts exemplary components of a network node 400 on a shared ledger network for resolving subrogation claims in accordance with one aspect of the present disclosure. Node 400 is capable of performing the functionality disclosed herein. Node 400 may include at least one processor 402, memory 404, a communication module 406, a set of applications 408, external ports 410, user interface 412, a blockchain manager 414, smart contracts 416, operating system 418, a display screen 420, and input/output components 422. In some embodiments, the node 400 may generate a new block of transactions, or may broadcast transactions to other network nodes by using the blockchain manager 414. Similarly, the node 400 may use the blockchain manager 414 in conjunction with the smart contracts 416 stored in memory 404 to execute the functionality disclosed herein. The memory 404 may further include chain data 424 including, for example, a state database of the blockchain for storing state of smart contracts deployed thereon.

In other embodiments, the smart contracts 416 operate independent of the blockchain manager 414 or other applications. In some embodiments, node 400 does not have a blockchain manager 414, or smart contracts 416 stored at the node. In some embodiments, the node 400 may have additional or less components than what is described. The components of the node 400 are described in more detail below.

The node 400, as part of a decentralized ledger system 112, or another decentralized or centralized network, may be used as part of systems that interact with and/or manipulate data and transactions associated with the automotive claims process, the vehicle loss history process, and/or the vehicle identification number lifecycle process.

Exemplary Smart Contract State

Figure 5:
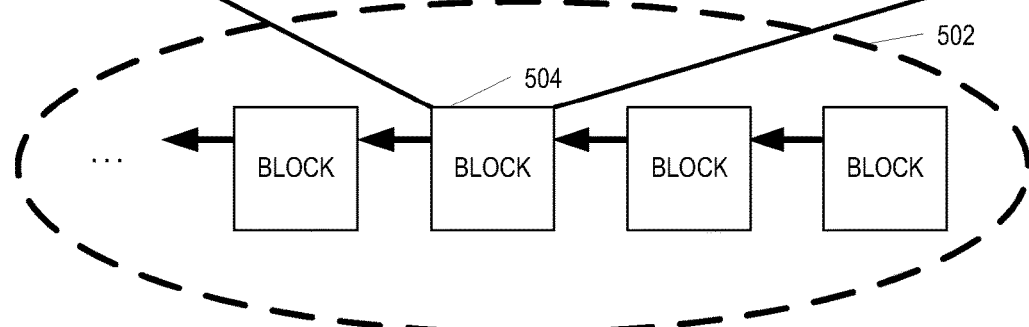
FIG. 5 depicts an exemplary smart contract state in a shared ledger network for resolving subrogation claims, in accordance with one aspect of the present disclosure.

FIG. 5 depicts an exemplary smart contract state 500 in a shared ledger network for resolving subrogation claims in accordance with one aspect of the present disclosure. A smart contract may be deployed by any participant in the subrogation blockchain network (e.g., a subrogation claimant) to establish a contract state 506 for a particular subrogation claim. The deployed smart contract may expose methods and data to other participants in the subrogation blockchain network. Some of the data in the smart contract state may be private data that may only be altered by calling a method of the smart contract, or only altered by authorized blockchain participants.

One way of altering the smart contract state 506 is to broadcast a transaction to the subrogation blockchain 502. If the broadcast transaction satisfies consensus rules, network validators may include the transaction in a block 504. Inclusion in the blockchain 502 of a transaction sending data to the smart contract may cause validating nodes to update a state database, thus allowing network participants access to a rich state mechanism to manage the subrogation process, and ultimately to resolve the subrogation claim.

Subrogation smart contract state 506 may include pieces of data to identify and track the subrogation claim. For example, a contract owner may select a unique ID for the subrogation claim such that subsequent transactions and data sent to the smart contract can identify the contract by ID number. The contract owner may also specify an identity of the subrogation claimant and defendant. In at least one implementation, the subrogation claimant and defendant are identified by cryptographic public keys assigned to the respective entities. Subsequent data sent to the smart contract may include a message signed by private keys corresponding to the public keys identifying the subrogation claimant and defendant in the smart contract, thus providing cryptographic proof that the transaction was originated by one of the parties to the dispute. The private and public keys may be managed solely by the parties to minimize the attack surface for any attackers that might attempt to forge a transaction (e.g., the parties generate public/private cryptographic key pairs offline, and only provide the public key to other network participants). A party's private keys may be generated according to a securely stored seed value (e.g., on a piece of physical paper or multiple copies of a piece of paper) such that the private keys may be recovered in the case of a data loss.

The smart contract state 506 may further include information regarding the basis of the subrogation claim, such as the policy holder and a description of the damages suffered (e.g., date, time, place, etc.). A subrogation blockchain network participant may monitor the blockchain 502 for any subrogation claims that identify the participant as a subrogation defendant. As such, it is not necessary for a subrogation claimant to notify a subrogation defendant "off-chain" of the existence of the claim. A subrogation claimant may additionally make such a notification to the subrogation defendant as a redundant communication.

Resolving a subrogation claim may require assembling evidence of the damages suffered by a policy holder. The evidence may take the form of expert or witness statements (e.g., a statement from a treating doctor that an injury and/or medical care was the result of a collision, statement of a witness to a collision tending to establish the fault of the subrogation defendant's insured vehicle driver, etc.). The evidence may also take the form of documentary evidence (e.g., report from an authorized automotive repair services provider of damage to a vehicle as the result of a collision, a repair estimate, a repair bill for repair services rendered, a certification from a government entity that a vehicle involved in a collision had a valid registration, etc.). Similarly, evidence may be supplied by oracles, such as by the oracles 148 discussed in FIG. 1.

As evidence regarding the subrogation claim is collected from the various entities involved (medical, auto repair, governmental, etc.), these entities may broadcast transactions to the blockchain 502 to reflect the status of the loss and to provide the evidence therefor to other network participants, specifically the subrogation claimant and defendant. For example, a doctor who treated a patient for injuries sustained in a collision may broadcast a transaction sending data to the smart contract to connect the patient's injuries to the collision. The evidence may take the form of a cryptographically signed statement from the doctor attesting to the injuries. The evidence may take the form of a digitized X-ray or other medical record tending to prove the existence of an injury. The evidence may further take the form of medical bills issued by the hospital for services rendered for the injuries.

Like the subrogation claimant and defendant, a doctor or hospital may own a private cryptographic key that corresponds to a public cryptographic key known to belong to the hospital or doctor by the other network participants. By signing any submitted evidence with the private cryptographic key, the hospital or doctor may provide cryptographic proof of identity to the subrogation defendant that the evidence was truly submitted by the doctor or hospital. A subrogation defendant may choose to rely solely on the cryptographic proof offered by the doctor/hospital without separately contacting the doctor/hospital to verify the data. In this way, the blockchain 502 reduces time and cost associated with resolving a subrogation claim.

The subrogation defendant may also submit comments in response to the evidence by broadcasting transactions to the blockchain 502. Additionally, the subrogation claimant may submit comments in response to the subrogation defendant's comments by broadcasting transactions to the blockchain 502, and the subrogation defendant and claimant may have a discussion back and forth that is broadcasted to the blockchain 502. The comments that form the discussion back and forth may be stored as part of the smart contract state data for recordkeeping purposes.

Another aspect of the subrogation smart contract state 506 associated with a subrogation claim may be the smart contract data. Smart contract data may be thought of like the private and public data in an object created according to an object-oriented programming paradigm in that they may be directly updated from outside the object, or they may be updated only in limited ways, such as by calling a method of the smart contract. In at least one implementation, smart contract data may include an indication (e.g., a flag) as to whether the parties to the subrogation claim accept evidence in the smart contract as representative of the damages owed by the subrogation defendant. These flags may be set according to methods in the smart contract that require the caller to prove its identity. The method may only permit, for example, a subrogation defendant to set a flag indicating the subrogation defendant's acceptance of a component of the damages of the subrogation claim. For example, once sufficient evidence relating to the cost of a medical treatment has been included in the smart contract, a subrogation claimant may indicate its approval of the evidence by setting a flag.

A subrogation defendant, upon review of the medical evidence, may choose to either set its corresponding flag to indicate its acceptance of the medical evidence, or it may decline to do so if it disputes the veracity of the evidence. As such, the smart contract state tracks the various components of the damages owed and refines points of dispute for the parties to the subrogation claim. When all sources of evidence for the value of the subrogation claim have been approved by the subrogation claimant and defendant, the value of the claim has been determined and agreed upon, and a subrogation defendant may mark the settlement as agreed by sending data to the smart contract. Additionally, the subrogation defendant may mark the settlement as paid. In at least one implementation, the blockchain 502 includes a circulating token having value with which the subrogation defendant may pay the subrogation claimant.

The smart contract data may also include an indication (e.g., a flag) as to whether each of the parties to the subrogation claim have provided an offer or a counter-offer, and the corresponding amount of the offer or counter-offer. These flags may be set according to methods in the smart contract that require the caller to prove its identity. The method may only permit, for example, the opposing party to set a flag indicating the opposing party's counter-offer and the amount of the counter-offer. For example, when the subrogation defendant submits an offer, only the subrogation claimant may set a flag indicating a counter-offer and the amount of the counter-offer. The offers and counter-offers that represent the negotiation back and forth may be stored as part of the smart contract state data for recordkeeping purposes.

FIG. 5 depicts an exemplary blockchain system 500 in accordance with one aspect of the present disclosure. FIG. 5 includes a blockchain 502, a block of transactions 504, a Merkle Tree 506, and a transaction 508. The Merkle Tree may be the above-referenced Merkle Tree that cryptographically links transactions together. In other embodiments, the blockchain system 500 may utilize a different method of organizing transactions in a block. In some embodiments, the blockchain system 500 includes a plurality of blocks connected together to form a chain of blocks of transactions 502.

In some implementation, the block of transactions 504 may organize the transactions it has received into a Merkle Tree to facilitate access to the stored transactions. The transactions may be hashed using a cryptographic hash algorithm, such as the algorithms discussed above, and the hash of each transaction may be stored in the tree. As the tree is constructed the hash of each adjacent node at the same level may be hashed together to create a new node that exists at a higher level in the tree. Therefore, the root of the tree, or the node at the top of the tree, is dependent upon the hash of each transaction stored below in the tree. Each transaction may include a set of data. The set of data may include identifying data for the transaction, and transaction data identifying the nature of the transaction and what the transaction entails (e.g., input and output addresses, a transaction value, a document hash value, a timestamp, a transaction fee value, etc.).

In one implementation, documents stored "on" a blockchain are documents that have been hashed according to a cryptographic hashing algorithm (e.g., SHA-256) and the resulting output hash has been included in a transaction in a block that has been accepted by the network nodes as satisfying the consensus rules of the blockchain. As such, the documents may be later verified or validated by comparing the hash of the documents to the hash stored on the blockchain. For example, if a set of documents results in a SHA-256 hash that was recorded on a blockchain on a certain date, then the blockchain provides cryptographic proof that the documents existed as of that date.

One way of storing a document on a blockchain is to broadcast a transaction including a hash of the document to the network, which will be included in a block if the transaction satisfies all of the consensus rules of the network. In some implementations, the blockchain is a permissioned ledger, meaning only authorized network participants may broadcast transactions. In other implementations, only some authorized network participants may make certain transactions. For example, vehicle telematics data tending to show which vehicle was at fault in a collision may be uploaded by the vehicle to the blockchain 502 contemporaneously with, or subsequent to, a collision. Only a cryptographic hash of the data may be included in the blockchain 502, such that the data may be verified using the blockchain even if it is obtained by a party off-chain.

Validating network nodes may verify that the signed transaction or signed message was signed by the private cryptographic key corresponding to the published public cryptographic key owned by the authorized vehicle manufacturer. In at least one implementation, a valid proof-of-identity may be applied as a consensus rule by the blockchain network. As such, any transaction attempting to add a new VIN number to the blockchain without a cryptographic proof-of-identity matching an identity authorized to add a new VIN number is rejected by the network as non-compliant with the consensus rule.

Figure 6:
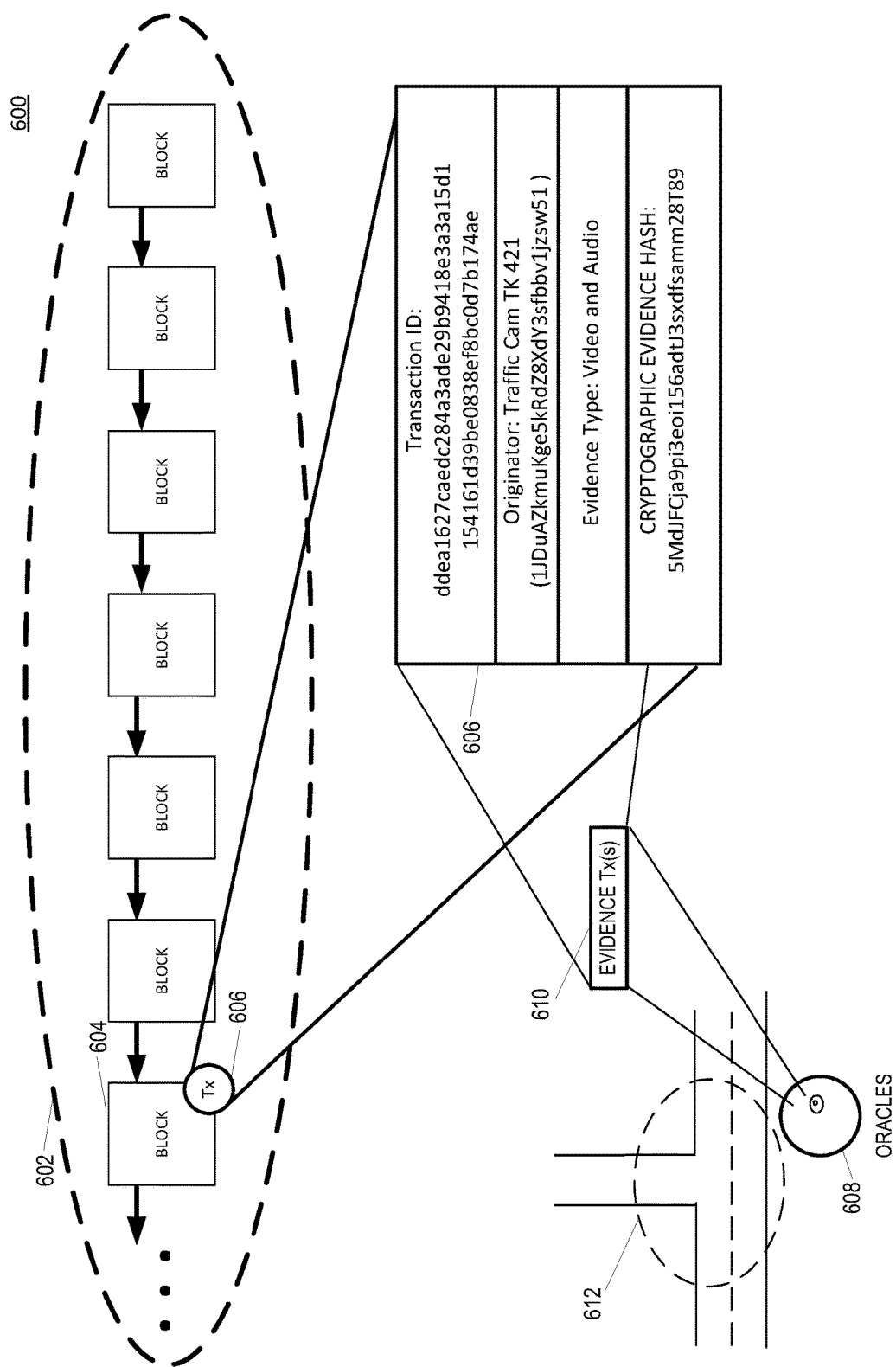
FIG. 6 depicts an exemplary transaction representing an evidence transaction generated by an evidence oracle associated with one aspect of the present disclosure.

FIG. 6 depicts an exemplary transaction 600 representing an evidence transaction generated by an evidence oracle associated with one aspect of the present disclosure. The evidence oracle may collect data on a traffic intersection 612. This intersection may be of interest to insurers if it has a history for being a dangerous intersection where collisions frequently occur. The data may be packaged into a transaction, such as transaction 606. The evidence oracle broadcasts transaction 606 to distributed ledger 602 to be included in a block, such as block 604. The transaction 606 may include data such as a transaction ID, an originator (identified by a cryptographic proof-of-identity, and/or a unique oracle ID), an evidence type, such as video and audio evidence, and a cryptographic hash of the evidence. In another implementation, the evidence is not stored as a cryptographic hash, but is directly accessible in block 604 by an observer or other network participant, such as the participants in a subrogation claim.

Exemplary scenarios and solutions to problems in the claims process, and in particular, the subrogation claims process are described below. These problems, as discussed above, relate to issues surrounding relevant evidence for a collision, and more broadly determining subrogation amounts, determining who is responsible for line items and whether the line items are reasonable, and creating/managing a distributed ledger related to the subrogation process. In some cases this distributed ledger is created by a vehicle involved in the collision, such as a smart or autonomous vehicle. These exemplary solutions may make use of the evidence oracles depicted in FIGS. 1 and 6, as well as other data input into the distributed ledger network. In some cases, the evidence oracles are part of an ongoing effort to report data that may be relevant as evidence to a blockchain network, and in other cases, the data is reported on an "on-call" basis in response to requests for data. Similarly, in some situations the evidence oracles themselves may determine to report data after analyzing the data. The underlying methods and systems may make use of any of the functionality and implementations depicted in FIGS. 1-6.

One exemplary scenario involves the use of an evidence oracle reporting collision data to a blockchain network and their participants. The exemplary scenario may be a collision involving a plurality of cars on roadways, but may also extend to collisions involving automobiles and other types of vehicles, as well as any type of vehicle and a pedestrian(s). In this scenario, data may be packaged into a transaction, such as the transactions described in FIGS. 1-6. Evidence oracles may broadcast transaction(s) to a distributed ledger to be included in a block, such as the blocks described with respect to FIGS. 1-6.

The evidence oracles may be any type of sensor collecting data on the environmental conditions near and at a road intersection. In addition, or alternatively, the evidence oracles may also contain audio and video recording instruments recording events that occur near, or at, the intersection. In some cases evidence oracles may collect different types of evidence. Traditionally, evidence related to vehicle collisions that may be relevant to the collision was collected through an arduous process involving interacting with multiple private and public actors that may or may not have the relevant information. Accordingly, if evidence oracles are participants in a blockchain network they may be able to report relevant evidence data in a much more timely, less resource intensive, and more cost effective manner.

More specifically, in one scenario, automobiles are driving along roadways that include an intersection. At some point the automobiles collide into each other resulting in a collision. The collision may be recorded by evidence oracles. The oracles may record the relevant audio, video, and environmental data that may be useful in processing a claim related to the collision, as well as any future subrogation claims. The collected data may be packaged and included in a transaction that is broadcast to the other participants in a blockchain network. The transaction may eventually be included in a block where it is accessible to other participants in the blockchain network. The collection and the reporting, in the form of a transaction on the blockchain network, of the data relevant to the collision may be done automatically, or in response to a request for data from another participant. For example, the evidence oracles may automatically record data relevant to any activity at the intersection, and this data may be stored in storage space at the evidence oracle, or at a server accessed by the evidence oracle. Accordingly, if the evidence oracle receives a request for data it may, at its discretion, release data relevant to the request to the blockchain network.

Figure 7:
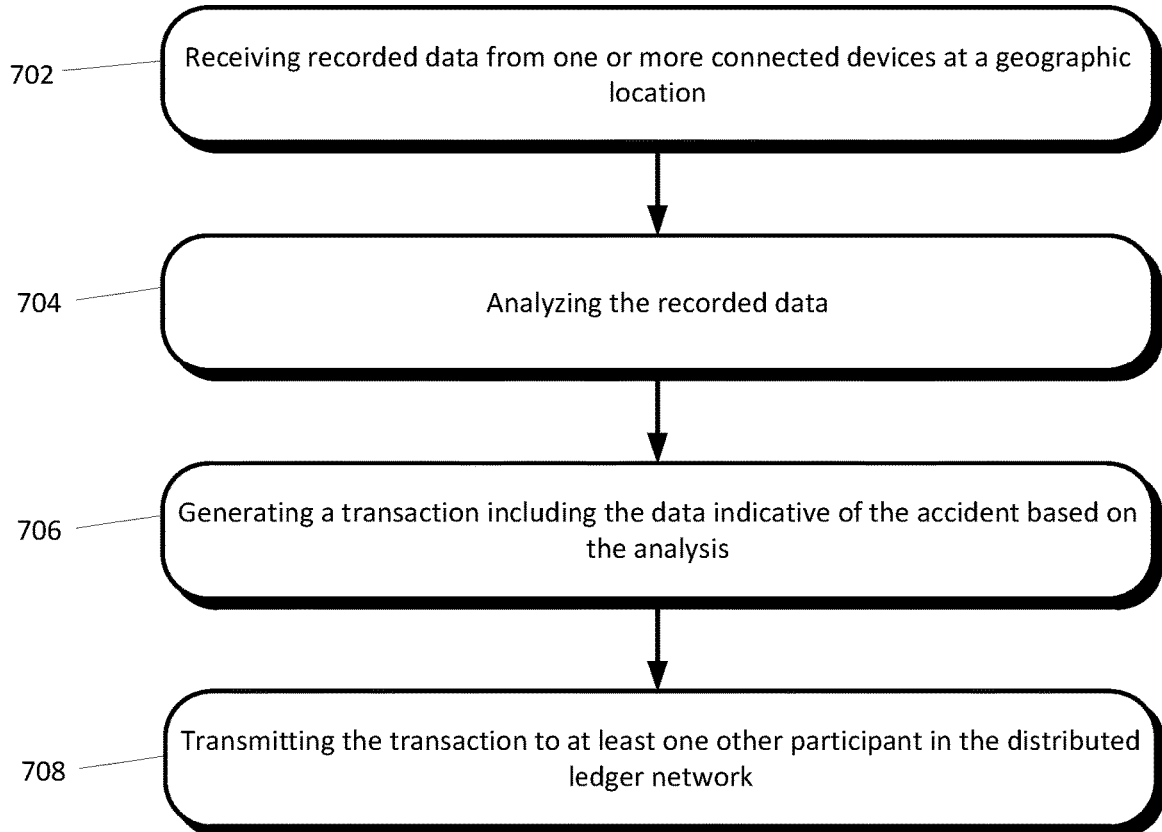
FIG. 7 depicts an exemplary flow diagram for providing data relevant to collisions and subrogation claims by interacting with a distributed ledger.

FIG. 7 depicts an exemplary flow diagram 700 associated with one aspect of the present disclosure, in particular, providing data relevant to collisions and subrogation claims by interacting with a distributed ledger. The method depicted in FIG. 7 is one exemplary implementation, whereas alternative methods and systems are discussed below. In some embodiments, the network of participants may be the nodes described above, for example node 400 depicted in FIG. 4. The blockchain used by the participants may be the blockchain 200 depicted in FIG. 2, whose operation is described above. The steps of the computer-implemented method 700 may be performed by the nodes in the network of participants, such as the nodes described in FIGS. 1-4. In addition, the method may interact with smart contracts stored in the distributed ledger, such as the exemplary smart contract depicted in FIG. 5. The method 700 may include additional, fewer, or alternative actions, including those described elsewhere herein.

In addition to functionality discussed above, the evidence oracles depicted in FIGS. 1, and 6, may perform analysis on any data that they record. For example, the evidence oracles may be recording data about a particular geographic location (e.g. a roadway intersection) and perform an analysis on the data recorded to determine if a collision occurred. One benefit received from the evidence oracles analyzing data themselves is that the evidence oracles may function semi-autonomously beyond the need for control by a third party entity that may desire to change data reported by the oracles. In this manner, the evidence oracles, and by extension the data they report to the blockchain, become trusted.

In one embodiment, a computer-implemented method for providing data relevant to collisions and subrogation claims by interacting with a distributed ledger may be provided. The method may be executed by an oracle, such as the evidence oracles discussed with respect to FIGS. 1 and 6. The method may include receiving (such as via wireless communication or data transmission over one or more radio links or communication channels), at one or more processors (and/or associated transceivers), recorded data from one or more connected devices at a geographic location (block 702); analyzing, at the one or more processors, the recorded data, wherein analyzing the recorded data includes determining that an collision has occurred involving one or more vehicles (block 704); generating, at the one or more processors, a transaction including the data indicative of the collision based upon the analysis (block 706); and/or transmitting (such as via wireless communication or data transmission over one or more radio links or communication channels), at the one or more processors, the transaction to at least one other participant in the distributed ledger network (block 708).

In some embodiments, the recorded data may be sensor data, audio data, video data, and combinations thereof. The recorded data may be data that is input into the distributed ledger by oracles, such as by the oracles discussed with respect to FIGS. 1 and 6. The data may be recorded data that is recorded in real-time by the oracle as events occur. Real-time data may be data that is representative of events as they happen in "real-time," that is where the interval between data collection periods is exceedingly small, such as by the second, or by the microsecond. Alternatively, for some data types, data collected every few seconds or minutes may be considered real-time data. This data may be packaged into transactions that are broadcast to the distributed ledger on a periodic basis, such as, for example, by the second, minute, hour, day, week, or month.

In some embodiments, the geographic location is a traffic intersection, a road segment, a waterway, a bridge, or combinations thereof, or GPS location. The geographic location may be a location that is known by an insurance provider to be a dangerous location where collisions are known to occur.

In some embodiments, determining a collision has occurred may include comparing, at the one or more processors, the recorded data to a baseline data profile for a type of recorded data related to the received recorded data. The baseline data profile may depict what "normal" conditions are at the geographic location when no collisions are occurring. For example, a picture of the street with no cars on it could be a normal condition. Alternatively, a picture of two cars that crashed into each other may be a collision condition. The baseline profile may be built by analyzing historical data for the geographic location, as well as historical claims data provided by an insurance provider.

In some embodiments, generating the transaction may include identifying, at the one or more processors, identity data for the one or more connected devices; augmenting, at the one or more processors, the transaction with the identity data for the one or more connected devices; generating, at the one or more processors, a cryptographic signature based upon the transaction; and/or augmenting, at the one or more processors, the transaction with the cryptographic signature. The identity data may be an identification number assigned to a connected device at the device's creation, and/or an identity number assigned to the device when it joined the distributed ledger network. In some embodiments, the identity data might be data for the vehicles involved in the collision, such as an identifier for a vehicle created at the vehicle's creation, a number provided by an insurance provider for the vehicle, an insurance policy number, or combinations thereof.

Some embodiments of the method may include, adding, at the one or more processors, the transaction to a block of transactions; solving, at the one or more processors, a cryptographic puzzle based upon the block of transactions; adding, at the one or more processors, the solution to the cryptographic puzzle to the block of transactions; and/or transmitting, at the one or more processors, the block of transactions to at least one other participant in the distributed ledger network. Similarly, in other embodiments a proof of stake algorithm, such as the one discussed above with respect to FIG. 3, may be used when constructing a block of transactions.

In some embodiments of the method, a collision may not have occurred, or it is unclear if a collision has occurred from the evidence available. In this situation, the method may include updating, at the one or more processors, a database with the recorded data.

In one alternative embodiment, a computer system for providing data relevant to collisions and subrogation claims by interacting with a distributed ledger may be provided. The system may include a network interface configured to interface with a processor; one or more sensors; a memory configured to store non-transitory computer executable instructions and configured to interface with the processor; and the processor configured to interface with the memory. The processor may be configured to execute the non-transitory computer executable instructions to cause the processor to: (1) receive recorded data from one or more connected devices at a geographic location; (2) analyze the recorded data, wherein analyzing the recorded data may include determining that an collision has occurred involving one or more vehicles; (3) generate a transaction including the data indicative of the collision based upon the analysis; and/or (4) transmit the transaction to at least one other participant in the distributed ledger network.

In some situations, whether or not data is disclosed from an evidence oracle is dependent on whether the requesting party has the authority to access that data. For example, the evidence oracle may be part of a proprietary network of evidence oracles, or be a publicly owned evidence oracle that is only accessible by preauthorized parties. In either situation, validation of access credentials may need to be performed prior to the reporting of evidence data.

In one embodiment, a computer-implemented method for providing data relevant to collisions and subrogation claims by interacting with a distributed ledger maintained by a plurality of participants may be provided. The method may be executed by an oracle and/or participant in the blockchain network, such as the participants and oracles discussed with respect to FIGS. 1 and 6. The method may include (1) receiving (such as via wireless communication or data transmission over one or more radio links or communication channels), at one or more processors, a request for recorded data from at least one other participant in the distributed ledger network; (2) verifying, at the one or more processors, an access level for the at least one other participant; (3) analyzing, at the one or more processors, the request for recorded data, wherein analyzing may include determining data relevant to the request; (4) generating, at the one or more processors, a transaction including the data relevant to the request; and/or (5) transmitting, at the one or more processors, the transaction to the at least one other participant in the distributed ledger network. The method may include additional, less, or alternate actions, including those discussed elsewhere herein.

In embodiments of the aforementioned computer-implemented method, the request for recorded data may be triggered by a transaction on the distributed ledger network related to a subrogation claim. For example, a participant in the network may monitor the network for transactions related to a subrogation claim, and subsequently request relevant evidence data from any evidence nodes on the network.

In some embodiments of the method, verifying the access level for the at least one participant requesting the recorded data may further include determining, at the one or more processors, an identity for the at least one other participant; and/or checking, at the one or more processors, the identity against a database of access levels listing who may access the recorded data. Not all participants in the distributed ledger network may have the necessary authority, legally or otherwise, to view all other participants and data transacted on the network. In this manner, the distributed ledger network may be a permissioned network. The nodes may have varying levels of authority allowing them to see particular data they have the right to access. These rights may be tracked as part of a "white list," or "access list," that records whom has access to what information. This list may be cross-referenced as part of the verification process.

In some embodiments, analyzing the request for recorded data may further include determining, at the one or more processors, a type of data requested; and determining, at the one or more processors, an amount of data requested. Oracles may record different types of data, such as video, audio, environmental, etc., and the data type may need to be determined by the oracle before answering a request.

In some embodiments, generating the transaction, may include identifying, at the one or more processors, identity data for one or more connected devices that recorded the recorded data; augmenting, at the one or more processors, the transaction with the identity data for the one or more connected devices; generating, at the one or more processors, a cryptographic signature based upon the transaction; and/or augmenting, at the one or more processors, the transaction with the cryptographic signature. Transactions may be secured using cryptographic hashes so that participants in the network may verify the provenance of the transaction.

The method may include adding, at the one or more processors, the transaction to a block of transactions; solving, at the one or more processors, a cryptographic puzzle based upon the block of transactions; adding, at the one or more processors, the solution to the cryptographic puzzle to the block of transactions; and/or transmitting, at the one or more processors, the block of transactions to at least one other participant in the distributed ledger network. Similarly, in other embodiments a proof of stake algorithm, such as the one discussed above with respect to FIG. 3, may be used when constructing a block of transactions.

In one alternative embodiment, a computer system for providing data relevant to collisions and subrogation claims by interacting with a distributed ledger may be provided. The system may include a network interface configured to interface with a processor; one or more sensors; a memory configured to store non-transitory computer executable instructions and configured to interface with the processor; and/or the processor configured to interface with the memory. The processor may be configured to execute the non-transitory computer executable instructions to cause the processor to: (1) receive a request for recorded data from at least one other participant in the distributed ledger network; (2) verify an access level for the at least one other participant; (3) analyze the request for recorded data, wherein analyzing includes determine data relevant to the request; (4) generate a transaction including the data relevant to the request; and/or (5) transmit the transaction to the at least one other participant in the distributed ledger network.

Recommended Subrogation Amounts

Figure 8:
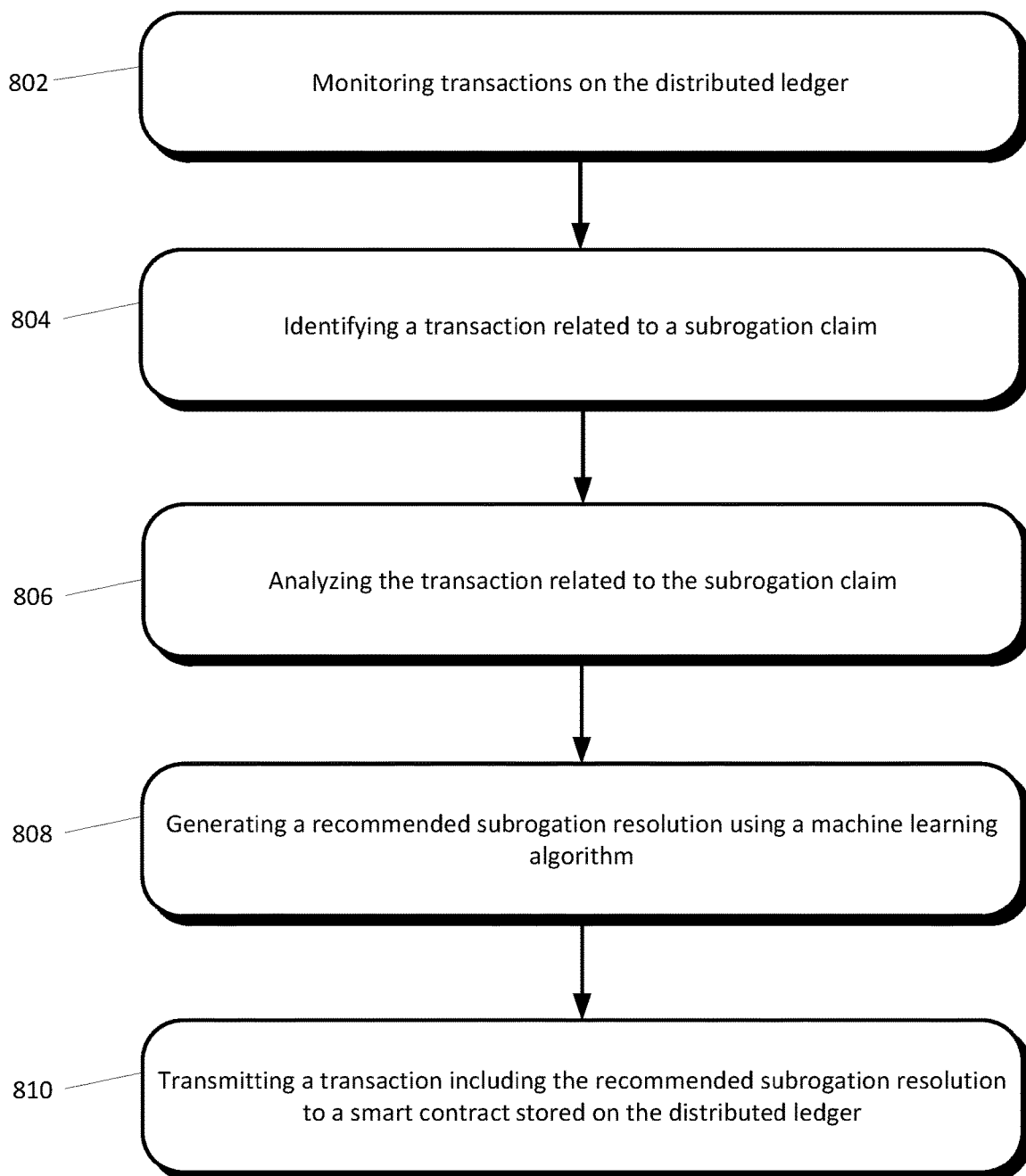
FIG. 8 depicts an exemplary flow diagram for generating suggested subrogation amounts using machine learning.

FIG. 8 depicts an exemplary flow diagram 800 associated with one aspect of the present disclosure, in particular, generating suggested subrogation amounts using machine learning. The computer-implemented method depicted in FIG. 8 is one exemplary implementation, whereas alternative methods and systems are discussed below. In some embodiments, the network of participants may be the nodes described above, for example node 400 depicted in FIG. 4. The blockchain used by the participants may be the blockchain 200 depicted in FIG. 2, whose operation is described above. The steps of the computer-implemented method 800 may be performed by the nodes in the network of participants, such as the nodes described in FIGS. 1-4. In addition, the method may interact with smart contracts stored in the distributed ledger, such as the example smart contract depicted in FIG. 5. The method 800 may include additional, fewer, or alternative actions, including those described elsewhere herein.

Determining subrogation amounts may be a difficult and time consuming process. A software program that leverages machine learning may be able to monitor transactions on a distributed ledger and suggest subrogation amounts related to subrogation claims that are being processed. For example, a computer-implemented method for generating suggested subrogation amounts using machine learning is disclosed.

The method may include (1) monitoring, at one or more processors, transactions on the distributed ledger (block 802); (2) identifying, at the one or more processors, a transaction related to a subrogation claim (block 804); (3) analyzing, at the one or more processors, the transaction related to the subrogation claim (block 806); (4) generating, at the one or more processors, a recommended subrogation resolution using a machine learning algorithm (block 808); and/or (5) transmitting, at the one or more processors, a transaction including the recommended subrogation resolution to a smart contract stored on the distributed ledger (block 810).

In some embodiments, monitoring transactions on the distributed ledger may further include monitoring, at the one or more processors, a smart contract stored at an address on the distributed ledger. The smart contract may be a subrogation smart contract with a state, such as the smart contract state 506 depicted in FIG. 5.

In some embodiments, identifying a transaction related to a subrogation claim may further include identifying, at the one or more processors, a subrogation ID in a transaction; and validating, at the one or more processors, the subrogation ID. The subrogation ID may be for the claimant, a defendant, or even for the address where a smart contract is located.

In some embodiments, analyzing the transaction related to the subrogation claim may further include analyzing, at the one or more processors, damages data contained in the transaction; and/or analyzing, at the one or more processors, services rendered data contained in the transaction. The damages data may be collected by oracles, such as the oracles depicted in FIGS. 1 and 6. The services rendered data may be derived from transactions on the distributed ledger, or retrieved from addresses on the distributed ledger.

In some embodiments, generating a recommended subrogation resolution using a machine learning algorithm, may further include executing, at the one or more processors, a machine learning algorithm on damages data and services rendered data included in the transaction. The machine learning algorithm may be trained on historical insurance claims data. This data may be used to help the algorithm "learn" optimal amounts for subrogation claims based upon past filings. The machine learning algorithm may be a supervised learning algorithm, employ decision trees, make use of an artificial neural network, make use of Bayesian statistical analysis, or combinations thereof.

In some embodiments, the machine learning algorithm may include comparing, at the one or more processors, the damages data and services rendered data to a historical dataset for damages data and services rendered data; and/or identifying, at the one or more processors, similarities and differences between the datasets.

In some embodiments, generating a recommended subrogation resolution using a machine learning algorithm, may further include determining, at the one or more processors, a subrogation amount for an at-fault insurer, and a not-at-fault insurer.

Some embodiments of the method may include adding, at the one or more processors, the transaction to a block of transactions; solving, at the one or more processors, a cryptographic puzzle based upon the block of transactions; adding, at the one or more processors, the solution to the cryptographic puzzle to the block of transactions; and/or transmitting, at the one or more processors, the block of transactions to at least one other participant in the distributed ledger network. Similarly, in other embodiments a proof of stake algorithm, such as the one discussed above with respect to FIG. 3, may be used when constructing a block of transactions.

One alternative embodiment of the method may include (1) receiving (such as via wireless communication or data transmission over one or more radio links or communication channels), at the one or more processors, a transaction related to a subrogation claim; (2) analyzing, at the one or more processors, the transaction related to the subrogation claim; (3) generating, at the one or more processors, a recommended subrogation resolution based upon the analysis of the transaction; and/or (4) transmitting, at the one or more processors, a transaction including the recommended subrogation resolution to a smart contract stored on the distributed ledger.

Yet another alternative embodiment may be a computer system for interacting with a distributed ledger. The system may include a network interface configured to interface with a processor; and a memory configured to store non-transitory computer executable instructions and configured to interface with the processor. The processor may be configured to interface with the memory, wherein the processor is configured to execute the non-transitory computer executable instructions to cause the processor to: monitor transactions on the distributed ledger; identify a transaction related to a subrogation claim; analyze the transaction related to the subrogation claim; generate a recommended subrogation resolution using a machine learning algorithm; and/or transmit a transaction including the recommended subrogation resolution to a smart contract stored on the distributed ledger.

Line Item Dispute Determination

Figure 9:
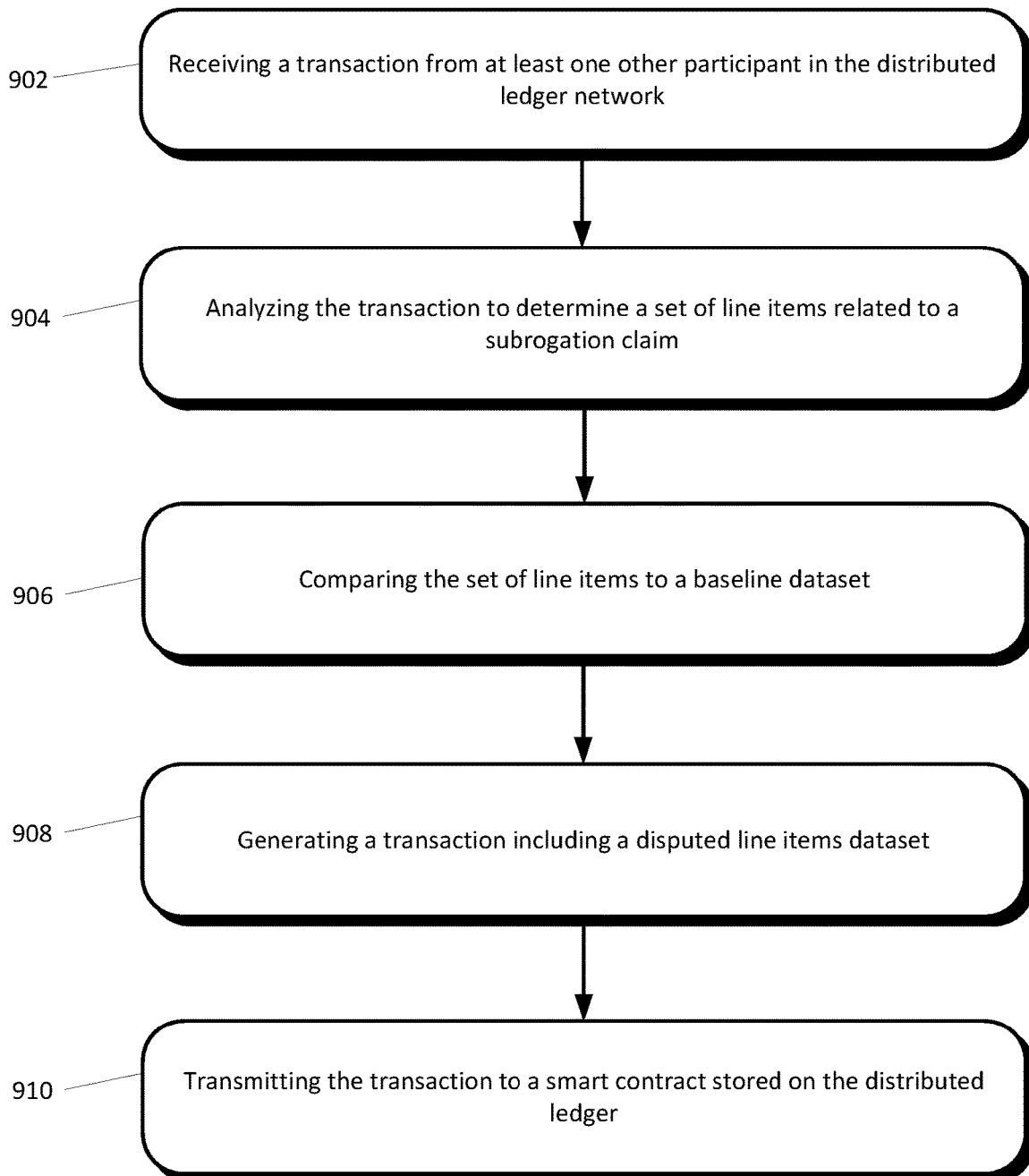
FIG. 9 depicts an exemplary flow diagram for providing a line item dispute mechanism related to a subrogation claim.

FIG. 9 depicts an exemplary flow diagram 900 associated with one aspect of the present disclosure, in particular, for providing a line item dispute mechanism related to a subrogation claim. The computer-implemented method depicted in FIG. 9 is one example implementation, whereas alternative methods and systems are discussed below. In some embodiments, the network of participants may be the nodes described above, for example node 400 depicted in FIG. 4. The blockchain used by the participants may be the blockchain 200 depicted in FIG. 2, whose operation is described above. The steps of the computer-implemented method 900 may be performed by the nodes in the network of participants, such as the nodes described in FIGS. 1-4. In addition, the method may interact with smart contracts stored in the distributed ledger, such as the example smart contract depicted in FIG. 5. The method 900 may include additional, fewer, or alternative actions, including those described elsewhere herein.

Line item disputes may be common in the insurance claim process, and in particular, the subrogation claim process. Line items may be entries on a bill for services rendered related to repairs performed as a result of an accident, healthcare received as a result of an accident, or combinations thereof. An exemplary computer-implemented method for providing a line item dispute mechanism related to a subrogation claim is disclosed. The method may include (1) receiving (such as via wireless communication or data transmission over one or more radio links or communication channels), at one or more processors, a transaction from at least one other participant in the distributed ledger network (block 902); (2) analyzing, at the one or more processors, the transaction to determine a set of line items related to a subrogation claim (block 904); (3) comparing, at the one or more processors, the set of line items to a baseline dataset (block 906); (4) generating, at the one or more processors, a transaction including a disputed line items dataset (block 908); and/or (5) transmitting, at the one or more processors, the transaction to a smart contract stored on the distributed ledger (block 910).

In some embodiments, the transaction may include a transaction ID, a subrogation contract ID, an originator, a damages dataset, and a services rendered dataset. Additional information may be included on the vehicles involved in the accident, insurance providers for the vehicles, as well as any other service providers relevant to the accident. Similarly, information on the drivers of the vehicles may also be included.

In some embodiments of the method, receiving (such as via wireless communication or data transmission over one or more radio links or communication channels) the transaction, may further include verifying, at the one or more processors, an identifier for the at least one other participant. The identifier may be assigned to the participant when they join the distributed ledger network, may be an address where the participant holds funds on the network, or may be an identifier generated off the network by an issuing authority, such as a government agency, or private business.

In some embodiments, analyzing the transaction may further include determining, at the one or more processors, damages data and services rendered data included in the transaction. Determining this data may include identifying the type of data included in the transaction, as well as the amount of data included in the transaction.

In some embodiments, the baseline dataset is a dataset containing suggested ranges for damages amounts and costs for services rendered. These suggested ranges may be maintained by a participant in the distributed ledger network, such as an insurance provider or arbitrator. The suggested ranges may also be determined dynamically by analyzing historical claims data.

In some embodiments, comparing the set of line items to a baseline dataset may further include identifying, at the one or more processors, differences between amounts for the set of line items and amounts for the baseline dataset. The difference may be an amount overpaid, as determined by the counter party, by a party in the subrogation process as determined by the party subject to the subrogation.

In some embodiments of the method, generating the transaction including the disputed line items dataset, may further include generating, at the one or more processors, the disputed line items dataset based upon the comparison of the set of line items to the baseline set. Any line items.

Some embodiments of the method include receiving (such as via wireless communication or data transmission over one or more radio links or communication channels), at the one or more processors, a response transaction related to the disputed line items; analyzing, at the one or more processors, the response transaction; and/or transmitting, at the one or more processors, an updated disputed line items transaction to at least one other participant. The response transaction may be the result of the counterparty to the subrogation objecting to a disputed line item, providing evidence of the veracity of the disputed line item, or combinations thereof. Based upon this disputed line items, and the response, an updated line item transaction may be communicated to participants in the network. Eventually, after a number of transactions there are no more line items that are under dispute.

One alternative embodiment of the method may include receiving (such as via wireless communication or data transmission over one or more radio links or communication channels), at one or more processors, a disputed line item transaction from at least one other participant in the distributed ledger network; analyzing, at the one or more processors, the disputed line item transaction; generating, at the one or more processors, a confirmation transaction including a consent dataset related to the disputed line items; and/or transmitting, at the one or more processors, the transaction to a smart contract stored on the distributed ledger. The confirmation transaction may be used by other parties involved in the subrogation process to verify agreement on line items between the parties involved.

Another embodiment may involve a computer system for providing a line item dispute mechanism related to a subrogation claim. The system may include a network interface configured to interface with a processor; a memory configured to store non-transitory computer executable instructions and configured to interface with the processor; and/or the processor configured to interface with the memory. The processor may be configured to execute the non-transitory computer executable instructions to cause the processor to: receive a transaction from at least one other participant in the distributed ledger network; analyze the transaction to determine a set of line items related to a subrogation claim; compare the set of line items to a baseline dataset; generate a transaction including a disputed line items dataset; and/or transmit the transaction to a smart contract stored on the distributed ledger.

Vehicle Subrogation Claim Creation

Figure 10:
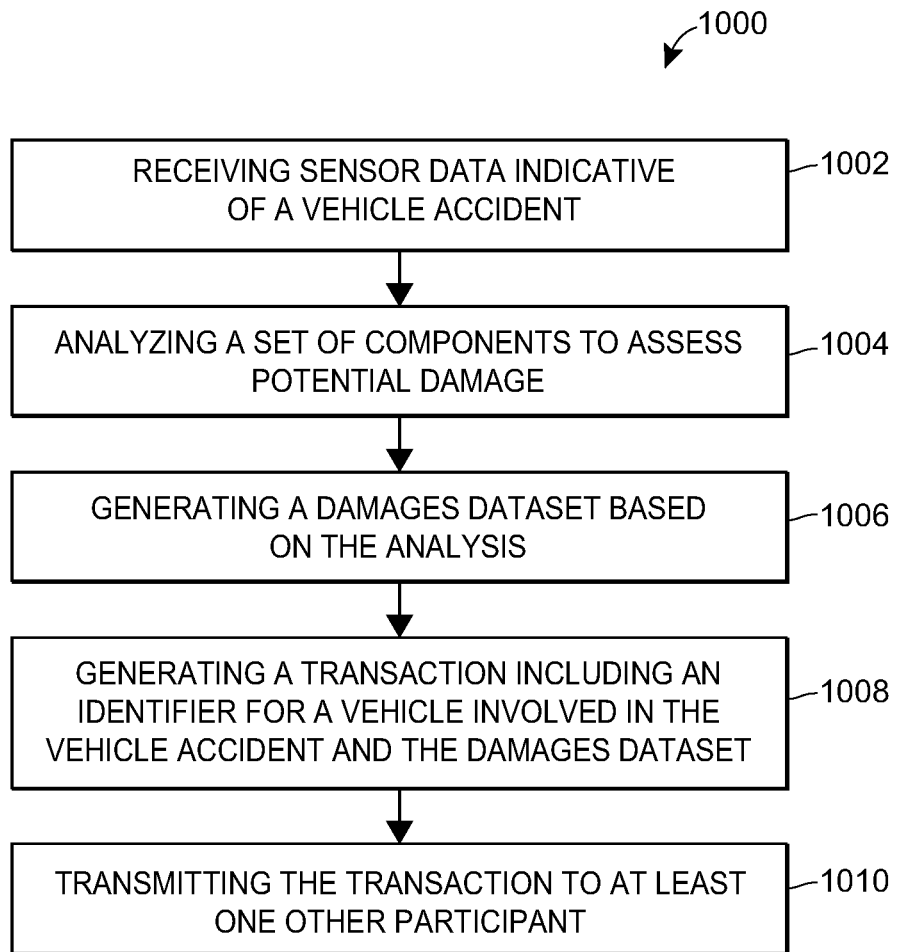
FIG. 10 depicts an exemplary flow diagram for interacting with a distributed ledger to create subrogation claims related to a vehicle accident.

FIG. 10 depicts an exemplary flow diagram 1000 associated with one aspect of the present disclosure, in particular, interacting with a distributed ledger to create subrogation claims related to a vehicle accident. The method depicted in FIG. 10 is one example implementation, whereas alternative methods and systems are discussed below. In some embodiments, the network of participants may be the nodes described above, for example node 400 depicted in FIG. 4. The blockchain used by the participants may be the blockchain 200 depicted in FIG. 2, whose operation is described above. The steps of the computer-implemented method 1000 may be performed by the nodes in the network of participants, such as the nodes described in FIGS. 1-4. In addition, the method may interact with smart contracts stored in the distributed ledger, such as the example smart contract depicted in FIG. 5. The method 1000 may include additional, fewer, or alternative actions, including those described elsewhere herein.

Most vehicles today have a plurality of computers contained within them. These computers monitor the status of the vehicle, as well as travel information pertaining to the vehicle. Accordingly, when a vehicle is involved in an accident the computers in the vehicle collect data related to the accident, as well as have data that may be relevant prior to when the accident occurred. This data may be collected from the parts of the vehicle. In some cases, due to the nature of the data it may be obvious that the vehicle driver is not at fault. For example, if the vehicle is hit in the rear the vehicle driver is likely not solely liable for any damages to the vehicle. As such, it may be more efficient for the vehicle itself to create a subrogation claim based off the data and transmit that claim as a transaction on a distributed ledger. If no distributed ledger exists, or the vehicle is not connected to one, the vehicle may create a distributed ledger, or join a distributed ledger.

An exemplary computer-implemented method for interacting with a distributed ledger maintained by a plurality of participants may be provided. The method may include (1) receiving (such as via wireless communication or data transmission over one or more radio links or communication channels), at one or more processors, sensor data indicative of a vehicle accident (block 1002); (2) analyzing, at the one or more processors, a set of components to assess potential damage (block 1004); (3) generating, at the one or more processors, a damages dataset based upon the analysis (block 1006); (4) generating, at the one or more processors, a transaction including an identifier for a vehicle involved in the vehicle accident and the damages dataset (block 1008); and/or (5) transmitting, at the one or more processors, the transaction to at least one other participant (block 1010).

In some embodiments, the sensor data may be received from the vehicle involved in the vehicle accident. The sensor data may be vehicle data indicative of speed, position, orientation, location, impact, or combinations thereof. If the vehicle is capable of vehicle to vehicle communication (V2V) the vehicle data may conform to certain standards, such as the SAE J2735 Dedicated Short Range Communications Message Set. In some cases, the vehicle data may be retrieved from a cloud storage solution that receives vehicle data uploads for the vehicle as the vehicle is under operation.

In some embodiments, analyzing the set of components may further include collecting, at the one or more processors, accident data from the set of components. The set of components of the vehicle may include the engine, the brakes, the tires, the air bags, the steering wheel, the suspension system, the frame, the windows and windshields, the front and/or rear bumpers, the exhaust, the ignition, any telecommunications system the vehicle may have, as well as any other parts that comprise the vehicle.

In some embodiments of the method, analyzing the set of components may further include determining, at the one or more processors, a subrogation claim related to the vehicle accident; generating, at the one or more processors, a smart contract related to the subrogation claim; and deploying, at the one or more processors, the smart contract to the distributed ledger. Determining the subrogation claim may include analyzing the damage level done to any components in the set of components that were damaged in the accident. This information may make it obvious, such as in the case of a "fender bender" where the vehicle is struck from the rear that the vehicle driver is not entirely at fault. As such, the smart contract may include this information when determining the subrogation claim. The smart contract may be deployed as part of a transaction broadcast to the distributed ledger participants.

In some embodiments, generating the damages dataset may further include determining, at the one or more processors, a component status for each member of the set of components. As discussed above, the component status may be data indicative of the components damage caused by the accident.

In some cases, the damages dataset may include an insurance provider for the vehicle involved in the vehicle accident. The insurance provider information may already be stored on the distributed ledger in a transaction related to the vehicle, or in other cases the vehicle itself stores information on the insurance provider for that insures the vehicle. Similarly, information on the drivers that operate the vehicle may also be included in damages datasets.

In some embodiments, generating the transaction may further include augmenting, at the one or more processors, the transaction with identity data for the vehicle; generating, at the one or more processors, a cryptographic signature based upon the transaction; and/or augmenting, at the one or more processors, the transaction with the cryptographic signature. Transactions may be secured using cryptographic hashes so that participants in the network may verify the provenance of the transaction.

In some embodiments, transmitting the transaction to at least one other participant, may further include transmitting, at the one or more processors, the transaction to a smart contract stored on the distributed ledger. This smart contract may be owned by an insurance provider for the vehicle, or may be owned by the vehicle, or owned by the vehicle's owner.

In one alternative embodiment, a computer-implemented method for interacting with a distributed ledger maintained by a plurality of participants may be provided. The method may include (1) receiving (such as via wireless communication or data transmission over one or more radio links or communication channels), at one or more processors, sensor data indicative of a vehicle accident; (2) analyzing, at the one or more processors, a set of components for a vehicle involved in the vehicle accident to assess potential damage; (3) generating, at the one or more processors, a damages dataset based upon the analysis; (4) creating, at the one or more processors, a distributed ledger for the vehicle involved in the vehicle accident; (5) deploying, at the one or more processors, a smart contract including the damages dataset and an identifier for the vehicle involved in the vehicle accident on the distributed ledger; (6) generating, at the one or more processors, a transaction including the identifier for a vehicle involved in the vehicle accident and the damages dataset; and/or (7) transmitting, at the one or more processors, the transaction to at least one other participant in the distributed ledger.

In another embodiment, a computer system for interacting with a distributed ledger may be provided. The system may include: a network interface configured to interface with a processor; a memory configured to store non-transitory computer executable instructions and configured to interface with the processor; and/or the processor configured to interface with the memory, wherein the processor is configured to execute the non-transitory computer executable instructions to cause the processor to: receive sensor data indicative of a vehicle accident; analyze a set of components to assess potential damage; generate a damages dataset based upon the analysis; generate a transaction including an identifier for a vehicle involved in the vehicle accident and the damages dataset; and/or transmit the transaction to at least one other participant.

Exemplary Data Sources

Figure 11:
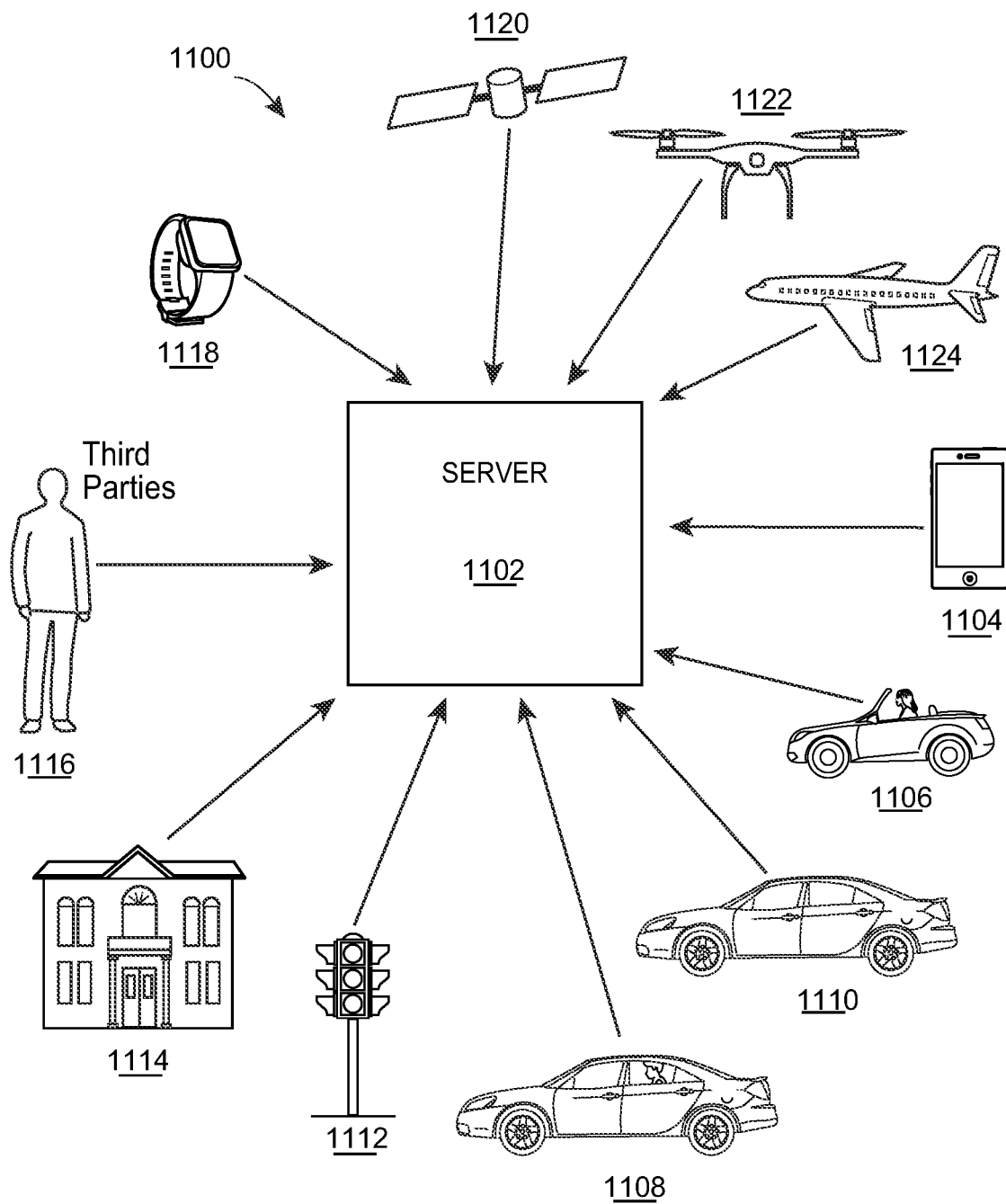
FIG. 11 depicts various sources of sensor, image, or telematics data used to initiate blockchain creation for vehicle collisions.

FIG. 11 depicts exemplary data sources providing data to server configured to create blockchains or new blocks of data for insurance claim blockchains 1100. A server 1102, such as an insurance provider remote server, may collect data, with customer permission or affirmative consent, from customer mobile devices 1104, smart vehicles 1106, autonomous or semi-autonomous vehicles 1108, vehicles of $3^{rd}$ parties 1110 (such as surrounding vehicles that may or may not have been involved in a vehicle collision), smart infrastructure 1112, smart or interconnected homes 1114, third parties 1116 (such as police or police vehicles, government computers, medical providers, repair shops, etc.), wearable electronic devices, such as smart watches 1118, and aerial data (such as from satellites 1120, drones 1122 (including autonomous or semi-autonomous drones), or airplanes 1124 (including autonomous or semi-autonomous drones)), and/or other computing devices or sensors.

The data generated by, and/or collected from, vehicles and/or mobile devices may include vehicle telematics data, such as GPS location, speed, acceleration, deceleration, cornering, braking, heading, route, and other types of telematics data. The telematics data may be updated periodically during vehicle usage, such as every 0.001 or 0.005 seconds.

All of the computing devices shown in FIG. 11 may be parties having access to communication network and/or an insurance claim-related blockchain. For instance, a smart or autonomous vehicle may sense via one or more vehicle-mounted processors or sensors that it has been involved in a vehicle collision. The vehicle controller may then gather or generate vehicle sensor data and/or telematics data, and create a new insurance claim-related blockchain or a new block to add to an existing blockchain (which may include links to and/or the sensor and/or telematics data itself), and transmit the block or blockchain, and/or the sensor and/or telematics data, to a remote server to start the insurance claim handling process and/or vehicle reconstruction/assignment of fault process.

Telematics data, as used herein, may include telematics data, and/or other types of data that have not been conventionally viewed as "telematics data." The telematics data may be generated by, and/or collected or received from, various sources, including those shown in FIG. 11. For example, the data may include, indicate, and/or relate to vehicle (and/or mobile device) speed; acceleration; braking; deceleration; turning or cornering; time; GPS (Global Positioning System) or GPS-derived location, speed, acceleration, or braking information; vehicle and/or vehicle equipment operation; external conditions (e.g., road, weather, traffic, and/or construction conditions); other vehicles or drivers in the vicinity of an accident; vehicle-to-vehicle (V2V) communications; vehicle-to-infrastructure or infrastructure-to-vehicle communications; drone-to-vehicle or vehicle-to-drone communications; and/or image and/or audio information of the vehicle and/or insured driver before, during, and/or after an accident. The data may include other types of data, including those discussed elsewhere herein. The data may be collected via wired or wireless communication.

The data may be generated by mobile devices (smart phones, cell phones, lap tops, tablets, phablets, PDAs (Personal Digital Assistants), computers, smart watches, pagers, hand-held mobile or portable computing devices, smart glasses, smart electronic devices, wearable devices, smart contact lenses, and/or other computing devices); smart vehicles; dash or vehicle mounted systems or original telematics devices; public transportation systems; smart street signs or traffic lights; smart infrastructure, roads, or highway systems (including smart intersections, exit ramps, and/or toll booths); smart trains, buses, or planes (including those equipped with Wi-Fi or hotspot functionality); smart train or bus stations; internet sites; aerial, drone, or satellite images; third party systems or data; nodes, relays, and/or other devices capable of wireless RF (Radio Frequency) communications; and/or other devices or systems that capture image, audio, or other data and/or are configured for wired or wireless communication.

In some embodiments, the data collected may also derive from police or fire departments, hospitals, and/or emergency responder communications; police reports; municipality information; and/or other data collected from government agencies and officials. The data from different sources or feeds may be aggregated.

The data generated may be transmitted, via wired or wireless communication, to a remote server, such as a remote server and/or other processor(s) associated with an insurance provider. The remote server and/or associated processors may build a database of the telematics and/or other data, and/or otherwise store the data collected.

The remote server and/or associated processors may analyze the data collected, and then perform certain actions and/or issue tailored communications based upon the data, including the insurance-related actions or communications discussed elsewhere herein. The automatic gathering and collecting of data from several sources by the insurance provider, such as via wired or wireless communication, may lead to expedited insurance-related activity, including the automatic identification of insured events, and/or the automatic or semi-automatic processing or adjusting of insurance claims.

In one embodiment, telematics data may be collected by a mobile device (e.g., smart phone) application. A telematics application that collects telematics data may ask an insured for permission to collect and send data about driver behavior and/or vehicle usage to a remote server associated with an insurance provider. In return, the insurance provider may provide incentives to the insured, such as lower premiums or rates, or discounts and rebates. The telematics application for the mobile device may be downloadable off of the internet. During use, the telematics application or mobile device may, when within Bluetooth communication range, establish a Bluetooth connection with the vehicle, a vehicle controller, vehicle-mounted sensors, and/or other electronic devices within the vehicle capable of data transmission via Bluetooth frequencies. The Bluetooth communication may allow telematics data generated or collected by the mobile device to be communicated to the vehicle controller or control system, or conversely allow telematics data generated or collected by the vehicle controller (and/or vehicle-mounted sensors) to be communication to the mobile device. After which, the vehicle or mobile device may wirelessly transmit the telematics data collected to a remote server, such as insurance provider remote server, for further analysis.

Cause of Accident and/or Fault Determination

The present embodiments may determine the cause of a vehicle accident from analyzing the telematics and/or other data collected. An accident may be determined to have been fully, primarily, or partially caused by a number of factors, such as weather conditions, road or traffic conditions, construction, human error, technology error, vehicle or vehicle equipment faulty operation, and/or other factors.

In one aspect, the present embodiments may determine who was at fault (either entirely or partially) of causing a vehicle collision or accident. Mobile devices, smart vehicles, equipment and/or sensors mounted on and/or within a vehicle, and/or roadside or infrastructure systems may detect certain indicia of fault, or perhaps more importantly from the insured's perspective, a lack of fault. An insured may opt-in to an insurance program that allows an insurance provider to collect telematics and/or other data, and analyze that data for low risk driving and/or other behavior. The analysis of the data and/or low risk behavior identified may be applied and/or used to lower insurance premiums or rates for the insured, and/or provide insurance discounts, rebates, or rewards to the insured.

Telematics data and/or other types of data generated or collected by, for example, (i) a mobile device (smart phone, smart glasses, etc.), (ii) cameras mounted on the interior or exterior of an insured (or other) vehicle, including autonomous or semi-autonomous vehicles, (iii) sensors or cameras associated with a roadside system, and/or (iv) other electronic systems, such as those mentioned above, and/or may be time-stamped. The data may indicate that the driver was driving attentively before, during, and/or after an accident. For instance, the data collected may indicate that a driver was driving alone and/or not talking on a smart phone or texting before, during, and/or after an accident. Responsible or normal driving behavior may be detected and/or rewarded by an insurance provider, such as with lower rates or premiums, or with good driving discounts for the insured.

Additionally or alternatively, video or audio equipment or sensors may capture images or conversations illustrating that the driver was driving lawfully and/or was generally in good physical condition and calm before the accident. Such information may indicate that the other driver or motorist (for a two vehicle accident) may have been primarily at fault.

Conversely, an in-cabin camera or other device may capture images or video indicating that the driver (the insured) or another motorist (e.g., a driver uninsured by the insurance provider) involved in an accident was distracted or drowsy before, during, and/or after an accident. Likewise, erratic behavior or driving, and/or drug or alcohol use by the driver or another motorist, may be detected from various sources and sensors. Telematics data, such as data gathered from the vehicle and/or a mobile device, may also be used to determine that before or during an accident, one of the drivers was speeding; following another vehicle too closely; and/or had time to react and avoid the accident.

In addition to human drivers, fault may be assigned to autonomous or semi-autonomous vehicles, or autonomous or semi-autonomous vehicle systems, features, or technologies. For instance, fault may be assigned to vehicle collision avoidance functionality, such that the insured's insurance premium or rate may not be negatively impacted by faulty technology. The telematics and/or other data collected may include video and/or audio data, and may indicate whether a vehicle, or certain vehicle equipment, operated as designed before, during, and/or after the accident. That data may assist in reconstructing a sequence of events associated with an insured event (e.g., a vehicle collision).

For instance, the data gathered may relate to whether or not the vehicle software or other collision avoidance functionality operated as it was intended or otherwise designed to. Also, a smart vehicle control system or mobile device may use G-force data and/or acoustic information to determine certain events. The data may further indicate whether or not (1) an air bag deployed; (2) the vehicle brakes were engaged; and/or (3) vehicle safety equipment (lights, wipers, turn signals, etc.), and/or other vehicle systems, include autonomous or semi-autonomous vehicle systems, operated properly, before, during, and/or after an accident.

Fault or blame, whole or partial, may further be assigned to environmental or other conditions. Weather, traffic, or road conditions; road construction; other accidents in the vicinity; and/or other conditions before, during, and/or after a vehicle accident (and in the vicinity of the location of the accident) may be determined (from analysis of the telematics and/or other data collected) to have contributed to causing the accident and/or insured event. A percentage of fault or blame may be assigned to each of the factors that contributed to causing an accident, and/or the severity thereof.

A sliding deductible and/or rate may depend upon the percentage of fault assigned to the insured. The percent of fault may be determined to be 0% or 100%, for example, which may impact an amount that is paid by the insurance provider for damages and/or an insurance claim.

Collision Reconstruction

The telematics and/or other data gathered or collected from the various sources (such as mobile devices; smart vehicles; autonomous or semi-autonomous vehicles; sensors or cameras mounted about a insured vehicle or a vehicle associated with another motorist; public transportation systems or other road side cameras; drone, aerial, or satellite images; etc.) may facilitate recreating the series of events that led to an accident or vehicle collision. The data gathered may be used by investigative services associated with an insurance provider to determine, for a vehicle accident, (1) an accident cause and/or (2) lack of fault and/or fault (or a percentage thereof) that is assigned or attributed to each of the drivers involved. The data gathered may also be used to identify a non-human cause of the accident, such as road construction, or weather, traffic, and/or road conditions.

A. Time-Stamped Sequence of Events

The series or sequence of events may facilitate establishing that an insured had no, or minimal, fault in causing the accident. Such information may lead to lower premiums or rates for the insured, and/or no change in insurance premiums or rates for the insured because of a vehicle accident for which they were not at fault (and/or not primarily at fault). Proper fault determination, or a percentage thereof, may allow multiple insurance providers to assign proper risk to each driver involved in an accident, and adjust their respective insurance premiums or rates accordingly such that good driving behavior is not improperly penalized.

In one aspect, audio and/or video data may be recorded. Audio and video data may capture time-stamped sound and images, respectively. Sound and visual (or image) data, and other sensor data, may be associated with and/or indicate vehicle braking; vehicle speed; vehicle turning; turn signal, window wiper, head light, and/or brake light normal or faulty operation; windows breaking; air bags deploying; autonomous or semi-autonomous vehicle system operation, control decisions implemented, engagement, or dis-engagement; and/or whether the vehicle or vehicle equipment operated as designed for each vehicle involved in an insured event or vehicle accident.

B. Virtual Accident Reconstruction

The telematics and/or other data gathered may facilitate accident reconstruction, and an accident scene or series of events may be recreated. Noted above, from the series of events leading up to, during, and/or after the accident, fault (or a percentage of fault) may be assigned to an insured or another motorist. The data gathered may be viewed as accident forensic data, and/or may be applied to assign fault or blame to one or more drivers, one or more autonomous or semi-autonomous vehicles, one or more autonomous or semi-autonomous technologies or systems, and/or one or more external conditions.

For example, the data gathered may indicate weather, traffic, road construction, and/or other conditions. The data gathered may facilitate scene reconstructions, such as graphic presentations on a display of a virtual map. The virtual map may include a location of an accident; areas of construction; areas of high or low traffic; and/or areas of bad weather (rain, ice, snow, etc.).

The virtual map may indicate a route taken by a vehicle or multiple vehicles involved in an accident. A timeline of events, and/or movement of one or more vehicles, may be depicted via, or superimposed upon, the virtual map. As a result, a graphical or virtual moving or animated representation of the events leading up to, during, and/or after the accident may be generated.

The virtual representation of the vehicle accident may facilitate (i) fault, or percentage of fault, assignment to one or more drivers or autonomous vehicles (or autonomous or semi-autonomous vehicle technologies or systems); and/or (ii) blame, or percentage of blame, assignment to one or more external conditions, such as weather, traffic, and/or construction. The assignments of fault or blame, or lack thereof, may be applied to handling various insurance claims associated with the vehicle accident, such as claims submitted by an insured or other motorists. The insured or insured vehicle may be insured by an insurance provider, and the other motorists or vehicles may be insured by the same or another insurance provider. The assignments of fault or blame, or lack thereof, may lead to appropriate adjustments to the insurance premiums or rates for the insured or vehicles, and/or the other motorists or vehicles to reflect the cause or causes of the accident determined from the data collected.

The virtual representation of the vehicle accident may account for several vehicles involved in the accident. The sequence of events leading up to and including the accident may include analysis of the telematics and/or other data to determine or estimate what each of several vehicles and/or respective drivers did (or did not) do prior to, during, and/or after the accident.

As examples, voice data from using a smart phone to place a telephone call before or during an accident may indicate a distracted driver. Vehicle sensors may detect seat belt usage, such as seat belt usage before or during an accident, and/or the frequency or amount of seat belt usage by a specific driver. The data may reveal the number of children or other passengers in a vehicle before or during an accident.

Moreover, GPS (Global Positioning System) location and speed data from several vehicles may be collected. Other vehicle data, including vehicle sensor data, may also be collected, such as data indicating whether (i) turn signals were used; (ii) head lights were on; (iii) the gas or brake pedal for a vehicle was pressed or depressed; and/or (iv) a vehicle was accelerating, decelerating, braking, maneuvering, turning, in their respective lane, and/or changing lanes. Vehicle sensor data may also indicate or relate to autonomous or semi-autonomous vehicle system, feature, or technology operation, engagement, and/or dis-engagement.

Infrastructure data, such as data from public transportation systems or smart traffic lights, may also be collected. Thus, for each vehicle accident or insured event a unique combination of data may be gathered at the insurance provider remote server and then analyzed to determine a most likely series of events leading up to the insured event.

Autonomous Automobile Functionality

Noted above, the present embodiments may relate to assessing and pricing insurance based upon autonomous (or semi-autonomous) functionality of a vehicle, and not the human driver. A smart vehicle may maneuver itself without human intervention and/or include sensors, processors, computer instructions, and/or other components that may perform or direct certain actions conventionally performed by a human driver.

An analysis of how artificial intelligence facilitates avoiding accidents and/or mitigates the severity of accidents may be used to build a database and/or model of risk assessment. After which, automobile insurance risk and/or premiums (as well as insurance discounts, rewards, and/or points) may be adjusted based upon autonomous or semi-autonomous vehicle functionality, such as by groups of autonomous or semi-autonomous functionality or individual features. In one aspect, an evaluation may be performed of how artificial intelligence, and the usage thereof, impacts automobile accidents and/or automobile insurance claims.

The types of autonomous or semi-autonomous vehicle-related functionality or technology that may be used with the present embodiments to replace human driver actions may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality.

In one embodiment, telematics and vehicle-mounted sensor data, and other data from the sources mentioned herein, may be generated and collected. From which, performance of various autonomous or semi-autonomous vehicle functionality or systems may be determined before, during, and/or after a vehicle collision. During accident reconstruction, assignment of a percentage of fault, or lack thereof, may be assigned to the autonomous or semi-autonomous functionality and systems mentioned herein in use, or supposed to be automatically engaged, during a vehicle collision.

Additionally or alternatively, the adjustments to automobile insurance rates or premiums based upon the autonomous or semi-autonomous vehicle-related functionality or technology may take into account the impact of such functionality or technology on the likelihood of a vehicle accident or collision occurring. For instance, a processor may analyze historical accident information and/or test data involving vehicles having autonomous or semi-autonomous functionality. Factors that may be analyzed and/or accounted for that are related to insurance risk, accident information, or test data may include (1) point of impact; (2) type of road; (3) time of day; (4) weather conditions; (5) road construction; (6) type/length of trip; (7) vehicle style; (8) level of pedestrian traffic; (9) level of vehicle congestion; (10) atypical situations (such as manual traffic signaling); (11) availability of internet connection for the vehicle; and/or other factors. These types of factors may also be weighted according to historical accident information, predicted accidents, vehicle trends, test data, and/or other considerations.

In one aspect, the benefit of one or more autonomous or semi-autonomous functionalities or capabilities may be determined, weighted, and/or otherwise characterized. For instance, the benefit of certain autonomous or semi-autonomous functionality may be substantially greater in city or congested traffic, as compared to open road or country driving traffic. Additionally or alternatively, certain autonomous or semi-autonomous functionality may only work effectively below a certain speed, i.e., during city driving or driving in congestion. Other autonomous or semi-autonomous functionality may operate more effectively on the highway and away from city traffic, such as cruise control. Further individual autonomous or semi-autonomous functionality may be impacted by weather, such as rain or snow, and/or time of day (day light versus night). As an example, fully automatic or semi-automatic lane detection warnings may be impacted by rain, snow, ice, and/or the amount of sunlight (all of which may impact the imaging or visibility of lane markings painted onto a road surface, and/or road markers or street signs).

Automobile insurance premiums, rates, discounts, rewards, refunds, points, etc. may be adjusted based upon the percentage of time or vehicle usage that the vehicle is the driver, i.e., the amount of time a specific driver uses each type of autonomous (or even semi-autonomous) vehicle functionality. In other words, insurance premiums, discounts, rewards, etc. may be adjusted based upon the percentage of vehicle usage during which the autonomous or semi-autonomous functionality is in use. For example, automobile insurance risk, premiums, discounts, etc. for an automobile having one or more autonomous or semi-autonomous functionalities may be adjusted and/or set based upon the percentage of vehicle usage that the one or more individual autonomous or semi-autonomous vehicle functionalities are in use, anticipated to be used or employed by the driver, and/or otherwise operating.

Such usage information for a particular vehicle may be gathered over time and/or via remote wireless communication with the vehicle. One embodiment may involve a processor on the vehicle, such as within a vehicle control system or dashboard, monitoring in real-time whether vehicle autonomous or semi-autonomous functionality is currently operating. Other types of monitoring may be remotely performed, such as via wireless communication between the vehicle and a remote server, or wireless communication between a vehicle-mounted dedicated device (that is configured to gather autonomous or semi-autonomous functionality usage information) and a remote server.

In one embodiment, if the vehicle is currently employing autonomous or semi-autonomous functionality, the vehicle may send a Vehicle-to-Vehicle (V2V) wireless communication to a nearby vehicle also employing the same or other type(s) of autonomous or semi-autonomous functionality. As an example, the V2V wireless communication from the first vehicle to the second vehicle (following the first vehicle) may indicate that the first vehicle is autonomously braking, and the degree to which the vehicle is automatically braking and/or slowing down. In response, the second vehicle may also automatically or autonomously brake as well, and the degree of automatically braking or slowing down of the second vehicle may be determined to match, or even exceed, that of the first vehicle. As a result, the second vehicle, traveling directly or indirectly, behind the first vehicle, may autonomously safely break in response to the first vehicle autonomously breaking.

As another example, the V2V wireless communication from the first vehicle to the second vehicle may indicate that the first vehicle is beginning or about to change lanes or turn. In response, the second vehicle may autonomously take appropriate action, such as automatically slow down, change lanes, turn, maneuver, etc. to avoid the first vehicle.

As noted above, the present embodiments may include remotely monitoring, in real-time and/or via wireless communication, vehicle autonomous or semi-autonomous functionality. From such remote monitoring, the present embodiments may remotely determine that a vehicle accident has occurred. As a result, emergency responders may be informed of the vehicle accident location via wireless communication, and/or quickly dispatched to the accident scene.

The present embodiments may also include remotely monitoring, in real-time or via wireless communication, that vehicle autonomous or semi-autonomous functionality is, or is not, in use, and/or collect information regarding the amount of usage of the autonomous or semi-autonomous functionality. From such remote monitoring, a remote server may remotely send a wireless communication to the vehicle to prompt the human driver to engage one or more specific vehicle autonomous or semi-autonomous functionalities.

Another embodiment may enable a vehicle to wirelessly communicate with a traffic light, railroad crossing, toll both, marker, sign, or other equipment along the side of a road or highway. As an example, a traffic light may wirelessly indicate to the vehicle that the traffic light is about to switch from green to yellow, or from yellow to red. In response to such an indication remotely received from the traffic light, the autonomous or semi-autonomous vehicle may automatically start to brake, and/or present or issue a warning/alert to the human driver. After which, the vehicle may wirelessly communicate with the vehicles traveling behind it that the traffic light is about to change and/or that the vehicle has started to brake or slow down such that the following vehicles may also automatically brake or slow down accordingly.

Insurance premiums, rates, ratings, discounts, rewards, special offers, points, programs, claims, claim amounts, etc. may be adjusted for, or may otherwise take into account, the foregoing functionality and/or the other functionality described herein. For instance, insurance policies may be updated based upon autonomous or semi-autonomous vehicle functionality; V2V wireless communication-based autonomous or semi-autonomous vehicle functionality; and/or vehicle-to-infrastructure or infrastructure-to-vehicle wireless communication-based autonomous or semi-autonomous vehicle functionality.

Exemplary Computer-Implemented Methods

Figure 12:
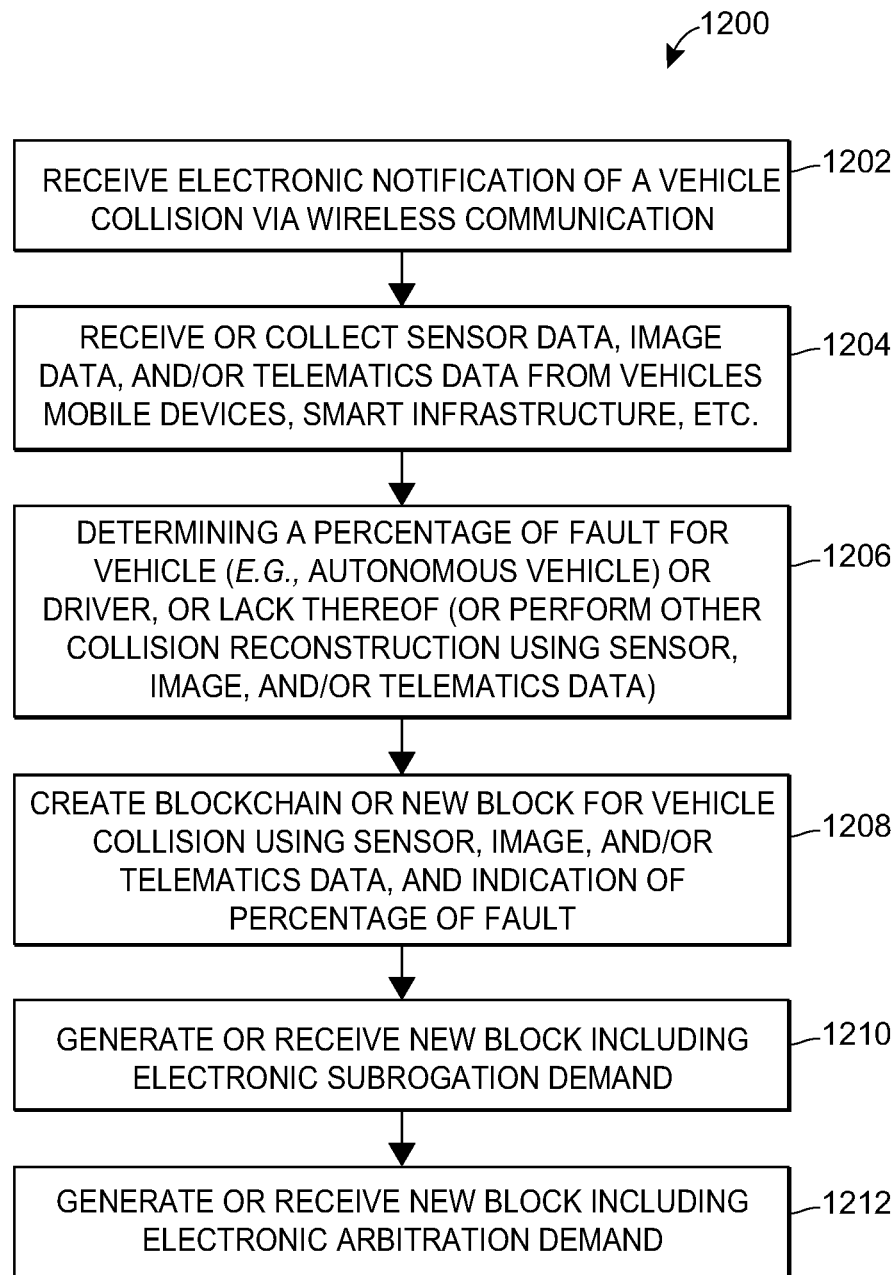
FIGS. 12-15 depict exemplary computer-implemented methods of handling an insurance claim via a shared ledger.

FIG. 12 depicts a computer-implemented method of handling an insurance claim via a shared ledger. The method 1200 may include, via one or more processors, servers, sensors, and/or associated transceivers: (1) receiving an electronic notification of a vehicle collision (such as via wireless communication or data transmission over one or more radio links or communication channels) (block 1202). The electronic notification, in some embodiments, may include sensor, image, and/or telematics data. The electronic notification, additionally or alternative, may include proof of insurance from another vehicle or driver involved in the collision (and/or an image thereof), and/or another driver's driver license information (and/or an image thereof), and/or the other vehicle's license plate information (and/or an image thereof).

The method 1200 may include (2) receiving (such as via wireless communication or data transmission over one or more radio links or communication channels) or gathering telematics, sensor, and/or image data (such as vehicle-to-vehicle data; smart or autonomous vehicle sensor, image, operation, control decision (such as whether to engage or disengage various autonomous systems), telematics, or other data; mobile device data; smart infrastructure data; aerial data; vehicle telematics data; smart or interconnected home data; etc.) (block 1204). The data received or collected may also include electronic proof of insurance from another vehicle or driver involved in the collision (and/or an image thereof), and/or another driver's driver license information in electronic format (and/or an image or scan thereof), and/or the other vehicle's license plate information in electronic format (and/or an image or scan thereof).

The method 1200 may include (3) determining a percentage of fault of the vehicle collision for a vehicle (e.g., for an autonomous or semi-autonomous vehicle or system) or a vehicle driver based upon, at least in part, processor analysis of the telematics, sensor, and/or image data collected (block 1206); and/or (4) creating a blockchain for the vehicle collision, or a new block for an existing blockchain, with one or more links to, or otherwise means for accessing, the telematics, sensor, and/or image data collected, and an indication of the percentage of fault determined (block 1208) to facilitate blockchain-based claim handling. The method 1200 may further include generating or receiving (such as via wireless communication or data transmission) (i) a new block including an electronic subrogation demand (block 1210); (ii) a new block including an indication of accepting or disputing the subrogation demand from another insurance carrier; and/or (iii) a new block including an electronic arbitration demand (block 1212), such as when the subrogation demand is disputed. The method may include additional, less, or alternate actions, including those discussed elsewhere herein.

Figure 13:
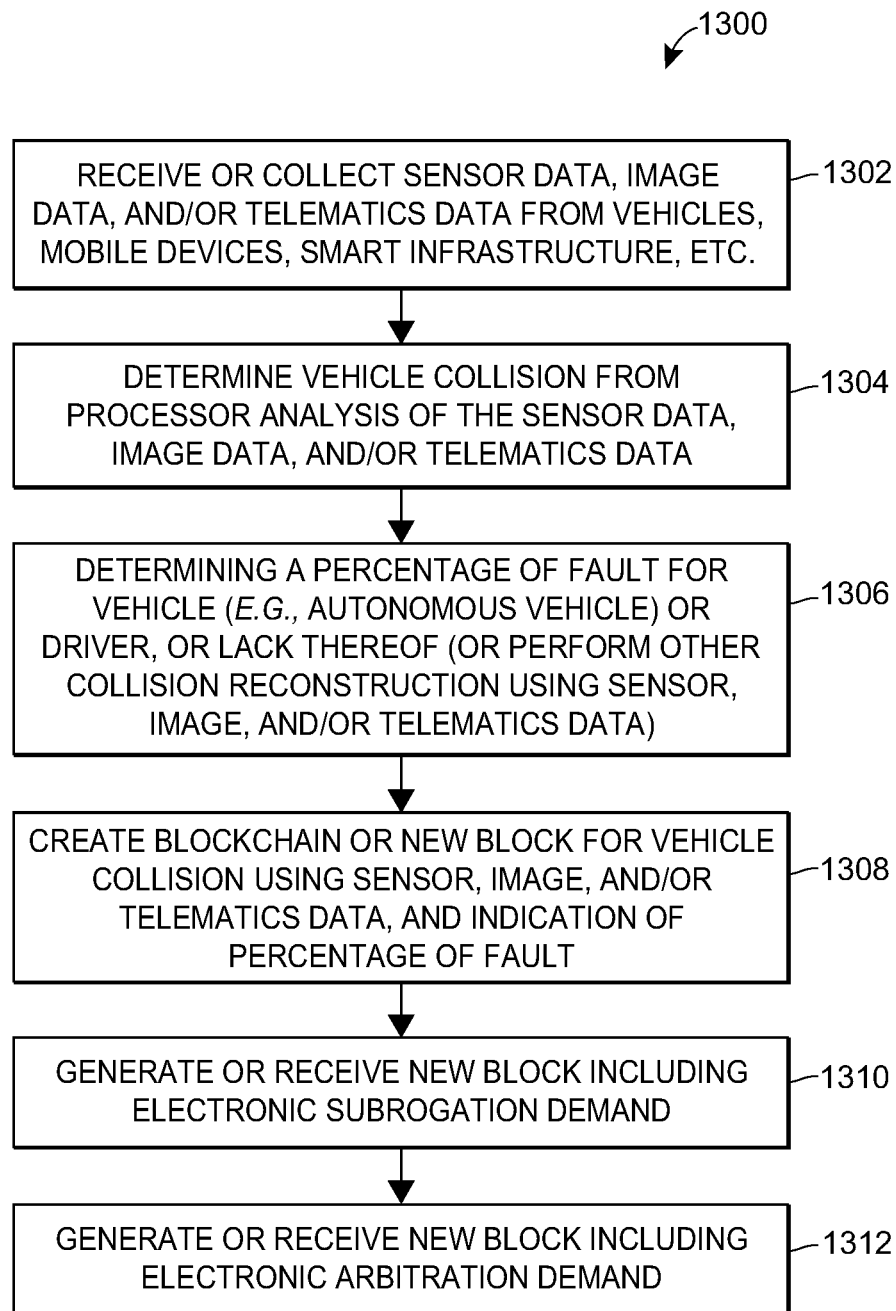

FIG. 13 depicts a computer-implemented method of handling an insurance claim via a shared ledger. The method 1300 may include, via one or more processors, servers, sensors, and/or associated transceivers: (1) receiving (such as via wireless communication or data transmission over one or more radio links or communication channels) or gathering telematics, sensor, and/or image data (such as vehicle-to-vehicle data; smart or autonomous vehicle sensor, operation, control decision, telematics, or other data; mobile device data; smart infrastructure data; aerial data; vehicle telematics data; smart or interconnected home data; etc.) (block 1302); (2) determining a vehicle collision occurred from processor analysis of the sensor, image, and/or telematics data (block 1304); (3) determining a percentage of fault of the vehicle collision for a vehicle (e.g., for an autonomous or semi-autonomous vehicle or system) or a vehicle driver based upon, at least in part, processor analysis of the sensor and/or image data collected (block 1306); and/or (4) creating a blockchain for the vehicle collision, or a new block for an existing blockchain, with one or more links to, or otherwise means for accessing, the telematics, sensor, and/or image data collected, and an indication of the percentage of fault determined (block 1308) to facilitate blockchain-based claim handling. The method 1300 may further include generating or receiving (such as via wireless communication or data transmission) (i) a new block including an electronic subrogation demand (block 1310); (ii) a new block including an indication of accepting or disputing the subrogation demand from another insurance carrier; and/or (iii) a new block including an electronic arbitration demand (block 1312), such as when the subrogation demand is disputed. The method may include additional, less, or alternate actions, including those discussed elsewhere herein.

Figure 14:
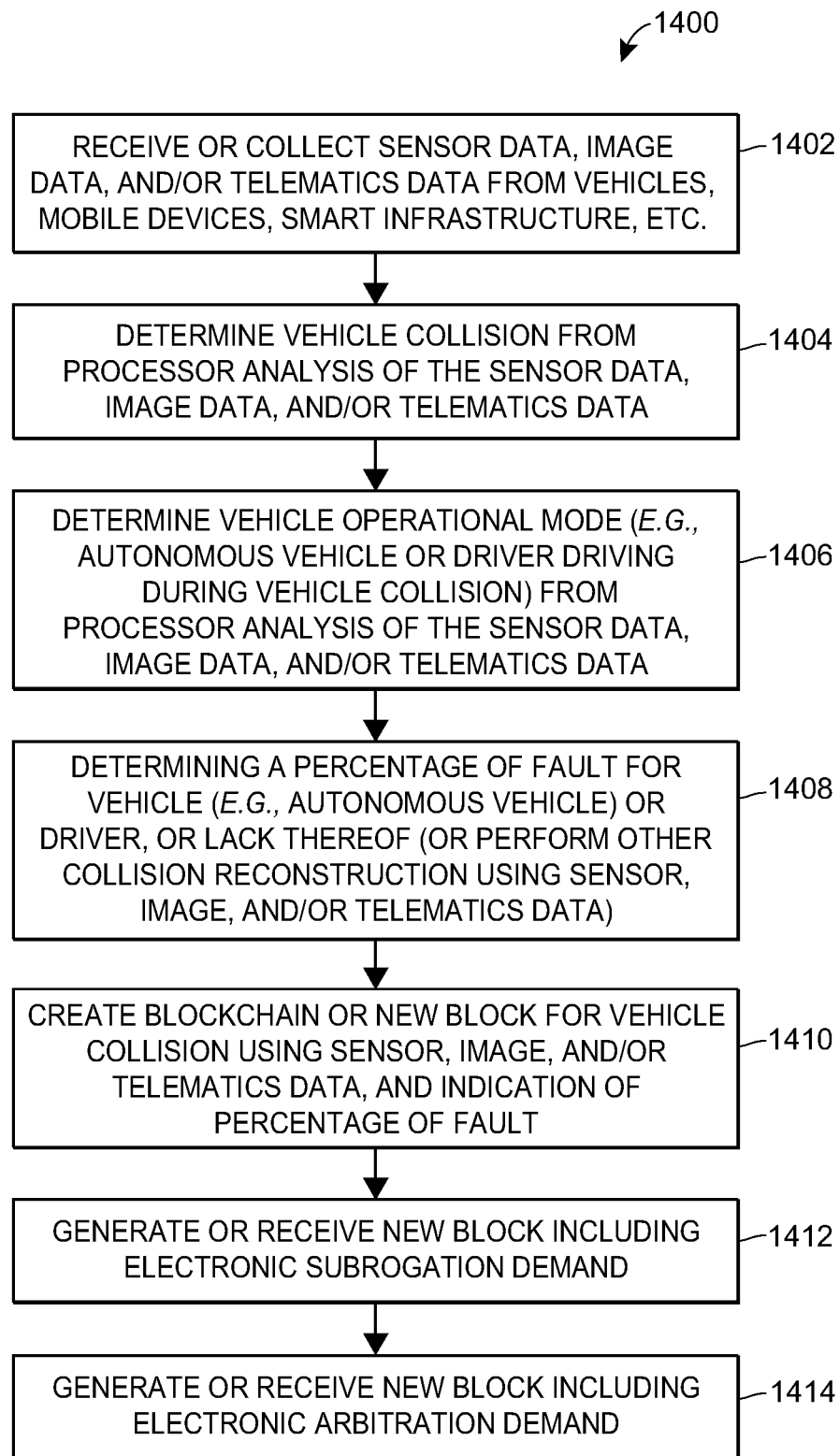

FIG. 14 depicts a computer-implemented method of handling an insurance claim via a shared ledger. The method 1400 may include, via one or more processors, servers, sensors, and/or associated transceivers: (1) receiving (such as via wireless communication or data transmission over one or more radio links or communication channels) or gathering telematics, sensor, and/or image data (such as vehicle-to-vehicle data; smart or autonomous vehicle sensor, operational, control decision, telematics, or other data; mobile device data; smart infrastructure data; aerial data; vehicle telematics data; smart or interconnected home data; etc.) (block 1402); (2) determining a vehicle collision occurred from processor analysis of the sensor, image, and/or telematics data (block 1404); (3) determining an operational mode of the vehicle before, during, and/or after the vehicle collision, such as determining whether the vehicle (e.g., an autonomous vehicle or autonomous or semi-autonomous system) or human driver was driving or otherwise in control of the vehicle) (block 1406); (4) determining a percentage of fault of the vehicle collision for a vehicle (e.g., for an autonomous or semi-autonomous vehicle or system) or a vehicle driver based upon, at least in part, processor analysis of the sensor and/or image data collected (block 1408); and/or (5) creating a blockchain for the vehicle collision, or a new block for an existing blockchain, with one or more links to, or otherwise means for accessing, the sensor and/or image data collected, an indication of the percentage of fault determined, and an indication of whether the vehicle, vehicle system, or driver was in control of the vehicle (block 1410) to facilitate blockchain-based claim handling. The method 1400 may further include generating or receiving (such as via wireless communication or data transmission) (i) a new block including an electronic subrogation demand (block 1412); (ii) a new block including an indication of accepting or disputing the subrogation demand from another insurance carrier; and/or (iii) a new block including an electronic arbitration demand (block 1414), such as when the subrogation demand is disputed. The method may include additional, less, or alternate actions, including those discussed elsewhere herein.

In one aspect, a computer-implemented method of handling an insurance claim via a shared ledger may be provided. The method may include, via one or more local or remote processors, servers, sensors, and/or associated transceivers: (1) receiving an electronic notification of a vehicle collision (such as via wireless communication or data transmission over one or more radio links or communication channels); (2) receiving (such as via wireless communication or data transmission over one or more radio links or communication channels) or gathering telematics, sensor, and/or image data (such as vehicle-to-vehicle data, smart or autonomous vehicle data, mobile device data, smart infrastructure data, aerial data, vehicle telematics data, smart or interconnected home data, etc.); (3) determining a percentage of fault of the vehicle collision for a vehicle (e.g., for an autonomous or semi-autonomous vehicle or system) or a vehicle driver based upon, at least in part, processor analysis of the telematics, sensor, and/or image data collected; and/or (4) creating a blockchain for the vehicle collision, or a new block for an existing blockchain, with one or more links to or hashes of, or otherwise means for accessing, the telematics, sensor, and/or image data collected, and an indication of the percentage of fault determined to facilitate blockchain-based claim handling. The method may include additional, less, or alternate actions, including those discussed elsewhere herein.

For instance, the method may include, via one or more processors, servers, sensors, and/or associated transceivers: receiving (such as via wireless communication or data transmission over one or more radio links or communication channels) an electronic arbitration demand associated with the vehicle collision; and/or generating a recommendation based upon, at least in part, processor analysis of, or processor comparison of, the percentage of fault and the electronic arbitration demand. The method may also include generating a new block including the recommendation or a link thereto or hash thereof; and/or adding the new block to the blockchain.

In one embodiment, the sensor and/or image data may be generated by smart infrastructure or by a vehicle not involved in the vehicle collision. The sensor and/or image data may include telematics data collected by the vehicle, a mobile device traveling within the vehicle, or another vehicle in the vicinity of the vehicle collision.

Determining a percentage of fault of the vehicle collision for a vehicle (including an autonomous or semi-autonomous vehicle or system) or a vehicle driver based upon, at least in part, processor analysis of the sensor and/or image data collected may include inputting the sensor and/or image data collected into a machine learning programmed trained to identify a percentage of fault for a vehicle or vehicle driver based upon sensor and/or image data.

The electronic notification of a vehicle collision may be generated by the vehicle from processor analysis of sensor data generated by one or more vehicle-mounted sensors. The electronic notification of a vehicle collision may be generated by the vehicle from processor analysis of image data generated by one or more vehicle-mounted sensors or cameras. The electronic notification of a vehicle collision may be generated by the vehicle from processor analysis of telematics data (e.g., location, acceleration, speed, cornering, and braking data from before, during, and after the vehicle collision) generated by one or more vehicle-mounted sensors. Additionally or alternatively, the electronic notification of a vehicle collision may be generated by the vehicle from processor analysis of sensor data generated by one or more vehicle-mounted sensors, and sensor or other data, such as telematics data, received from the vehicle and/or one or more nearby vehicles in the vicinity of the vehicle collision location.

The method may include, via one or more processors, servers, transceivers, and/or sensors: receiving (such as via wireless communication or data transmission over one or more radio links or communication channels) an electronic subrogation demand associated with the vehicle collision; and/or generating an electronic recommendation based upon, at least in part, processor analysis of, or processor comparison of, the percentage of fault and the electronic subrogation demand. The method may include generating a new block including the electronic recommendation, or an indication thereof, or a link thereto or hash thereof; and/or adding the new block to the blockchain.

The method may include, via one or more processors, servers, sensors, and/or associated transceivers: generating an electronic subrogation demand based upon, at least in part, processor analysis of the telematics, sensor, and/or image data collected and/or the percentage of fault determined for the vehicle, vehicle system(s), and/or the vehicle driver (such as via artificial intelligence or machine learning techniques); and/or generating a block to add to the blockchain that includes a link to, hash of, or an indication of the electronic subrogation demand. The electronic subrogation demand may include one or more line items directed to medical expenses, vehicle repair costs, vehicle towing services, and/or rental vehicle expenses.

The method may include, via one or more processors, servers, sensors, and/or associated transceivers: receiving (such as via wireless communication or data transmission over one or more radio links or communication channels) an electronic subrogation demand associated with the vehicle collision; analyzing the electronic subrogation demand, the telematics, sensor, and/or image data collected, and/or the percentage of fault determined for the vehicle, vehicle system(s), and/or the vehicle driver (such as by using artificial intelligence and/or machine learning techniques); generating a recommendation to accept or dispute the electronic subrogation demand; and/or generating a new block including a link to, or an indication of, the recommendation to add to the blockchain.

The method may include, via one or more processors, servers, sensors, and/or associated transceivers: generating an electronic arbitration demand based upon, at least in part, the telematics, sensor, and/or image data collected and/or the percentage of fault determined for the vehicle, vehicle system(s), and/or the vehicle driver; and/or generating a block to add to the blockchain that includes a link to, hash of, or an indication of, the electronic arbitration demand.

In another aspect, a computer-implemented method of handling an insurance claim via a shared ledger may be provided. The method may include, via one or more local or remote processors, servers, sensors, and/or associated transceivers: (1) receiving (such as via wireless communication or data transmission over one or more radio links or communication channels) or gathering telematics, sensor, and/or image data (such as vehicle-to-vehicle data, smart or autonomous vehicle data, mobile device data, smart infrastructure data, aerial data, vehicle telematics data, smart or interconnected home data, etc.); (2) determining that a vehicle collision (such as via wireless communication or data transmission over one or more radio links or communication channels) occurred based upon, at least in part, processor analysis of the telematics, sensor, and/or image data collected; (3) determining a percentage of fault of the vehicle collision for a vehicle (including an autonomous or semi-autonomous vehicle or system) or a vehicle driver based upon, at least in part, processor analysis of the sensor and/or image data collected; and/or (4) creating a blockchain for the vehicle collision, or a new block for an existing blockchain, with the telematics, sensor, and/or image data, or one or more links to or hashes of the telematics, sensor, and/or image data collected, and an indication of the percentage of fault determined to facilitate blockchain-based claim handling. The method may include additional, less, or alternate actions, including those discussed elsewhere herein.

For instance, the method may include, via one or more processors, servers, sensors, and/or associated transceivers: receiving (such as via wireless communication or data transmission over one or more radio links or communication channels) an electronic arbitration demand associated with the vehicle collision; and/or generating an electronic recommendation based upon, at least in part, processor analysis of, or a comparison of, the percentage of fault and the electronic arbitration demand (such as by using artificial intelligence or machine learning techniques). The method may include generating a new block including the electronic recommendation, an indication thereof, or link thereto or hash thereof, and/or adding the new block to the blockchain.

The sensor and/or image data may be generated by smart infrastructure or by a vehicle not involved in the vehicle collision, but in the vicinity of the vehicle collision location at the time of the vehicle collision. The sensor and/or image data may include telematics data generated and/or collected by the vehicle, a mobile device traveling within the vehicle, another vehicle involved in the vehicle collision, and/or another vehicle in the vicinity of the vehicle collision.

Determining a percentage of fault of the vehicle collision for a vehicle (including an autonomous or semi-autonomous vehicle or system) or a vehicle driver based upon, at least in part, processor analysis of the telematics, sensor and/or image data collected may include inputting the telematics, sensor and/or image data collected into a machine learning programmed trained to identify a percentage of fault based upon telematics, sensor and/or image data.

Determining a vehicle collision occurred based upon, at least in part, processor analysis of the sensor and/or image data collected may include inputting the sensor and/or image data collected into a machine learning programmed trained to identify that vehicle collision occurred based upon sensor and/or image data.

The method may include, via one or more processors, servers, sensors, and/or associated transceivers: receiving (such as via wireless communication or data transmission over one or more radio links or communication channels) an electronic subrogation demand associated with the vehicle collision; and/or generating an electronic recommendation based upon, at least in part, processor analysis of, or processor comparison of, the percentage of fault and the electronic subrogation demand (such as by using artificial intelligence or machine learning techniques). The method may include, via one or more processors, servers, sensors, and/or associated transceivers: generating a new block including the recommendation, or an indication thereof, or a link thereto, or a hash thereof; and adding the new block to the blockchain.

The method may include, via one or more processors, servers, sensors, and/or associated transceivers: generating an electronic subrogation demand based upon, at least in part, processor analysis of the sensor and/or image data collected and/or the percentage of fault determined for the vehicle or the vehicle driver (such as via artificial intelligence or machine learning techniques); and/or generating a block to add to the blockchain that includes a link to, hash of, or an indication of the electronic subrogation demand. The electronic subrogation demand may include one or more lines items directed to medical expenses, vehicle repair, tow services, and/or rental vehicle expenses.

The method may include, via one or more processors, servers, sensors, and/or associated transceivers: receiving (such as via wireless communication or data transmission over one or more radio links or communication channels) an electronic subrogation demand associated with the vehicle collision; analyzing the electronic subrogation demand, the telematics, sensor, and/or image data collected, and/or the percentage of fault determined for the vehicle, vehicle system(s), or the vehicle driver (such as by using artificial intelligence and/or machine learning techniques); generating a recommendation to accept or dispute the subrogation demand; and/or generating a new block including a link to, or an indication of, the recommendation to add to the blockchain.

The method may include, via one or more processors, servers, sensors, and/or associated transceivers: generating an electronic arbitration demand based upon, at least in part, the sensor and/or image data collected and/or the percentage of fault determined for the vehicle or the vehicle driver (such as by using artificial intelligence and/or machine learning techniques); and/or generating a block to add to the blockchain that includes a link to, a hash of, or an indication of, the electronic arbitration demand.

In another aspect, a computer-implemented method of handling an insurance claim via a shared ledger may be provided. The method may include, via one or more local or remote processors, servers, sensors, and/or associated transceivers: (1) receiving (such as via wireless communication or data transmission over one or more radio links or communication channels) or gathering telematics, sensor, and/or image data (such as vehicle-to-vehicle data, smart or autonomous vehicle data, mobile device data, smart infrastructure data, aerial data, vehicle telematics data, smart or interconnected home data, etc.); (2) determining that a vehicle collision (such as via wireless communication or data transmission over one or more radio links or communication channels) occurred based upon, at least in part, processor analysis of the telematics, sensor, and/or image data collected; (3) determining an operational mode for the vehicle based upon, at least in part, processor analysis of the sensor and/or image data collected, the operational mode indicating whether the vehicle (e.g., an autonomous vehicle, or autonomous or semi-autonomous vehicle system or technology) or human driver had control of the vehicle before, during, and/or after the vehicle collision; (4) determining a percentage of fault, or lack thereof, of the vehicle collision for the vehicle (or autonomous or semi-autonomous vehicle system) or the human vehicle driver based upon, at least in part, processor analysis of the telematics, sensor, and/or image data collected, and what or whom was in control of the vehicle before, during, and/or after the vehicle collision, respectfully; and/or (5) creating a blockchain for the vehicle collision, or a new block for an existing blockchain, with the telematics, sensor, and/or image data and/or one or more links to the sensor and/or image data collected, an indication of the operational mode for the vehicle at the time of vehicle collision, and/or an indication of the percentage of fault determined (for the vehicle or the driver) to facilitate blockchain-based claim handling. The method may include additional, less, or alternate actions, including those discussed elsewhere herein.

For instance, the method may include, via one or more processors, servers, sensors, and/or associated transceivers: receiving (such as via wireless communication or data transmission over one or more radio links or communication channels) an electronic arbitration demand associate with the vehicle collision; and/or generating an electronic recommendation based upon, at least in part, processor analysis of, or processor comparison of, the percentage of fault and the electronic arbitration demand (such as via artificial intelligence and/or machine learning techniques). The method may include, via one or more processors, servers, sensors, and/or associated transceivers: generating a new block including the recommendation or a link thereto or hash thereof, and/or adding the new block to the blockchain.

In one embodiment, the sensor and/or image data may be generated by smart infrastructure or by a vehicle not involved in the vehicle collision in the vicinity of the vehicle collision. Additionally or alternatively, the sensor and/or image data may include telematics data collected by the vehicle, a mobile device traveling within the vehicle, another vehicle involved in the vehicle collision, and/or another vehicle in the vicinity of the vehicle collision not involved in the vehicle collision.

Determining a percentage of fault of the vehicle collision for a vehicle or a vehicle driver based upon, at least in part, processor analysis of the sensor and/or image data collected may include inputting the sensor and/or image data collected into a machine learning programmed trained to identify a percentage of fault based upon sensor and/or image data.

Determining a vehicle collision occurred based upon, at least in part, processor analysis of the sensor and/or image data collected may include inputting the sensor and/or image data collected into a machine learning programmed trained to identify that vehicle collision occurred based upon sensor and/or image data.

The method may include, via one or more processors, transceivers, servers, and/or sensors, assigning liability to a manufacturer of the vehicle or the human driver based upon whom had control before, during, and/or after the vehicle collision, and a percentage of fault, or lack thereof, assigned to the vehicle or human driver.

The method may include determining which vehicle or human driver had the last clear chance to avoid the vehicle collision based upon, at least in part, processor analysis of the sensor and/or image data collected. Determining which vehicle or human driver had the last clear chance to avoid the vehicle collision based upon, at least in part, processor analysis of the sensor and/or image data collected may include inputting the sensor and/or image data into a machine learning program trained to identify a party or vehicle that had the last clear chance to avoid the vehicle collision using sensor and/or image data (including telematics data).

The method may include determining which vehicle or human driver had the last clear chance to avoid the vehicle collision based upon, at least in part, processor analysis of telematics data collected from two or more vehicles involved in the vehicle collision. Additionally or alternatively, the method may include determining which vehicle or human driver had the last clear chance to avoid the vehicle collision based upon, at least in part, processor analysis of telematics data collected from one or more vehicles involved in the vehicle collision, and smart infrastructure sensor and/or image data.

Exemplary Computer Systems

In one aspect, a computer system configured to handle an insurance claim via a shared ledger may be provided. The computer system may include one or more processors, servers, sensors, and/or associated transceivers configured to: (1) receive an electronic notification of a vehicle collision (such as via wireless communication or data transmission over one or more radio links or communication channels); (2) receive (such as via wireless communication or data transmission over one or more radio links or communication channels) or gather telematics, sensor, and/or image data (such as vehicle-to-vehicle data, smart or autonomous vehicle data, mobile device data, smart infrastructure data, aerial data, vehicle telematics data, smart or interconnected home data, etc.); (3) determine a percentage of fault of the vehicle collision for a vehicle (e.g., for an autonomous or semi-autonomous vehicle or system) or a vehicle driver based upon, at least in part, processor analysis of the telematics, sensor, and/or image data collected; and/or (4) create a blockchain for the vehicle collision, or a new block for an existing blockchain, with one or more links to, or otherwise means for accessing, the sensor and/or image data collected, and an indication of the percentage of fault determined to facilitate blockchain-based claim handling. The system may include additional, less, or alternate functionality, including that discussed elsewhere herein.

For instance, the one or more processors, servers, sensors, and/or associated transceivers may be further configured to: receive (such as via wireless communication or data transmission over one or more radio links or communication channels) an electronic arbitration demand associated with the vehicle collision; and/or generate an electronic recommendation based upon, at least in part, processor analysis of, or processor comparison of, the percentage of fault and the electronic arbitration demand. The one or more processors, servers, sensors, and/or associated transceivers may be further configured to: generate a new block including the recommendation or a link thereto, or hash thereof or other associated hash; and/or add the new block to the blockchain.

The sensor and/or image data may be generated by smart infrastructure or by a vehicle (such as autonomous or semi-autonomous vehicle) not involved in the vehicle collision. The sensor and/or image data may include telematics data collected by the vehicle, a mobile device traveling within the vehicle, or another vehicle in the vicinity of the vehicle collision.

Determining a percentage of fault of the vehicle collision for a vehicle (including an autonomous vehicle or system) or a vehicle driver based upon, at least in part, processor analysis of the sensor and/or image data collected may include inputting the sensor and/or image data collected into a machine learning programmed trained to identify a percentage of fault for a vehicle or vehicle driver based upon sensor and/or image data. The electronic notification of a vehicle collision may be generated by the vehicle from processor analysis of sensor data generated by one or more vehicle-mounted sensors.

The electronic notification of a vehicle collision may be generated by the vehicle from processor analysis of image data generated by one or more vehicle-mounted sensors or cameras. The electronic notification of a vehicle collision is generated by the vehicle from processor analysis of telematics data (e.g., location, acceleration, speed, cornering, and braking data from before, during, and after the vehicle collision) generated by one or more vehicle-mounted sensors. The electronic notification of a vehicle collision may be generated by the vehicle from processor analysis of sensor data generated by one or more vehicle-mounted sensors, and sensor or other data, such as telematics data, received from the vehicle and/or one or more nearby vehicles in the vicinity of the vehicle collision location.

The one or more processors, servers, sensors, and/or associated transceivers may be further configured to: receive (such as via wireless communication or data transmission over one or more radio links or communication channels) an electronic subrogation demand associated with the vehicle collision; and/or generate an electronic recommendation based upon, at least in part, processor analysis of, or processor comparison of, the percentage of fault and the electronic subrogation demand.

The one or more processors, servers, sensors, and/or associated transceivers may be further configured to: generate a new block including the electronic recommendation, or an indication thereof, or a link thereto (or an associated hash); and/or add the new block to the blockchain.

The one or more processors, servers, sensors, and/or associated transceivers may be further configured to: generate an electronic subrogation demand based upon, at least in part, processor analysis of the sensor and/or image data collected and/or the percentage of fault determined for the vehicle or the vehicle driver (such as via artificial intelligence or machine learning techniques); and/or generate a block to add to the blockchain that includes a link to or an indication of the electronic subrogation demand (or an associated hash). The electronic subrogation demand may include one or more line items directed to medical expenses, vehicle repair costs, vehicle towing services, and/or rental vehicle expenses.

The one or more processors, servers, sensors, and/or associated transceivers may further be configured to: receive (such as via wireless communication or data transmission over one or more radio links or communication channels) an electronic subrogation demand associated with the vehicle collision; analyze the electronic subrogation demand, the sensor and/or image data collected, and/or the percentage of fault determined for the vehicle or the vehicle driver (such as by using artificial intelligence and/or machine learning techniques); generate an electronic recommendation to accept or dispute the subrogation demand; and/or generate a new block including a link to, or an indication of (or an associated hash of), the electronic recommendation to add to the blockchain.

The one or more processors, servers, sensors, and/or associated transceivers may be further configured to: generate an electronic arbitration demand based upon, at least in part, the sensor and/or image data collected and/or the percentage of fault determined for the vehicle or the vehicle driver; and/or generate a block to add to the blockchain that includes a link to, or an indication of (or an associated hash of), the electronic arbitration demand.

In another aspect, a computer system configured to handle an insurance claim via a shared ledger may be provided. The system may include one or more processors, servers, sensors, and/or associated transceivers configured to: (1) receive (such as via wireless communication or data transmission over one or more radio links or communication channels) or gathering telematics, sensor, and/or image data (such as vehicle-to-vehicle data, smart or autonomous vehicle data, mobile device data, smart infrastructure data, aerial data, vehicle telematics data, smart or interconnected home data, etc.); (2) determine that a vehicle collision (such as via wireless communication or data transmission over one or more radio links or communication channels) occurred based upon, at least in part, processor analysis of the telematics, sensor, and/or image data collected; (3) determine a percentage of fault of the vehicle collision for a vehicle, vehicle system, or a vehicle driver based upon, at least in part, processor analysis of the telematics, sensor, and/or image data collected; and/or (4) create a blockchain for the vehicle collision, or a new block for an existing blockchain, with the telematics, sensor, and/or image data, or one or more links to (or associated hashes of) the sensor and/or image data collected, and an indication of the percentage of fault determined to facilitate blockchain-based claim handling. The system may include additional, less, or alternate functionality, including that discussed elsewhere herein.

In another aspect, a computer system configured to handle an insurance claim via a shared ledger may be provided. The system may include one or more processors, servers, sensors, and/or associated transceivers configured to: (1) receive (such as via wireless communication or data transmission over one or more radio links or communication channels) or gather telematics, sensor, and/or image data (such as vehicle-to-vehicle data, smart or autonomous vehicle data, mobile device data, smart infrastructure data, aerial data, vehicle telematics data, smart or interconnected home data, etc.); (2) determine that a vehicle collision (such as via wireless communication or data transmission over one or more radio links or communication channels) occurred based upon, at least in part, processor analysis of the telematics, sensor, and/or image data collected; (3) determine an operational mode for the vehicle based upon, at least in part, processor analysis of the telematics, sensor, and/or image data collected, the operational mode indicating whether the vehicle (e.g., an autonomous vehicle or system) or human driver had control of the vehicle before, during, and/or after the vehicle collision; (4) determine a percentage of fault, or lack thereof, of the vehicle collision for the vehicle (such as an autonomous vehicle or system) or the human vehicle driver based upon, at least in part, processor analysis of the sensor and/or image data collected, and what or whom was in control of the vehicle before, during, and/or after the vehicle collision, respectfully; and/or (5) create a blockchain for the vehicle collision, or a new block for an existing blockchain, with the telematics, sensor, and/or image data and/or one or more links to, or hashes of or associated with, the telematics, sensor, and/or image data collected, an indication of the operational mode for the vehicle at the time of vehicle collision, and/or an indication of the percentage of fault determined (for the vehicle, vehicle system, or the driver) to facilitate blockchain-based claim handling. The system may include additional, less, or alternate functionality, including that discussed elsewhere herein.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on drones, vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as drone, autonomous or semi-autonomous drone, image, mobile device, vehicle telematics, autonomous vehicle, smart vehicle, smart infrastructure data, aerial or satellite data, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

The telematics, sensor, image, or other types of data discussed herein (such as historical data sets associated with a known vehicle collision and damage) may be collected and input into one or more machine learning programs to determine a vehicle collision occurred; determine a percentage of fault, of lack thereof, for a vehicle (such as an autonomous vehicle or system) or vehicle driver; determine who was in control of the vehicle during the collision (the vehicle or vehicle driver); determine or estimate one or more line items for a subrogation demand or arbitration demand; determine or estimate vehicle damage or personal injuries resulting from the vehicle collision; and/or other functionality discussed herein based upon telematics, sensor, image, and/or other data collected or received that is associated with a present or new vehicle collision. Once a machine learning algorithm is trained using past or historical data, new data received associated with a current vehicle collision may be input into the trained machine learning algorithm, or a processor on which the trained machine learning algorithm resides, operates, and/or is running.

Additional Exemplary Embodiments

Figure 15:
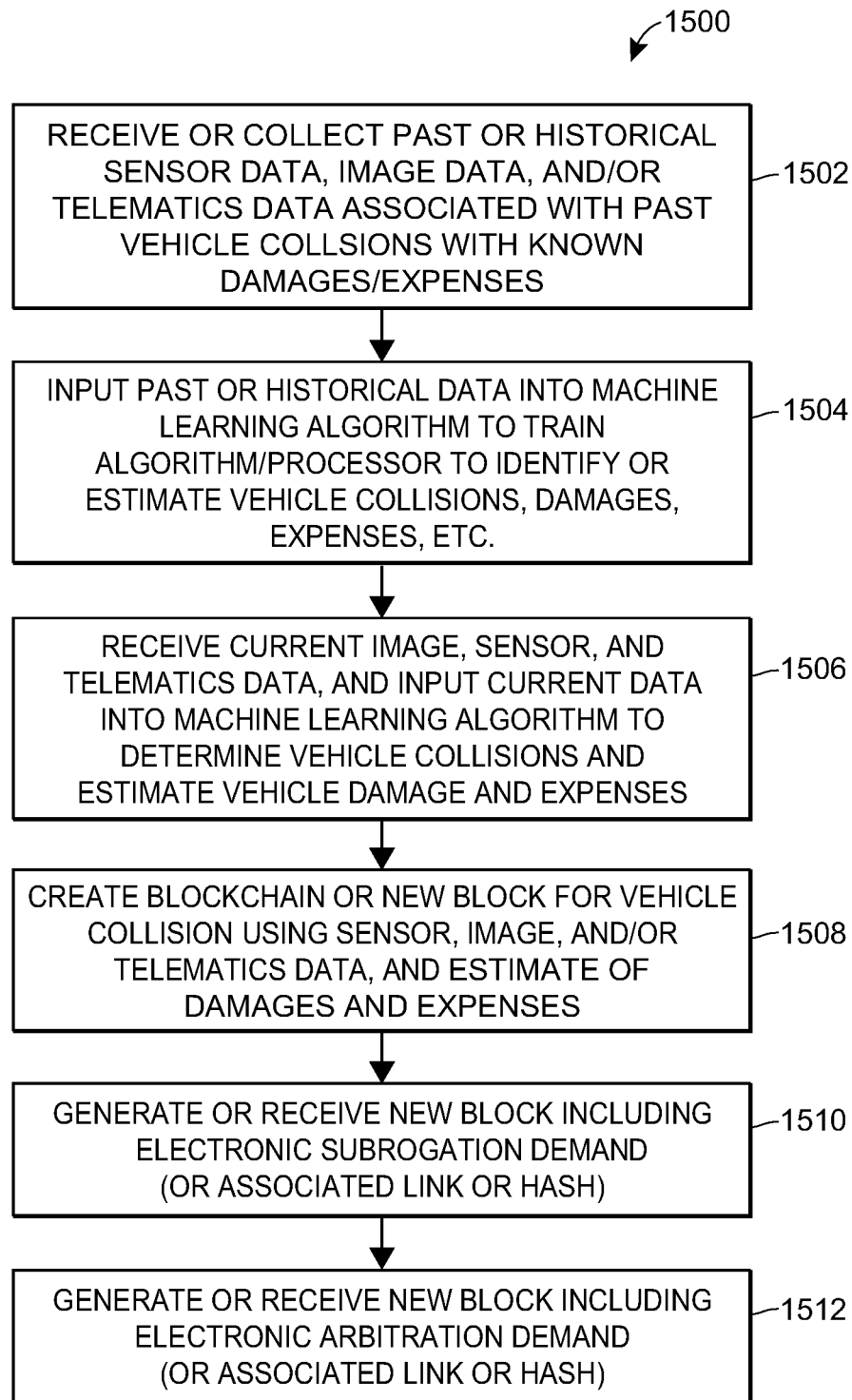

FIG. 15 depicts another computer-implemented method of handling an insurance claim via a shared ledger, and may include subrogation and/or arbitration aspects. The method 1500 may include, via one or more processors, servers, sensors, and/or associated transceivers: (1) receiving (such as via wireless communication or data transmission over one or more radio links or communication channels) or gathering past or historical sensor, telematics, and/or image data (such as vehicle-to-vehicle data, smart or autonomous vehicle data, mobile device data, smart infrastructure data, aerial data, drone data, vehicle telematics data, smart or interconnected home data, etc.) associated with a past insurance claim and/or past vehicle collision (having known (i) percentage of fault determined for one or more human drivers or self-driving vehicles or systems; (ii) vehicle damage; (iii) vehicle repair costs; (iv) personal injuries; (v) rental expenses; (vi) tow expenses; (vii) medical or other expenses; and/or (ix) operational mode at the time of the collision) (block 1502); (2) inputting the past or historical sensor, telematics, and/or image into a processor configured with a machine learning algorithm to train the processor and/or machine learning algorithm to determine, identify, or estimate (i) a vehicle collision occurred; (ii) percentage of fault for one or more human drivers or self-driving vehicles or systems; (iii) vehicle damage; (iv) vehicle repair costs; (v) personal injuries; (vi) rental expenses; (vii) tow expenses; (viii) medical expenses; and/or (ix) vehicle operational mode (human or machine control) at the time of the collision (block 1504); (3) receiving (such as via wireless communication or data transmission over one or more radio links or communication channels) or gathering new or current sensor, telematics, and/or image data (such as vehicle-to-vehicle data, smart or autonomous vehicle data, mobile device data, smart infrastructure data, aerial data, drone data, vehicle telematics data, smart or interconnected home data, etc.) (block 1506); and/or (4) inputting the new or current sensor, telematics, and/or image into the processor configured with the trained machine learning algorithm to determine or estimate (i) a vehicle collision occurred; (ii) percentage of fault for one or more human drivers or self-driving vehicles; (iii) vehicle damage; (iv) vehicle repair costs; (v) personal injuries; (vi) rental expenses; (vii) tow expenses; (viii) medical expenses; and/or (ix) vehicle operational mode, wherein the trained machine learning algorithm may determine that a vehicle collision occurred; a vehicle operational mode at the time of the collision; a percentage of fault of the vehicle collision for a vehicle, vehicle system, or a vehicle driver based upon the new or current sensor, telematics, and/or image data collected; and/or vehicle damages, medical expenses, or other vehicle collision-related expenses (block 1508).

The method 1500 may also include creating a blockchain for the vehicle collision, or a new block for an existing blockchain, with the new or current sensor, telematics, and/or image data, or one or more links to, or hashes of (or other hashes associated with), the sensor, telematics, and/or image data collected, and/or an indication that a vehicle collision occurred, the operational mode, an indication of the percentage of fault, and the amount of estimated vehicle damages or other vehicle collision-related expenses determined to facilitate blockchain-based claim handling. The method 1500 may include generating or receiving a new block or blockchain that includes or indicates an electronic subrogation demand (block 1510) or electronic arbitration demand (block 1512). The machine learning program may be further trained to analyze any electronic subrogation or arbitration demands received from another insurance carrier or party, and/or generate an electronic recommendation to accept, reject, or dispute any portion of the demand, and/or expense related line items therein. The method may include additional, less or alternate actions, including those discussed elsewhere herein.

In one aspect, a computer-implemented method of handling an insurance claim via a shared ledger may be provided. The method may include, via one or more processors, servers, sensors, and/or associated transceivers: (1) receiving (such as via wireless communication or data transmission over one or more radio links or communication channels) and/or collecting or gathering past or historical sensor, telematics, and/or image data (such as vehicle-to-vehicle data, smart or autonomous vehicle data, mobile device data, smart infrastructure data, aerial data, drone data, vehicle telematics data, smart or interconnected home data, etc.) associated with a past insurance claim and/or past vehicle collision (having known (i) percentage of fault determined for one or more human drivers or self-driving vehicles; (ii) vehicle damage; (iii) vehicle repair costs; (iv) personal injuries; (v) rental expenses; (vi) tow expenses; and/or (vii) medical expenses); (2) inputting the past or historical sensor, telematics, and/or image into a processor configured with a machine learning algorithm to train the processor and/or machine learning algorithm to determine or estimate (i) a vehicle collision occurred; (ii) percentage of fault for one or more human drivers or self-driving vehicles; (iii) vehicle damage; (iv) vehicle repair costs; (v) personal injuries; (vi) rental expenses; (vii) tow expenses; and/or (viii) medical expenses; (3) receiving (such as via wireless communication or data transmission over one or more radio links or communication channels) or gathering new or current sensor, telematics, and/or image data (such as vehicle-to-vehicle data, smart or autonomous vehicle data, mobile device data, smart infrastructure data, aerial data, drone data, vehicle telematics data, smart or interconnected home data, etc.); (4) inputting the new or current sensor, telematics, and/or image into the processor configured with the trained machine learning algorithm to determine or estimate (i) a vehicle collision occurred; (ii) percentage of fault for one or more human drivers or self-driving vehicles; (iii) vehicle damage; (iv) vehicle repair costs; (v) personal injuries; (vi) rental expenses; (vii) tow expenses; and/or (viii) medical expenses, wherein the trained machine learning algorithm at least determines that a vehicle collision occurred, and/or a percentage of fault of the vehicle collision for a vehicle or a vehicle driver based upon the new or current sensor, telematics, and/or image data collected; and/or (5) creating a blockchain for the vehicle collision, or a new block for an existing blockchain, with the new or current sensor, telematics, and/or image data, or one or more links to the sensor, telematics, and/or image data collected, and/or an indication that a vehicle collision occurred and/or an indication of the percentage of fault determined to facilitate blockchain-based claim handling.

The method may include, via one or more processors, servers, sensors, and/or associated transceivers: receiving (such as via wireless communication or data transmission over one or more radio links or communication channels) an electronic arbitration demand associated with the vehicle collision; and/or generating an electronic recommendation based upon, at least in part, processor analysis of, or a comparison of, the percentage of fault and the electronic arbitration demand (such as by using artificial intelligence or machine learning techniques).

The method may include, via one or more processors, servers, sensors, and/or associated transceivers: receiving (such as via wireless communication or data transmission over one or more radio links or communication channels) an electronic subrogation demand associated with the vehicle collision; and/or inputting the electronic subrogation demand and the new or current sensor, telematics, and/or image data into a machine learning algorithm trained to determine an electronic recommendation indicating whether to accept, reject, or dispute portions (and/or line items) of the electronic subrogation demand based upon the electronic subrogation demand and the new or current sensor, telematics, and/or image data. The method may include generating a new block including the electronic recommendation, an indication thereof, or link thereto; and/or adding the new block to the blockchain.

The new or current sensor, telematics, and/or image data may be generated by smart infrastructure or by a vehicle not involved in the vehicle collision, but in the vicinity of the vehicle collision location at the time of the vehicle collision. The new or current sensor, telematics, and/or image data may include telematics data generated and/or collected by the vehicle, a mobile device traveling within the vehicle, another vehicle involved in the vehicle collision, and/or another vehicle in the vicinity of the vehicle collision.

The machine learning algorithm may be further trained to determine whether an autonomous vehicle or a human driver was in control of the vehicle before, during, and/or after the vehicle collision based upon, at least in part, processor analysis of the new or current sensor, telematics, and/or image data collected.

The method may include, via one or more processors, servers, sensors, and/or associated transceiver: receiving (such as via wireless communication or data transmission over one or more radio links or communication channels) an electronic subrogation demand associated with the vehicle collision; and/or generating an electronic recommendation based upon, at least in part, processor analysis of, or processor comparison of, the percentage of fault and the electronic subrogation demand (such as by using artificial intelligence or machine learning techniques).

The method may include, via one or more processors, servers, sensors, and/or associated transceivers: generating a new block including the electronic recommendation, or an indication thereof, or a link thereto or associated hash; and/or adding the new block to the blockchain.

The method may include, via one or more processors, servers, sensors, and/or associated transceivers: generating an electronic subrogation demand based upon, at least in part, processor analysis of the sensor and/or image data collected and/or the percentage of fault determined for the vehicle or the vehicle driver (such as via artificial intelligence or machine learning techniques); and/or generating a block to add to the blockchain that includes a link to or an indication of the electronic subrogation demand. The electronic subrogation demand may include one or more lines items directed to medical, vehicle repair, tow services, and/or rental vehicle expenses. Additionally or alternatively, the machine learning algorithm may be trained to generate or estimate line items associated with medical, vehicle repair, towing services, and/or rental vehicle expenses based upon the new or current sensor, telematics, and/or image data collected or generated.

The method may include, via one or more processors, servers, sensors, and/or associated transceivers: receiving (such as via wireless communication or data transmission over one or more radio links or communication channels) an electronic subrogation demand associated with the vehicle collision; analyzing the electronic subrogation demand, the telematics, sensor, and/or image data collected, and/or the percentage of fault determined for the vehicle or the vehicle driver (such as by using artificial intelligence and/or machine learning techniques); generating a recommendation to accept or dispute the subrogation demand; and/or generating a new block including a link to, or an indication of, the recommendation to add to the blockchain.

The method may include, via one or more processors, servers, sensors, and/or associated transceivers: generating an electronic arbitration demand based upon, at least in part, the sensor and/or image data collected and/or the percentage of fault determined for the vehicle or the vehicle driver (such as by using artificial intelligence and/or machine learning techniques); and/or generating a block to add to the blockchain that includes a link to or hash thereof, or an indication of, the electronic arbitration demand.

The trained machine learning algorithm may be further trained to generate an electronic arbitration demand based upon, at least in part, the sensor, telematics, and/or image data collected, the percentage of fault determined for the vehicle or the vehicle driver, and/or one or more line items associated with vehicle repair or medical expense. The method may include, via one or more processors, servers, sensors, and/or associated transceivers generating a block to add to the blockchain that includes a link to, or an indication of, the electronic arbitration demand.

In another aspect, a computer-implemented method of handling an insurance claim via a shared ledger may be provided. The method may include, via one or more processors, servers, sensors, and/or associated transceivers: (1) receiving (such as via wireless communication or data transmission over one or more radio links or communication channels) and/or collecting or gathering past or historical sensor, telematics, and/or image data (such as vehicle-to-vehicle data, smart or autonomous vehicle data, mobile device data, smart infrastructure data, aerial data, drone data, vehicle telematics data, smart or interconnected home data, etc.) associated with known insurance claims and expenses, and/or known vehicle collisions (such as associated with vehicle collisions with known vehicle repair, towing, rental, and/or medical expenses); (2) inputting the past or historical sensor, telematics, and/or image data into a machine learning program to train the machine learning program to identify, determine or estimate (i) a vehicle collision occurred; (ii) percentage of fault for one or more human drivers or self-driving vehicles or systems; (iii) an operational mode at the time of the vehicle collision, e.g., whether an autonomous vehicle or system, or human driver was in control of the vehicle before, during, and/or after the vehicle collision; (iv) vehicle damage and/or vehicle repair costs; (v) personal injuries; (vi) rental expenses; (vii) tow expenses; and/or (viii) medical expenses; (3) receiving (such as via wireless communication or data transmission over one or more radio links or communication channels) and/or collecting or gathering new or current sensor, telematics, and/or image data (such as vehicle-to-vehicle data, smart or autonomous vehicle data, mobile device data, smart infrastructure data, aerial data, drone data, vehicle telematics data, smart or interconnected home data, etc.); (4) inputting the new or current sensor, telematics, and/or image into the processor configured with the trained machine learning algorithm to identify, determine or estimate (i) a vehicle collision occurred; (ii) percentage of fault for one or more human drivers or self-driving vehicles or systems; (iii) an operational mode at the time of vehicle collision; (iv) vehicle damage and/or vehicle repair costs; (v) personal injuries; (vi) rental expenses; (vii) tow expenses; and/or (viii) medical expenses, wherein the trained machine learning algorithm at least determines or identifies that a vehicle collision occurred; an operational mode of the vehicle before, during, and/or after the vehicle collision; and/or a percentage of fault of the vehicle collision for a vehicle, vehicle system(s), or a vehicle driver based upon the new or current sensor, telematics, and/or image data collected; and/or (5) creating a blockchain for the vehicle collision, or a new block for an existing blockchain, with the sensor, telematics, and/or image data and/or one or more links to the sensor, telematics, and/or image data collected, an indication of the operational mode for the vehicle at the time of vehicle collision and/or before, during, and/or after the vehicle collision, and/or an indication of the percentage of fault determined (for the vehicle (such as for an autonomous or semi-autonomous system or technology) or the driver) to facilitate blockchain-based claim handling.

The machine learning algorithm may be further trained to determine which vehicle or driver involved in the collision had the last clear chance to avoid the vehicle collision based upon, at least in part, the new or current sensor, telematics, and/or image data.

The machine learning algorithm may be further trained to determine whether the vehicle or the driver had the last clear chance to avoid the vehicle collision based upon, at least in part, the new or current sensor, telematics, and/or image data. Determining whether the vehicle, vehicle system, or human driver had the last clear chance to avoid the vehicle collision based upon, at least in part, processor analysis of the sensor and/or image data collected may include inputting the past or historical sensor, telematics, and/or image data into a machine learning program trained to identify a party or vehicle that had the last clear chance to avoid the vehicle collision using sensor and/or image data (including telematics data).

The method may also include determining which vehicle (or autonomous or semi-autonomous vehicle system or technology) or human driver had the last clear chance to avoid the vehicle collision based upon, at least in part, processor analysis of telematics data collected from two or more vehicles involved in the vehicle collision.

Additionally or alternatively, the method may include determining which vehicle (or autonomous or semi-autonomous vehicle system or technology) or human driver had the last clear chance to avoid the vehicle collision based upon, at least in part, processor analysis of telematics data collected from one or more vehicles involved in the vehicle collision, and smart infrastructure sensor, autonomous or semi-autonomous vehicle system or technology data, and/or image data.

In another aspect, a computer-implemented method of handling an insurance claim via a shared ledger may be provided. The method may include, via one or more processors, servers, sensors, and/or associated transceivers: (1) receiving (such as via wireless communication or data transmission over one or more radio links or communication channels) and/or collecting or gathering past or historical sensor, telematics, and/or image data (such as vehicle-to-vehicle data, smart or autonomous vehicle image, sensor, operational, control decision, or other data, mobile device data, smart infrastructure data, aerial data, drone data, vehicle telematics data, smart or interconnected home data, etc.) associated with known insurance claims and expenses, and/or known vehicle collisions (such as associated with vehicle collisions with known vehicle repair, towing, rental, and/or medical expenses); (2) inputting the past or historical sensor, telematics, and/or image data into a machine learning program to train the machine learning program to identify, determine or estimate (i) a vehicle collision occurred; (ii) percentage of fault for one or more human drivers or self-driving vehicles or systems; (iii) an operational mode at the time of the vehicle collision, e.g., whether an autonomous vehicle or system, or human driver was in control of the vehicle before, during, and/or after the vehicle collision; (iv) vehicle damage and/or vehicle repair costs; (v) personal injuries; (vi) rental expenses; (vii) tow expenses; (viii) medical expenses; and/or (ix) a subrogation or arbitration demand associated with the vehicle collision; (3) receiving (such as via wireless communication or data transmission over one or more radio links or communication channels) or gathering new or current sensor, telematics, and/or image data (such as vehicle-to-vehicle data, smart or autonomous vehicle data, mobile device data, smart infrastructure data, aerial data, drone data, vehicle telematics data, smart or interconnected home data, etc.); (4) inputting the new or current sensor, telematics, and/or image into the processor configured with the trained machine learning algorithm to identify, determine or estimate (i) a vehicle collision occurred; (ii) percentage of fault for one or more human drivers or self-driving vehicles or systems; (iii) an operational mode at the time of vehicle collision; (iv) vehicle damage and/or vehicle repair costs; (v) personal injuries; (vi) rental expenses; (vii) tow expenses; and/or (viii) medical expenses, wherein the trained machine learning algorithm at least determines or identifies that a vehicle collision occurred; an operational mode of the vehicle before, during, and/or after the vehicle collision; and/or a percentage of fault of the vehicle collision for a vehicle, vehicle system, or a vehicle driver based upon the new or current sensor, telematics, and/or image data collected; (5) receiving an electronic subrogation demand generated by another party for the vehicle collision; (6) comparing the electronic subrogation demand with the determinations made by, or output of, the machine learning algorithm to accept, reject, or dispute one or more portions, and/or one or more line items, of the subrogation demand; (7) generating an electronic recommendation to accept, reject, or dispute one or more portions, and/or one or more line items, of the electronic subrogation demand based upon the comparison; and/or (8) creating a blockchain for the vehicle collision, or a new block for an existing blockchain, with the electronic subrogation demand and/or electronic recommendation, and/or links thereto or hashes thereof or other associated hashes, to facilitate blockchain-based claim handling and communicating a response to the subrogation demand.

The electronic recommendation may accept, reject, or dispute a last clear chance to avoid the vehicle collision (whether for a vehicle (or autonomous or semi-autonomous vehicle system or technology) or driver). The electronic recommendation may accept reject, or dispute one or more line items, the one or more line items associated with: vehicle damages, repair costs, towing expenses, rental expenses, personal injuries, and/or medical expenses.

The electronic recommendation may accept, reject, or dispute a vehicle operational mode at the time of vehicle collision. The electronic recommendation may accept, reject, or dispute a percentage of fault for the vehicle collision assigned to a vehicle (or autonomous or semi-autonomous vehicle system or technology) or a driver.

The electronic recommendation may accept, reject, or dispute whether one or more parties or vehicles (or autonomous or semi-autonomous vehicle systems or technologies) were at least partially at fault. The electronic recommendation may accept, reject, or dispute the party or parties at fault of causing the vehicle collision.

The electronic recommendation may accept, reject, or dispute whether an autonomous vehicle functionality or technology was at fault, or at least partially at fault for causing the vehicle collision. The electronic recommendation may accept, reject, or dispute which, or which type of, autonomous vehicle functionality or technology was at fault, or at least partially at fault for causing the vehicle collision.

The electronic recommendation may accept, reject, or dispute (1) an amount to repair autonomous vehicle functionality or technology damaged during the vehicle collision; and/or (2) whether an autonomous vehicle functionality or technology damaged during the vehicle collision needs to be repaired or replaced.

In another aspect, a computer-implemented method of handling an insurance claim via a shared ledger may be provided. The method may include, via one or more processors, servers, sensors, and/or associated transceivers: (1) receiving (such as via wireless communication or data transmission over one or more radio links or communication channels) and/or collecting or gathering past or historical sensor, telematics, and/or image data (such as vehicle-to-vehicle data, smart or autonomous vehicle image, sensor, operational, control decision, or other data, mobile device data, smart infrastructure data, aerial data, drone data, vehicle telematics data, smart or interconnected home data, etc.) associated with known insurance claims and expenses, and/or known vehicle collisions (such as associated with vehicle collisions with known vehicle repair, towing, rental, and/or medical expenses); (2) inputting the past or historical sensor, telematics, and/or image data into a machine learning program to train the machine learning program to identify, determine, or estimate (i) a vehicle collision occurred; (ii) percentage of fault for one or more human drivers or self-driving vehicles or systems; (iii) an operational mode at the time of the vehicle collision, e.g., whether an autonomous vehicle or human driver was in control of the vehicle before, during, and/or after the vehicle collision; (iv) vehicle damage and/or vehicle repair costs; (v) personal injuries; (vi) rental expenses; (vii) tow expenses; (viii) medical expenses; and/or (ix) a subrogation or arbitration demand associated with the vehicle collision; (3) receiving (such as via wireless communication or data transmission over one or more radio links or communication channels) and/or collecting or gathering new or current sensor, telematics, and/or image data (such as vehicle-to-vehicle data, smart or autonomous vehicle image, sensor, operation, control decision, or other data, mobile device data, smart infrastructure data, aerial data, drone data, vehicle telematics data, smart or interconnected home data, etc.); (4) inputting the new or current sensor, telematics, and/or image into the processor configured with the trained machine learning algorithm to identify, determine or estimate (i) a vehicle collision occurred; (ii) percentage of fault for one or more human drivers or self-driving vehicles (or vehicle systems); (iii) an operational mode at the time of vehicle collision; (iv) vehicle damage and/or vehicle repair costs; (v) personal injuries; (vi) rental expenses; (vii) tow expenses; and/or (viii) medical expenses, wherein the trained machine learning algorithm at least determines or identifies that a vehicle collision occurred; an operational mode of the vehicle before, during, and/or after the vehicle collision; and/or a percentage of fault of the vehicle collision for a vehicle (or autonomous or semi-autonomous vehicle system or technology) or a vehicle driver based upon the new or current sensor, telematics, and/or image data collected; (5) receiving an electronic arbitration demand generated by another party for the vehicle collision; (6) comparing the electronic subrogation demand with the determinations made by, or output of, the machine learning algorithm to accept, reject, or dispute one or more portions, and/or one or more line items, of the electronic arbitration demand; (7) generating an electronic recommendation to accept, reject, or dispute one or more portions, and/or one or more line items, of the electronic arbitration demand based upon the comparison; and/or (8) creating a blockchain for the vehicle collision, or a new block for an existing blockchain, with the electronic arbitration and/or the electronic recommendation, or links thereto or hashes thereof (or other associated hashes), to facilitate blockchain-based claim handling and communicating a response to the electronic arbitration demand. The foregoing computer-implemented methods may include additional, less, or alternate actions, including those discussed elsewhere herein.

In another aspect, a computer system configured to handle an insurance claim via a shared ledger may be provided. The system may include one or more processors, servers, sensors, and/or associated transceivers configured to: (1) receive (such as via wireless communication or data transmission over one or more radio links or communication channels) and/or gather past or historical sensor, telematics, and/or image data (such as vehicle-to-vehicle data, smart or autonomous vehicle image, sensor, operational, control decision, or other data, mobile device data, smart infrastructure data, aerial data, drone data, vehicle telematics data, smart or interconnected home data, etc.) associated with a past insurance claim and/or past vehicle collision (having known (i) percentage of fault determined for one or more human drivers or self-driving vehicles or systems; (ii) vehicle damage; (iii) vehicle repair costs; (iv) personal injuries; (v) rental expenses; (vi) tow expenses; and/or (vii) medical expenses); (2) input the past or historical sensor, telematics, and/or image into a processor configured with a machine learning algorithm to train the processor and/or machine learning algorithm to determine or estimate (i) a vehicle collision occurred; (ii) percentage of fault for one or more human drivers or self-driving vehicles or systems; (iii) vehicle damage; (iv) vehicle repair costs; (v) personal injuries; (vi) rental expenses; (vii) tow expenses; and/or (viii) medical expenses; (3) receive (such as via wireless communication or data transmission over one or more radio links or communication channels) and/or collect or gather new or current sensor, telematics, and/or image data (such as vehicle-to-vehicle data, smart or autonomous vehicle sensor, image, operational, control decision, or other data, mobile device data, smart infrastructure data, aerial data, drone data, vehicle telematics data, smart or interconnected home data, etc.); (4) input the new or current sensor, telematics, and/or image into the processor configured with the trained machine learning algorithm to determine or estimate (i) a vehicle collision occurred; (ii) percentage of fault for one or more human drivers or self-driving vehicles or technologies; (iii) vehicle damage; (iv) vehicle repair costs; (v) personal injuries; (vi) rental expenses; (vii) tow expenses; and/or (viii) medical expenses, wherein the trained machine learning algorithm at least determines that a vehicle collision occurred, and a percentage of fault of the vehicle collision for a vehicle (or autonomous or semi-autonomous vehicle system or technology) or a vehicle driver based upon the new or current sensor, telematics, and/or image data collected (which may include autonomous or semi-autonomous vehicle system image, sensor, operational, control decision, or other data); and/or (5) create a blockchain for the vehicle collision, or a new block for an existing blockchain, with the new or current sensor, telematics, and/or image data, or one or more links to the sensor, telematics, and/or image data collected (which may include autonomous or semi-autonomous vehicle system image, sensor, operational, control decision, or other data), and/or an indication that a vehicle collision occurred and/or an indication of the percentage of fault determined to facilitate blockchain-based claim handling. The system may be further configured to generate and/or analyze electronic subrogation or arbitration demands.

In another aspect, a computer system configured to handle an insurance claim via a shared ledger may be provided. The system may include one or more processors, servers, sensors, and/or associated transceivers configured to: (1) receive (such as via wireless communication or data transmission over one or more radio links or communication channels) and/or gather past or historical sensor, telematics, and/or image data (such as vehicle-to-vehicle data; smart or autonomous vehicle image, sensor, operational, control decision, or other data; mobile device data; smart infrastructure data; aerial data; drone data; vehicle telematics data; smart or interconnected home data; etc.) associated with known insurance claims and expenses, and/or known vehicle collisions (such as associated with vehicle collisions with known vehicle repair, towing, rental, and/or medical expenses); (2) input the past or historical sensor, telematics, and/or image data into a machine learning program to train the machine learning program to identify, determine, or estimate (i) a vehicle collision occurred; (ii) percentage of fault for one or more human drivers or self-driving vehicles or technologies; (iii) an operational mode at the time of the vehicle collision, e.g., whether an autonomous vehicle or human driver was in control of the vehicle before, during, and/or after the vehicle collision; (iv) vehicle damage and/or vehicle repair costs; (v) personal injuries; (vi) rental expenses; (vii) tow expenses; and/or (viii) medical expenses; (3) receive (such as via wireless communication or data transmission over one or more radio links or communication channels) and/or gather new or current sensor, telematics, and/or image data (such as vehicle-to-vehicle data, smart or autonomous vehicle sensor, operational, image, control decision, or other data, mobile device data, smart infrastructure data, aerial data, drone data, vehicle telematics data, smart or interconnected home data, etc.); (4) input the new or current sensor, telematics, and/or image data (which may include autonomous or semi-autonomous vehicle system image, sensor, operational, control decision, or other data) into the processor configured with the trained machine learning algorithm to identify, determine, or estimate (i) a vehicle collision occurred; (ii) percentage of fault for one or more human drivers or self-driving vehicles or technologies; (iii) an operational mode at the time of vehicle collision; (iv) vehicle damage and/or vehicle repair costs; (v) personal injuries; (vi) rental expenses; (vii) tow expenses; and/or (viii) medical expenses, wherein the trained machine learning algorithm at least determines or identifies that a vehicle collision occurred; an operational mode of the vehicle before, during, and/or after the vehicle collision; and/or a percentage of fault of the vehicle collision for a vehicle (which may include autonomous or semi-autonomous vehicle systems) or a vehicle driver based upon the new or current sensor, telematics, and/or image data collected (which may include autonomous or semi-autonomous vehicle system image, sensor, operational, control decision, telematics, or other data); and/or (5) create a blockchain for the vehicle collision, or a new block for an existing blockchain, with the sensor, telematics, and/or image data and/or one or more links to the sensor, telematics, and/or image data collected (which may include autonomous or semi-autonomous vehicle system image, sensor, operational, control decision, telematics, or other data), an indication of the operational mode for the vehicle at the time of vehicle collision and/or before, during, and/or after the vehicle collision, and/or an indication of the percentage of fault determined (for the vehicle or the driver) to facilitate blockchain-based claim handling.

In another aspect, a computer system configured to handle an insurance claim via a shared ledger may be provided. The system may include one or more processors, servers, sensors, and/or associated transceivers configured to: (1) receive (such as via wireless communication or data transmission over one or more radio links or communication channels) and/or collect or gather past or historical sensor, telematics, and/or image data (such as vehicle-to-vehicle data, smart or autonomous vehicle sensor, operational, control decision, or other data, mobile device data, smart infrastructure data, aerial data, drone data, vehicle telematics data, smart or interconnected home data, etc.) associated with known insurance claims and expenses, and/or known vehicle collisions (such as associated with vehicle collisions with known vehicle repair, towing, rental, and/or medical expenses); (2) input the past or historical sensor, telematics, and/or image data (which may include autonomous or semi-autonomous vehicle system image, sensor, operational, control decision, or other data) into a machine learning program to train the machine learning program to identify, determine or estimate (i) a vehicle collision occurred; (ii) percentage of fault for one or more human drivers or self-driving vehicles (or associated autonomous or semi-autonomous vehicle technologies or systems); (iii) an operational mode at the time of the vehicle collision, e.g., whether an autonomous vehicle or human driver was in control of the vehicle before, during, and/or after the vehicle collision; (iv) vehicle damage and/or vehicle repair costs; (v) personal injuries; (vi) rental expenses; (vii) tow expenses; (viii) medical expenses; and/or (ix) a subrogation or arbitration demand associated with the vehicle collision; (3) receive (such as via wireless communication or data transmission over one or more radio links or communication channels) and/or gather new or current sensor, telematics, and/or image data (such as vehicle-to-vehicle data, smart or autonomous vehicle sensor, operational, control decision, or other data, mobile device data, smart infrastructure data, aerial data, drone data, vehicle telematics data, smart or interconnected home data, etc.); (4) input the new or current sensor, telematics, and/or image into the processor configured with the trained machine learning algorithm to identify, determine, or estimate (i) a vehicle collision occurred; (ii) percentage of fault for one or more human drivers or self-driving vehicles (or associated technologies); (iii) an operational mode at the time of vehicle collision; (iv) vehicle damage and/or vehicle repair costs; (v) personal injuries; (vi) rental expenses; (vii) tow expenses; and/or (viii) medical expenses, wherein the trained machine learning algorithm at least determines or identifies that a vehicle collision occurred; an operational mode of the vehicle before, during, and/or after the vehicle collision; and/or a percentage of fault of the vehicle collision for a vehicle (or autonomous or semi-autonomous system) or a vehicle driver based upon the new or current sensor, telematics, and/or image data collected (which may include autonomous or semi-autonomous vehicle system image, sensor, operational, control decision, or other data); (5) receive an electronic subrogation demand generated by another party for the vehicle collision; (6) compare the electronic subrogation demand with the determinations made by, or output of, the machine learning algorithm to accept, reject, or dispute one or more portions, and/or one or more line items, of the subrogation demand; (7) generate an electronic recommendation to accept, reject, or dispute one or more portions, and/or one or more line items, of the subrogation demand based upon the comparison; and/or (8) create a blockchain for the vehicle collision, or a new block for an existing blockchain, with the electronic subrogation demand and/or electronic recommendation, and/or links thereto or hashes thereof (or other associated hashes), to facilitate blockchain-based claim handling and communicating a response to the subrogation demand.

In another aspect, a computer system configured to handle or process an insurance claim via a shared ledger may be provided. The system may include one or more processors, servers, sensors, and/or associated transceivers configured to: (1) receive (such as via wireless communication or data transmission over one or more radio links or communication channels) and/or gather or collect past or historical sensor, telematics, and/or image data (such as vehicle-to-vehicle data, smart or autonomous vehicle sensor, operational, image, control decision, or other data, mobile device data, smart infrastructure data, aerial data, drone data, vehicle telematics data, smart or interconnected home data, etc.) associated with known insurance claims and expenses, and/or known vehicle collisions (such as associated with vehicle collisions with known vehicle repair, towing, rental, and/or medical expenses); (2) input the past or historical sensor, telematics, and/or image data into a machine learning program to train the machine learning program to identify, determine, or estimate (i) a vehicle collision occurred; (ii) percentage of fault for one or more human drivers or self-driving vehicles (or associated autonomous or semi-autonomous vehicle technologies or systems); (iii) an operational mode at the time of the vehicle collision, e.g., whether an autonomous vehicle (or autonomous or semi-autonomous vehicle system) or human driver was in control of the vehicle before, during, and/or after the vehicle collision; (iv) vehicle damage and/or vehicle repair costs; (v) personal injuries; (vi) rental expenses; (vii) tow expenses; (viii) medical expenses; and/or (ix) a subrogation or arbitration demand associated with the vehicle collision; (3) receive (such as via wireless communication or data transmission over one or more radio links or communication channels) and/or collect or gather new or current sensor, telematics, and/or image data (such as vehicle-to-vehicle data, smart or autonomous vehicle operational, image, or sensor data, mobile device data, smart infrastructure data, aerial data, drone data, vehicle telematics data, smart or interconnected home data, etc.); (4) input the new or current sensor, telematics, and/or image into the processor configured with the trained machine learning algorithm to identify, determine or estimate (i) a vehicle collision occurred; (ii) percentage of fault for one or more human drivers or self-driving vehicles or systems; (iii) an operational mode at the time of vehicle collision; (iv) vehicle damage and/or vehicle repair costs; (v) personal injuries; (vi) rental expenses; (vii) tow expenses; and/or (viii) medical expenses, wherein the trained machine learning algorithm at least determines or identifies that a vehicle collision occurred; an operational mode of the vehicle before, during, and/or after the vehicle collision; and/or a percentage of fault of the vehicle collision for a vehicle, an autonomous or semi-autonomous vehicle system or technology, or a vehicle driver based upon the new or current sensor, telematics, and/or image data collected (which may include autonomous or semi-autonomous vehicle system or technology sensor, image, or operational data); (5) receive an electronic arbitration demand generated by another party for the vehicle collision; (6) compare the electronic subrogation demand with the determinations made by, or output of, the machine learning algorithm to accept, reject, or dispute one or more portions, and/or one or more line items, of the electronic arbitration demand; (7) generate an electronic recommendation to accept, reject, or dispute one or more portions, and/or one or more line items, of the electronic arbitration demand based upon the comparison; and/or (8) create a blockchain for the vehicle collision, or a new block for an existing blockchain, with the electronic arbitration demand and/or the electronic recommendation, or links thereto or hashes thereof, to facilitate blockchain-based claim handling and communicating a response to the electronic arbitration demand.

The foregoing computer systems may include additional, less, or alternate functionality, including that discussed elsewhere herein.

Additional Considerations

This detailed description is to be construed as exemplary only and does not describe every possible embodiment, as describing every possible embodiment would be impractical, if not impossible. One may be implement numerous alternate embodiments, using either current technology or technology developed after the filing date of this application.

An authoritative, trusted, immutable, distributed, shareable, secure system may be needed to record if a human driver is controlling a vehicle, and/or if the vehicle is acting autonomously. The record may include crash sensor data to record crash information correlating to driver control information.

Blockchain technology may be used to store the transactions of control instances (from autonomous to human control to autonomous, for example). These control instances may be stored as they occur into blocks. Accordingly, this data may be included into the distributed ledger environment of the blockchain. In this environment, a consensus system may fix the events/blocks immutably and securely.

As noted herein, after collection of the information regarding the vehicle by one or more nodes within a communication network, a transaction (and/or new block) including the vehicle information collected may be broadcast to the blockchain, and/or a new block verified and then added to the blockchain to reflect an updated state of the vehicle. For each of the computer-implemented methods discussed herein, in one embodiment, a transaction and/or new block may be generated and then broadcast to the blockchain network for verification once vehicle data, and/or or new sensor or other data, have been generated and/or collected by one or more nodes within the communication network. As such, tracking the status of a vehicle may be more reliable and/or fraud-resistant as each node may include a proof-of-identity in its transaction modifying the state of the vehicle and/or vehicle-related blocks or blockchain.

Further, with the computer-implemented methods discussed herein, network participants may function as full nodes that validate and/or generate new blocks and transactions, and/or compile transactions into blocks that are then added to the network. However, not all participants need be nodes that compile transactions into blocks, and/or validate transactions and blocks received from other network participants—as some network participants may wish to rely on other network nodes to provide computer processing and/or storage services that enable usage of the system or blockchain.

In some scenarios, the blockchain may have public interfaces that allow visibility into the data. In one embodiment, a private blockchain interface may also be used by auto manufacturers, law enforcement, insurers, and regulatory agencies.

An element of smart contracts may also be enabled in the system. Depending on the sequence of events in the blockchain, terms of the smart contract may be executed immediately, such as sending a tow truck to the geolocation if tow assistance is a part of the policy, filing a legal action by a subrogation team of an insurer is brought against an auto manufacturer (for example, if an accident occurs when the autonomous vehicle was in autonomous control), conducting a policy review, filing a police report request with the jurisdiction of the roadway, processing claims awards made (for example, a partial payment if deductible is met, to handle car rental or minor medical expense), sending a renewal notice for the policy, and so on.

In some aspects, customers may opt-in to a rewards, loyalty, or other program. The customer may allow a remote server, such as an enforcement server, to collect sensor, telematics, smart or autonomous vehicle, mobile device, smart or interconnected home, and other types of data discussed herein. With customer permission or affirmative consent, the data collected may be analyzed to provide certain benefits to customers. For instance, insurance cost savings may be provided to lower risk or risk averse customers. Discounts, including cryptocurrency, may be awarded to accounts associated with the customer. The other functionality discussed herein may also be provided to customers in return for them allowing collection and analysis of the types of data discussed herein, as well as participating in the validation of the data discussed herein.

Further to this point, although the embodiments described herein often utilize credit report information as an example of sensitive information; the embodiments described herein are not limited to such examples. Instead, the embodiments described herein may be implemented in any suitable environment in which it is desirable to identify and control specific type of information. As part of implementing the automotive claims process, vehicle loss history, and the lifecycle of a Vehicle Identification Number, a financial institution may be a part of the process. For example, the aforementioned embodiments may be implemented by the financial institution to identify and contain bank account statements, brokerage account statements, tax documents, etc. To provide another example, the aforementioned embodiments may be implemented by a lender to not only identify, re-route, and quarantine credit report information, but to apply similar techniques to prevent the dissemination of loan application documents that are preferably delivered to a client for signature in accordance with a more secure means (e.g., via a secure login to a web server) than via email.

With the foregoing, a user may be an insurance customer who may opt-in to rewards, insurance discount, or other type of program. After the insurance customer provides their affirmative consent, an insurance provider remote server may collect data from the customer's mobile device, smart home controller, smart or autonomous vehicle, or other smart devices—such as with the customer's permission or affirmative consent. The data collected may be related to smart or autonomous vehicle functionality, smart home functionality (or home occupant preferences or preference profiles), smart or autonomous vehicle functionality, and/or insured assets before (and/or after) an insurance-related event, including those events discussed elsewhere herein. In return, risk averse insureds, vehicle owners, home owners, or home, apartment, or vehicle occupants may receive discounts or insurance cost savings related to home, renters, personal articles, auto, mobile, and other types of insurance from the insurance provider.

In one aspect, smart or autonomous vehicle data, smart or interconnected home data, and/or other data, including the types of data discussed elsewhere herein, may be collected or received by an insurance provider remote server, such as via direct or indirect wireless communication or data transmission from a smart or autonomous vehicle, smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home, apartment, or vehicle occupants.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "includes," "comprising," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A computer-implemented method for interacting with a distributed ledger maintained by a plurality of participants, the method comprising:
   receiving, at one or more processors, sensor data indicative of a vehicle accident;
   determining, at the one or more processors, that the vehicle accident has occurred based on the received sensor data;
   analyzing, at the one or more processors, a plurality of vehicle components to assess potential damage, the plurality of vehicle components including an engine of a vehicle involved in the accident, brakes, and a suspension system of the vehicle involved in the accident;
   generating, at the one or more processors, a damages dataset based upon the analysis;
   generating, at the one or more processors, a transaction including an identifier for a vehicle involved in the vehicle accident and the damages dataset; and
   transmitting, at the one or more processors, the transaction including the identifier for the vehicle involved in the vehicle accident and the damages dataset to at least one other participant via the distributed ledger.

2. The computer-implemented method of claim 1, wherein the sensor data is received from the vehicle involved in the vehicle accident.

3. The computer-implemented method of claim 1, wherein the sensor data is vehicle data indicative of speed, position, orientation, location, impact, or combinations thereof.

4. The computer-implemented method of claim 1, wherein analyzing the plurality of vehicle components further comprises:
   collecting, at the one or more processors, accident data from the plurality of vehicle components.

5. The computer-implemented method of claim 1, wherein analyzing the plurality of vehicle components further comprises:
   determining, at the one or more processors, a subrogation claim related to the vehicle accident;
   generating, at the one or more processors, a smart contract related to the subrogation claim; and
   deploying, at the one or more processors, the smart contract to the distributed ledger.

6. The computer-implemented method of claim 5, further comprising, for the subrogation claim, identifying a claimant with a first cryptographic public key, and identifying a defendant with a second cryptographic public key; and, subsequently, sending data including a message signed by private keys corresponding to the first and second public keys identifying the claimant and the defendant in a smart contract.

7. The computer-implemented method of claim 6, wherein the claimant and defendant generate the public and private keys offline, and only the public keys are provided to other network participants.

8. The computer-implemented method of claim 1, wherein generating the damages dataset further comprises:
   determining, at the one or more processors, a component status for each member of the plurality of vehicle components.

9. The computer-implemented method of claim 1, wherein the damages dataset includes an insurance provider for the vehicle involved in the vehicle accident.

10. The computer-implemented method of claim 1, wherein generating the transaction further comprises:
    augmenting, at the one or more processors, the transaction with identity data for the vehicle;
    generating, at the one or more processors, a cryptographic signature based upon the transaction; and
    augmenting, at the one or more processors, the transaction with the cryptographic signature.

11. The computer-implemented method of claim 1, wherein transmitting the transaction to at least one other participant further comprises:
    transmitting, at the one or more processors, the transaction to a smart contract stored on the distributed ledger.

12. The computer-implemented method of claim 1, wherein the plurality of vehicle components further includes:
    tires of the vehicle involved in the accident;
    air bags of the vehicle involved in the accident; and
    a steering wheel of the vehicle involved in the accident.

13. A computer-implemented method for interacting with a distributed ledger maintained by a plurality of participants, the method comprising:
    receiving, at one or more processors, sensor data indicative of a vehicle accident;
    determining, at the one or more processors, that the vehicle accident has occurred based on the received sensor data;
    analyzing, at the one or more processors, a plurality of vehicle components for a vehicle involved in the vehicle accident to assess potential damage, the plurality of vehicle components including an engine of a vehicle involved in the accident, and brakes, and a suspension system of the vehicle involved in the accident;
    generating, at the one or more processors, a damages dataset based upon the analysis;
    creating, at the one or more processors, a distributed ledger for the vehicle involved in the vehicle accident;
    deploying, at the one or more processors, a smart contract including the damages dataset and an identifier for the vehicle involved in the vehicle accident on the distributed ledger;
    generating, at the one or more processors, a transaction including the identifier for a vehicle involved in the vehicle accident and the damages dataset; and
    transmitting, at the one or more processors, the transaction including the identifier for a vehicle involved in the vehicle accident and the damages dataset to at least one other participant in the distributed ledger.

14. The computer-implemented method of claim 13, wherein the sensor data is vehicle data indicative of speed, position, orientation, location, impact, or combinations thereof.

15. The computer-implemented method of claim 13, wherein analyzing the plurality of vehicle components further comprises:
collecting, at the one or more processors, accident data from the plurality of vehicle components.

16. The computer-implemented method of claim 13, wherein analyzing the plurality of vehicle components further comprises:
determining, at the one or more processors, a subrogation claim related to the vehicle accident;
generating, at the one or more processors, a smart contract related to the subrogation claim; and
deploying, at the one or more processors, the smart contract to the distributed ledger.

17. The computer-implemented method of claim 13, wherein generating the transaction further comprises:
augmenting, at the one or more processors, the transaction with identity data for the vehicle;
generating, at the one or more processors, a cryptographic signature based upon the transaction; and
augmenting, at the one or more processors, the transaction with the cryptographic signature.

18. A computer system for interacting with a distributed ledger, the system comprising:
a network interface configured to interface with a processor;
a memory configured to store non-transitory computer executable instructions and configured to interface with the processor; and
the processor configured to interface with the memory, wherein the processor is configured to execute the non-transitory computer executable instructions to cause the processor to:
receive sensor data indicative of a vehicle accident;
determine that the vehicle accident has occurred based on the received sensor data;
analyze, to assess potential damage, a plurality of vehicle components including an engine of a vehicle involved in the accident, and brakes, and a suspension system of the vehicle involved in the accident by:
determining a subrogation claim related to the vehicle accident including analyzing a damage level done to the engine of the vehicle;
generating a smart contract related to the subrogation claim; and
deploying the smart contract to the distributed ledger;
generate a damages dataset based upon the analysis;
generate a transaction including an identifier for a vehicle involved in the vehicle accident and the damages dataset; and
transmit the transaction including the identifier for a vehicle involved in the vehicle accident and the damages dataset to at least one other participant via the distributed ledger.

19. The computer system of claim 18, wherein the sensor data is received from the vehicle involved in the vehicle accident.

20. The computer system of claim 18, further including:
a camera mounted about the vehicle; and
a road side camera; and
wherein the received sensor data indicative of the vehicle accident includes data from both the camera mounted about the vehicle and the roadside camera.

* * * * *